US012300943B2

(12) United States Patent
Scherer et al.

(10) Patent No.: US 12,300,943 B2
(45) Date of Patent: May 13, 2025

(54) PATCH PANEL TRACEABLE NETWORKING SYSTEM

(71) Applicant: MERTEK INDUSTRIES, LLC, Austin, TX (US)

(72) Inventors: Christopher B. Scherer, Austin, TX (US); Jon Sholtis, Austin, TX (US); James Beams, Austin, TX (US)

(73) Assignee: MERTEK INDUSTRIES, LLC, Austin, TX (US)

(*) Notice: Subject to any disclaimer, the term of this patent is extended or adjusted under 35 U.S.C. 154(b) by 102 days.

(21) Appl. No.: 17/754,361

(22) PCT Filed: Sep. 29, 2020

(86) PCT No.: PCT/US2020/053223
§ 371 (c)(1),
(2) Date: Mar. 30, 2022

(87) PCT Pub. No.: WO2021/067241
PCT Pub. Date: Apr. 8, 2021

(65) Prior Publication Data
US 2022/0416480 A1 Dec. 29, 2022

Related U.S. Application Data

(60) Provisional application No. 62/907,792, filed on Sep. 30, 2019.

(51) Int. Cl.
*H01R 13/66* (2006.01)
*H04L 12/40* (2006.01)

(52) U.S. Cl.
CPC ..... *H01R 13/6658* (2013.01); *H04L 12/40032* (2013.01); *H01R 2201/04* (2013.01); *H01R 2201/16* (2013.01)

(58) Field of Classification Search
CPC ............ H01R 13/6658; H01R 2201/04; H01R 2201/16; H04L 12/40032
(Continued)

(56) References Cited

U.S. PATENT DOCUMENTS 3,960,428 A 6/1976 Naus et al.
4,761,720 A 8/1988 Solow
(Continued)

FOREIGN PATENT DOCUMENTS

CN 1331505 1/2002
CN 1738108 2/2006
(Continued)

*Primary Examiner* — Gary F Paumen
(74) *Attorney, Agent, or Firm* — Norton Rose Fulbright US LLP

(57) ABSTRACT

Disclosed are network cable system and components thereof and methods for using the network cable system and components. The network cable system includes one or more components, such as panels, cables, connectors, mobile devices, etc. In one aspect, a panel is configured to wirelessly communicate with a mobile device to receive selections for port tracing. Based on a selected port, the panel is configured to cause an indicator corresponding to the selected port to output an indication to enable port tracing. In another aspect, a panel is configured to wirelessly communicate network related information determined by the panel or received at the panel from another networking component to the mobile device to enable remote monitoring, setup, and adjustment of the network.

20 Claims, 44 Drawing Sheets

(58) Field of Classification Search
USPC .................................... 439/76.1, 488–490
See application file for complete search history.

(56) References Cited

U.S. PATENT DOCUMENTS

| | | |
|---|---|---|
| 4,762,388 A | 8/1988 | Tanaka et al. |
| 4,764,129 A | 8/1988 | Jones et al. |
| 4,837,488 A | 6/1989 | Donahue |
| 4,840,451 A | 6/1989 | Sampson et al. |
| D323,143 S | 1/1992 | Ohkura et al. |
| 5,159,316 A | 10/1992 | Lazzara |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,666,453 A | 9/1997 | Dannenmann |
| 5,684,903 A | 11/1997 | Kyomasu et al. |
| 5,687,268 A | 11/1997 | Stephenson et al. |
| 5,741,152 A | 4/1998 | Boutros |
| 5,764,043 A | 6/1998 | Czosnowski et al. |
| 5,885,111 A | 3/1999 | Yu |
| 5,888,100 A | 3/1999 | Bofill et al. |
| 5,937,130 A | 8/1999 | Amberg et al. |
| 5,956,444 A | 9/1999 | Duda et al. |
| 5,971,626 A | 10/1999 | Knodell et al. |
| 6,002,331 A | 12/1999 | Laor |
| 6,041,155 A | 3/2000 | Anderson et al. |
| 6,080,007 A | 6/2000 | Dupuis et al. |
| 6,099,345 A | 8/2000 | Milner et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,235 B1 | 5/2001 | Shavit et al. |
| 6,243,510 B1 | 6/2001 | Rauch |
| 6,244,908 B1 | 6/2001 | Hammond et al. |
| 6,247,849 B1 | 6/2001 | Liu |
| 6,280,232 B1 | 8/2001 | Beecher et al. |
| 6,394,853 B1 | 5/2002 | Hammond et al. |
| 6,454,611 B1 | 9/2002 | Francis |
| 6,461,054 B1 | 10/2002 | Iwase |
| 6,478,472 B1 | 11/2002 | Anderson et al. |
| 6,524,128 B2 | 2/2003 | Marowsky et al. |
| 6,532,328 B1 | 3/2003 | Kline |
| 6,551,117 B2 | 4/2003 | Poplawski et al. |
| 6,558,204 B1 | 5/2003 | Weatherley |
| 6,568,953 B1 | 5/2003 | AbuGhazaleh et al. |
| 6,577,243 B1 | 6/2003 | Dannenmann et al. |
| 6,579,014 B2 | 6/2003 | Melton et al. |
| 6,626,697 B1 | 9/2003 | Martin |
| 6,648,520 B2 | 11/2003 | McDonald et al. |
| 6,710,254 B2 | 3/2004 | Yueh |
| 6,790,096 B2 | 9/2004 | Lin |
| 6,798,183 B2 | 9/2004 | Bohley et al. |
| 6,808,116 B1 | 10/2004 | Eslambolchi et al. |
| 6,811,445 B2 | 11/2004 | Caveney et al. |
| 6,854,894 B1 | 2/2005 | Yunker et al. |
| 6,975,242 B2 | 12/2005 | Dannenmann et al. |
| 7,021,808 B2 | 4/2006 | Currie et al. |
| 7,049,937 B1 | 5/2006 | Zweig et al. |
| 7,080,945 B2 | 7/2006 | Colombo et al. |
| 7,081,808 B2 | 7/2006 | Colombo et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,165,728 B2 | 1/2007 | Durrant et al. |
| 7,168,994 B2 | 1/2007 | Caveney et al. |
| 7,198,409 B2 | 4/2007 | Smith et al. |
| 7,207,724 B2 | 4/2007 | Gurreri |
| D543,146 S | 5/2007 | Chen et al. |
| 7,221,284 B2 | 5/2007 | Scherer et al. |
| 7,226,217 B1 | 6/2007 | Benton et al. |
| 7,258,493 B2 | 8/2007 | Milette |
| 7,281,859 B2 | 10/2007 | Mudd et al. |
| 7,299,305 B2 | 11/2007 | Kim |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,327,278 B2 | 2/2008 | Dannenman et al. |
| 7,329,137 B2 | 2/2008 | Martin et al. |
| 7,335,066 B2 | 2/2008 | Carroll et al. |
| 7,336,883 B2 | 2/2008 | Scholtz |
| 7,354,291 B2 | 4/2008 | Caveney et al. |
| 7,374,458 B2 | 5/2008 | Caveney et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,513,787 B2 | 4/2009 | AbuGhazaleh et al. |
| 7,544,909 B2 | 6/2009 | Dhir |
| 7,547,150 B2 | 6/2009 | Downie et al. |
| 7,549,886 B2 | 6/2009 | Herring et al. |
| 7,556,536 B2 | 7/2009 | Caveney et al. |
| 7,561,775 B2 | 7/2009 | Lin et al. |
| 7,572,071 B1 | 8/2009 | Wu |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,651,361 B2 | 1/2010 | Henry et al. |
| 7,674,126 B2 | 3/2010 | Below et al. |
| 7,695,199 B2 | 4/2010 | Teo et al. |
| 7,699,533 B2 | 4/2010 | Milette |
| 7,760,094 B1 | 7/2010 | Kozischek et al. |
| 7,772,975 B2 | 8/2010 | Downie et al. |
| 7,782,202 B2 | 8/2010 | Downie et al. |
| 7,824,113 B2 | 11/2010 | Wong et al. |
| 7,910,833 B2 | 3/2011 | McGinley et al. |
| 7,910,834 B2 | 3/2011 | McGinley et al. |
| 7,920,764 B2 | 4/2011 | Kewitsch |
| 7,940,182 B2 | 5/2011 | Lange et al. |
| 7,960,648 B2 | 6/2011 | McGinley et al. |
| 7,965,186 B2 | 6/2011 | Downie et al. |
| D641,708 S | 7/2011 | Yamaguchi |
| 7,972,183 B1 | 7/2011 | Lin |
| 8,043,124 B2 | 10/2011 | Caveney et al. |
| 8,070,531 B1 | 12/2011 | Ku et al. |
| 8,113,723 B2 | 2/2012 | Tagami et al. |
| 8,172,466 B2 | 5/2012 | Uemura et al. |
| 8,210,755 B2 | 7/2012 | Lavranchuk |
| 8,251,733 B2 | 8/2012 | Wu |
| 8,264,355 B2 | 9/2012 | Kozischek et al. |
| 8,277,260 B2 | 10/2012 | Caveney et al. |
| 8,465,317 B2 | 4/2013 | Gniadek et al. |
| 8,556,645 B2 | 10/2013 | Crain |
| 8,585,426 B2 | 11/2013 | Zerebilov et al. |
| 8,606,972 B2 | 12/2013 | Abuelsaad et al. |
| 8,611,234 B1 | 12/2013 | Gershman |
| 8,620,123 B2 | 12/2013 | Dean, Jr. et al. |
| 8,624,577 B2 | 1/2014 | Bradley, II |
| 8,692,683 B2 | 4/2014 | Dove |
| 8,702,453 B2 | 4/2014 | Caveney et al. |
| 8,708,724 B2 | 4/2014 | Patel et al. |
| 8,747,141 B2 | 6/2014 | Crain |
| 8,757,895 B2 | 6/2014 | Petersen |
| 8,827,748 B2 | 9/2014 | Scherer et al. |
| 8,864,515 B2 * | 10/2014 | Oh .............. H01R 13/465 |
| | | 439/910 |
| 9,196,975 B2 | 11/2015 | Scherer et al. |
| 9,230,416 B2 | 1/2016 | Ward et al. |
| 10,178,005 B2 | 1/2019 | Scherer et al. |
| 10,215,935 B2 | 2/2019 | Scherer et al. |

(56) References Cited

U.S. PATENT DOCUMENTS

| | | |
|---|---|---|
| 2002/0031955 A1 | 3/2002 | Schmidt et al. |
| 2002/0048990 A1 | 4/2002 | Marowsky et al. |
| 2003/0031025 A1 | 2/2003 | Huizenga |
| 2003/0157842 A1 | 8/2003 | Arnett et al. |
| 2003/0199192 A1 | 10/2003 | Caveney et al. |
| 2003/0222786 A1 | 12/2003 | Dannenmann et al. |
| 2003/0224666 A1 | 12/2003 | Yuan-Huei |
| 2003/0234729 A1 | 12/2003 | Shen |
| 2004/0038564 A1 | 2/2004 | Yan |
| 2004/0049723 A1 | 3/2004 | Obara |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0160774 A1 | 8/2004 | Lionetti et al. |
| 2004/0161958 A1 | 8/2004 | Tagami et al. |
| 2005/0037672 A1 | 2/2005 | Caveney et al. |
| 2005/0124209 A1 | 6/2005 | Currie et al. |
| 2005/0224585 A1 | 10/2005 | Durrant et al. |
| 2005/0275412 A1 | 12/2005 | Kwong et al. |
| 2006/0057876 A1 | 3/2006 | Dannenmann et al. |
| 2006/0089049 A1 | 4/2006 | Sedor |
| 2006/0134996 A1 | 6/2006 | Caveney et al. |
| 2006/0162947 A1 | 7/2006 | Bolouri-Saransar et al. |
| 2006/0232385 A1 | 10/2006 | Scherer et al. |
| 2006/0269194 A1 | 11/2006 | Luther et al. |
| 2007/0105453 A1 | 5/2007 | Caveney et al. |
| 2007/0116411 A1 | 5/2007 | Benton et al. |
| 2007/0149062 A1 | 6/2007 | Long et al. |
| 2007/0190863 A1 | 8/2007 | Caveney et al. |
| 2007/0197094 A1 | 8/2007 | Velleca |
| 2007/0222426 A1 | 9/2007 | Waffenschmidt |
| 2007/0230874 A1 | 10/2007 | Lin |
| 2007/0232115 A1 | 10/2007 | Burke et al. |
| 2007/0243749 A1 | 10/2007 | Wu |
| 2007/0291807 A1 | 12/2007 | Uesaka |
| 2007/0296391 A1 | 12/2007 | Bertin et al. |
| 2008/0020658 A1 | 1/2008 | Provost |
| 2008/0044137 A1 | 2/2008 | Luther et al. |
| 2008/0069501 A1 | 3/2008 | Mudd et al. |
| 2008/0099313 A1 | 5/2008 | Dhir |
| 2008/0101757 A1 | 5/2008 | Lin et al. |
| 2008/0102689 A1 | 5/2008 | Dhir |
| 2008/0122579 A1 | 5/2008 | German et al. |
| 2008/0220658 A1 | 9/2008 | Caveney et al. |
| 2008/0226237 A1 | 9/2008 | O'Riorden et al. |
| 2008/0267566 A1 | 10/2008 | Lin et al. |
| 2009/0022306 A1 | 1/2009 | Wang et al. |
| 2009/0028507 A1 | 1/2009 | Jones et al. |
| 2009/0042431 A1 | 2/2009 | Herring et al. |
| 2009/0214162 A1 | 8/2009 | O'Riorden et al. |
| 2009/0220197 A1 | 9/2009 | Gniadek |
| 2009/0269972 A1 | 10/2009 | Zhou et al. |
| 2009/0269973 A1 | 10/2009 | Caveney et al. |
| 2009/0275228 A1 | 11/2009 | Henry et al. |
| 2010/0034502 A1 | 2/2010 | Lu et al. |
| 2010/0048064 A1 | 2/2010 | Peng |
| 2010/0079248 A1 | 4/2010 | Greveling |
| 2010/0098425 A1 | 4/2010 | Kewitsch |
| 2010/0182072 A1 | 7/2010 | Liu |
| 2010/0322561 A1 | 12/2010 | Lin et al. |
| 2011/0043333 A1 | 2/2011 | German |
| 2011/0044588 A1 | 2/2011 | Larson et al. |
| 2011/0116748 A1 | 5/2011 | Smrha et al. |
| 2011/0131801 A1 | 6/2011 | Nelson et al. |
| 2011/0177710 A1 | 7/2011 | Tobey |
| 2011/0222819 A1 | 9/2011 | Anderson et al. |
| 2012/0058689 A1 | 3/2012 | Caveney et al. |
| 2012/0064750 A1 | 3/2012 | Wu |
| 2013/0039624 A1 | 2/2013 | Scherer et al. |
| 2013/0052860 A1 | 2/2013 | Caveney et al. |
| 2013/0164968 A1 | 6/2013 | Bishop et al. |
| 2013/0335020 A1 | 12/2013 | Moore |
| 2014/0035755 A1 | 2/2014 | Ward et al. |
| 2014/0313042 A1 | 10/2014 | Scherer et al. |
| 2015/0118898 A1 | 4/2015 | Paynter |
| 2015/0132975 A1* | 5/2015 | Yossef ............... H01R 13/6691 29/874 |
| 2015/0340818 A1 | 11/2015 | Scherer et al. |
| 2016/0020556 A1* | 1/2016 | Soos ................... H01R 13/665 439/620.22 |
| 2016/0020975 A1 | 1/2016 | Scherer et al. |
| 2016/0054527 A1 | 2/2016 | Tang et al. |
| 2016/0209604 A1 | 7/2016 | Scherer et al. |
| 2016/0353351 A1 | 12/2016 | Huber et al. |
| 2017/0293102 A1 | 10/2017 | Bauco et al. |
| 2018/0014145 A1 | 1/2018 | Seaman |
| 2018/0077472 A1 | 3/2018 | Raza et al. |
| 2018/0261918 A1 | 9/2018 | Lelchuk |
| 2019/0149969 A1 | 5/2019 | Tetreault et al. |
| 2019/0235816 A1 | 8/2019 | Adolesson |
| 2019/0257873 A1 | 8/2019 | Sholtis et al. |

FOREIGN PATENT DOCUMENTS

| | | |
|---|---|---|
| CN | 2836038 Y | 11/2006 |
| CN | 101299502 | 11/2008 |
| CN | 101572363 | 11/2009 |
| CN | 101572369 | 11/2009 |
| CN | 201383588 | 1/2010 |
| CN | 102394402 | 3/2012 |
| CN | 102859807 | 1/2013 |
| DE | 202006011910 | 3/2007 |
| DE | 102006019335 | 10/2007 |
| EP | 1074868 | 7/2001 |
| EP | 1566674 | 8/2005 |
| JP | 2009/229545 | 10/2009 |
| JP | 2009/276493 | 11/2009 |
| TW | 201236293 | 9/2012 |
| WO | WO 2001/79904 | 10/2001 |
| WO | WO 2008/112986 | 9/2008 |
| WO | WO 2009/135787 | 11/2009 |
| WO | WO2011/139341 | 11/2011 |

* cited by examiner

Status LEDs

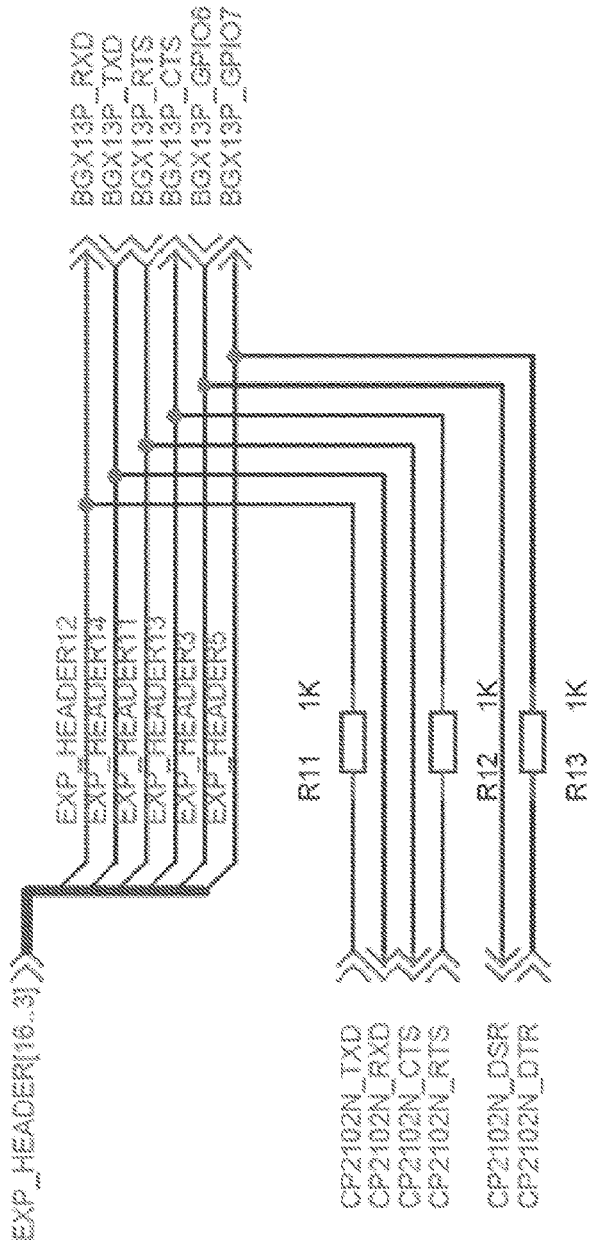
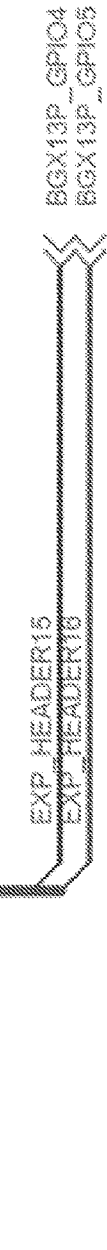
FIG. 14E
FIG. 14F

Notes:
— Internal regulator in CP2102N powers board when USB is connected.
— Schottky diode ensures no contention if the board is also powered by EXP Header.
— VIO senses correct target voltage for CP2102N outputs.
— U3 isolates CP2102N power domain when USB is disconnected.
— Q1-Q5 isolates IO signals from CP2102N when USB is disconnected.

PATCH PANEL TRACEABLE NETWORKING SYSTEM

CROSS-REFERENCE TO RELATED APPLICATIONS

This application is a national phase under 35 U.S.C. § 371 of International Application No. PCT/US2020/053223, filed Sep. 29, 2020, which claims the benefit of priority to U.S. Provisional Patent Application No. 62/907,792, filed Sep. 30, 2019, the contents of which are hereby incorporated by reference in their entirety.

TECHNICAL FIELD OF INVENTION

The present disclosure relates generally to cables, and more particularly, but not by way of limitation, to network cable system components with wireless communication and/or identification capability.

BACKGROUND

A networking cable is configured to carry signals from one electronic device to another. The term signals can mean data signals, power, or telephone communications. Electronic devices include but are not limited to terminals, personal computers, printers, workstations, hubs, switches, storage devices, tape drives, routers, telephone switches, and servers. Networking cables, frequently referred to, as "jumper cables", "patch cables", "patch cords", or simply "cables", typically are multiple pair copper wires packaged in an outer flexible sheath. Networking cables are designed to interconnect an electronic device with another electronic device. Such networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

A network cable connector, such as a jack connector (e.g., a receptacle) or a plug connector, associated with a network cable may have a battery to enable display of network related information. An example of such a network cable connector is described in U.S. Pat. No. 8,827,748. In such situations, the batteries eventually run out of power and need to be replaced. This results in system downtime and lack of functionality, which results in system inefficiency.

SUMMARY

The present disclosure describes a network cable system and components thereof and methods for using the network cable system and components. The network cable system includes one or more components, such as panels, cables, connectors, mobile devices, etc. In one aspect, a panel is configured to wirelessly communicate with a mobile device (e.g., an application thereof) to receive selections for port tracing. Based on the selected port, the panel is configured to cause an indicator corresponding to the port to output an indication. For example, a light of the port or of a cable attached to the port, such as lights of connectors of the cable, may blink or change color to enable tracing of the cable.

In another aspect, network related information may be determined by the panel or received by the panel from a networking component and relayed to the mobile device for display. Such network related information may include information relevant to the connector and/or a networked environment, and may comprise at least one of: an operating status of the connector, a power connection status of the connector, a security setting of the connector, an Internet protocol (IP) address of a device coupled to the connector, and a media access control (MAC) address of a device coupled to the connector, type of equipment coupled to the connector, location of a far end device, connector security settings, security lock-out status, etc.

Additionally, or alternatively, a display of the network panel may display the network related information. In addition, network related information and/or functionality may be set or programmed by mobile device. To illustrate, network related information and settings of the panel itself or of components connected to the panel may be viewed, set, or adjusted by the mobile device.

Thus, the disclosed network cable system provides a traceable networking system via communication, such as wireless communication, with a patch panel and a remote device. The disclosed network cable system enables a more efficient way to identify ports, setup the network, adjust the network, and troubleshoot the network. In some implementations, such as wireless communication based systems, no additional equipment needs to be physically coupled to a component of the network cable system. Thus, the network cable system may enable remote or off premise operations.

Although described in the context of network cables, the disclosed wireless communication means and wireless power receiving means can be used in electric power cables, fiber optic cables, audio cables, video cables, video and audio cables (e.g., HDMI and display port) and/or other components of the networked environment.

Any embodiment of any of the present cables, systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Some details associated with the embodiments are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 14A-14M illustrates circuit diagrams of components for a traceable networking system according to one aspect of the present disclosure.

DESCRIPTION OF ILLUSTRATIVE EMBODIMENTS

Figure 1:
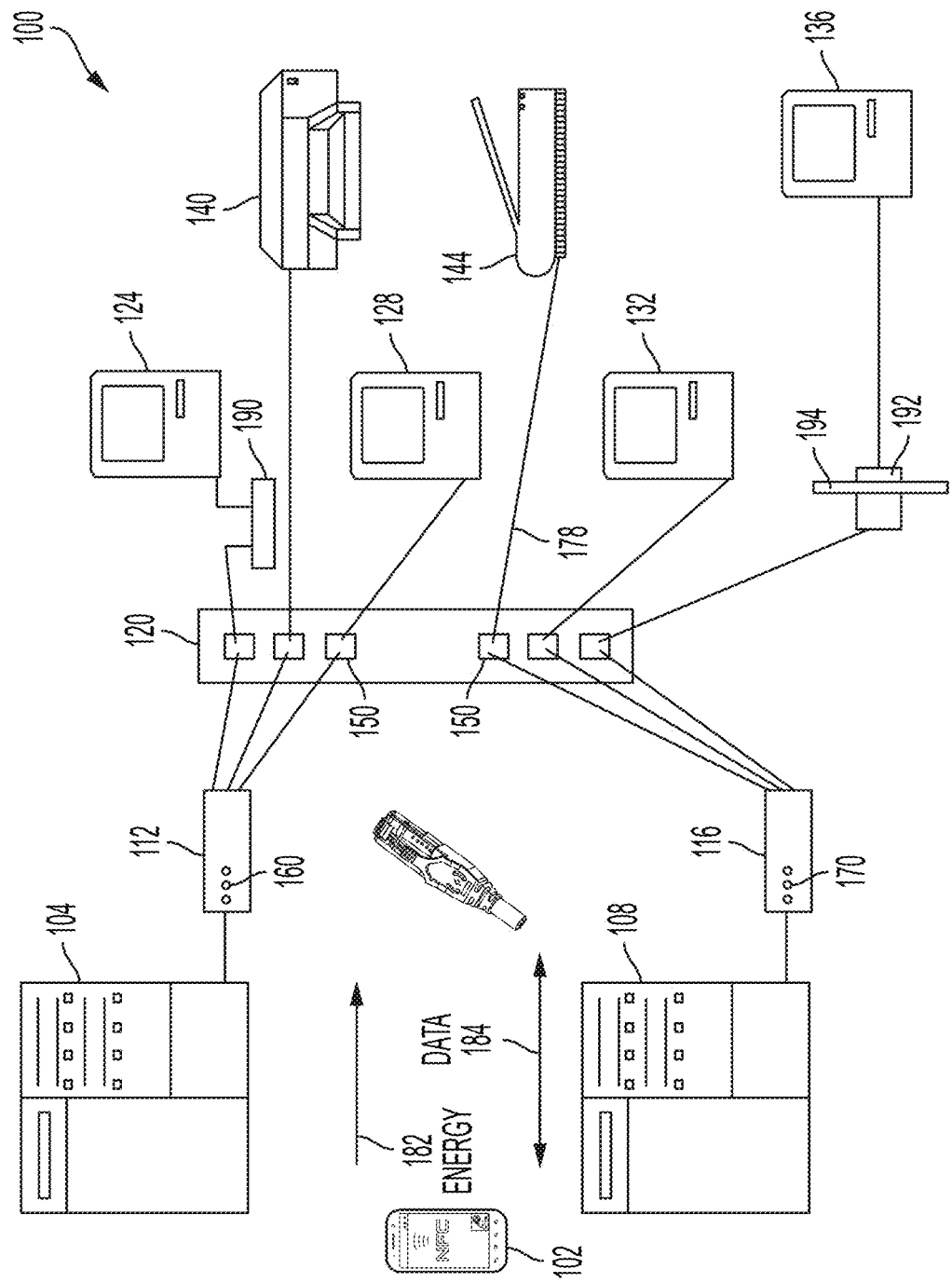
FIG. 1 illustrates a schematic view of a networked computer environment.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. Additionally, it will be understood that the term "wherein" may be used interchangeably with "where."

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a structure (e.g., a component of an apparatus, such as a cable) that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

FIG. 1 illustrates an example of a networked environment 100 and a mobile device 102 external to the networked environment 100, such as an external device and/or external power source. Mobile device 102 is configured to communicate with one or more components of networked environment 100. For example, mobile device 102 is configured to transmit data 184 to a particular component of networked environment 100. In some implementations, the mobile device 102 is configured to transmit data 184 to a particular component of networked environment 100 to control a second component, such as an indicator thereof to enable network identification and tracing.

The particular component is configured to provide information about the networked environment 100 to the mobile device 102 and/or user thereof by outputting the information via an indicator of the particular component or a component corresponding to the particular component. As an illustrative, non-limiting example, the mobile device 102 transmits data 184 to panel 120. An indicator of panel 120 and/or an indicator of network cable 178 may output an indication based on the data 184. Additionally, or alternatively, the particular component may transmit the information about the networked environment 100 to the mobile device 102 wirelessly.

Additionally, mobile device 102 is further configured to transmit energy 182 to the particular component of networked environment 100 in some implementations, The particular component can use the energy 182 transmitted by the mobile device 102 to provide or output the information. For example, the particular component may use the energy 182 to receive data 184, process data 184, send data 184, power the display, or a combination thereof.

In FIG. 1, networked environment 100 includes servers, computers, hubs, peripheral devices, and a cable panel, each of which may include one or more connectors (e.g., a network cable connector). As shown, computers 124, 128, 132, and 136 are each connected by network cables to a cable panel 120 via cable connectors 150. As shown, each cable connector 150 includes one or more cable connectors that are each configured to receive a corresponding jack associated with a network cable, such as a representative network cable 178. Network cable 178 may include one or more wires (e.g. conductors), such as one or more insulated wires. Each wire may be configured to communicate data signals, power signals, or both. The computers can be at multiple locations, such as in different rooms and/or buildings. To illustrate, computer 128 may be located in a first room, on a first floor, of a building and computer 132 may be located in a second room, on a second floor, of the building.

Also attached to panel 120 by network cables via connectors 150 are peripheral devices, such as printer 140 and scanner 144 as illustrative, non-limiting examples. Panel 120 is often located at a central room where service personnel can access panel 120. Often, access to the central room that includes panel 120 is restricted. From panel 120, multiple computers and peripheral devices are often linked by networked cables to hubs such as 112 and 116 via connectors 160, 170. Hubs 112 and 116 may be in turn be connected to servers 104 and 108. Multiple servers and hubs may be housed in a room.

Network environment 100 may also include one or more additional cable network connectors, such as network cable connector 190 and network cable connector 192. Examples of network cable connectors 150, 160, 170, 190, and 192 are described further herein at least with reference to FIGS. 2A-2F, 3A-3G, and 4A-4F. Network cable connector 190, 192 may include a plug (associated with an opening) that is configured to receive a jack associated with a network cable. In some implementations, network cable connector 190, 192 comprises a coupler that is configured to communicatively and/or electrically couple two network cables. In particular implementations, one or more of the network cable connectors 150, 160, 170, 190, and 192 includes a keystone jack or a keystone coupler. In some implementations, a network cable connector 190 and 192 may be configured as a wall jack, e.g., attached to a plate (e.g., a wall plate) or a support structure. For example, as shown, network cable connector is coupled (e.g., mounted) to or incorporated in a plate, such as a wall plate 194. Examples of plates are described further herein at least with reference to FIGS. 10A-10B, 11A-11B, and 12A-12B.

In some implementations, one or more network cable connector 150, 160, 170, 190, and 192 may comply with one or more interface standards. For example, a network cable connector may be configured to be compatible with 8P8C connector interfaces, such as RJ-45, RJ-48, or RJ-61 interfaces. As another example, a network cable connector may be configured to be compatible for 10P10C connector interfaces, such as RJ-50 interfaces.

For example one or more network cable connector 150, 160, 170, 190, and 192 may comply with one or more of the following interface standards categories: 5 (which generally includes four insulated twisted copper wires encased in a flexible outer jacket layer), 5A, 5E, 6 (e.g., for Gigabit Ethernet and/or other network protocols). Later standards (e.g., Cat-6) are often backward compatible with earlier standards (e.g., CAT 5, CAT 3). Relative to Cat-5, Cat-6 specifications are generally more stringent for crosstalk and system noise. Cat-6, for example, provides performance of up to 250 MHz, and may be suitable for 10BASE-T, 100BASE-TX (Fast Ethernet), 1000BASE-T/1000BASE-TX (Gigabit Ethernet) and 10GBASE-T (10-Gigabit Ethernet). Cat-6 has a relatively lower maximum length when used for 10GBASE-T. Cat-6A cable, or Augmented Cat-6, is characterized for 500 MHz and has further improved alien crosstalk characteristics, allowing 10GBASE-T to be run for the same maximum cable length as other protocols. Several other standards are in use, and may be used in embodiments of the present traceable networking cables. In some embodiments, one or more (e.g., two in a conductor wire pair) additional conductor wires (which may be referred to as tracer wires or indicator wires) can be added to or included in a networking cable (e.g., a Cat-5 or Cat-6 cable) such that the additional conductor wire(s) are used in the tracing function described herein. For example, the use of a cable 52 with ten wires or conductors with eight-wire RJ-45 connectors allows one of the five conductor-wire pairs to be used as a continuous continuity path between electrically activated telltales (e.g., light) at the end of the cable. Cables, conductor wires, conductor wire pairs, and/or conductors in the present embodiments may be coaxial, twin-axial, twisted, untwisted, shielded, unshielded, and/or bonded, as is known in the art.

In some implementations, a server (e.g., 104, 108), a hub (e.g., 112, 116), and/or a panel (e.g., 120) also represent an external power source that provides power to another device devices (e.g., 124, 128, 132, 136, 140, 144). In such implementations, at least some of the cables extending between the various devices and panel 120 may include or be configured to operate as power cables, audio cable, video cables, video and audio cables, fiber optic cables, or pull-tab cables. In a particular implementation, a server (e.g., 104, 108), a hub (e.g., 112, 116), and/or a panel (e.g., 120) configured to operate as an external power source may be referred to as power sourcing equipment (PSE). The PSE may be configured to provide power over Ethernet (POE) to one or more devices referred to herein as one or more powered devices (PDs). The external power source (e.g., PSE) may be complaint with POE standards or technical specifications, such as IEEE 802.3af, IEEE 802.3.at, Cisco Inline Power, etc., and configured to draw power from a POE PSE.

Various protocols (e.g., Ethernet) can be used to support data transfer between computers and servers. The example shown in FIG. 1 is relatively a small network, and networks may often be much larger. In addition to the devices shown in FIG. 1, networks can include, for example, other electronic devices such as mobile devices, workstations, switches, tape drives, storage devices, telephone switches, voice over Internet protocol (VOIP) devices, routers, and/or any other device that may be connected to a network (e.g., a camera), as illustrative, non-limiting examples. With large networks, the total number of network cables may be very large, and routine maintenance functions (e.g., the addition or change of computers) can require significant time and manpower to trace connections throughout the network.

In a particular implementation, a controller is included in or attached to at least one of the components of the networked environment 100 and is configured to wirelessly communicate with mobile device 102. For example, the controller includes or is coupled to a Bluetooth device or Bluetooth circuitry and is configured to receive data 184 from the mobile device 102, and optionally to transmit data 184 to the mobile device 102.

For example, the controller includes an RFID device (e.g., RFID tag, reader, or both) and is configured to receive energy 182 and/or data 184 from the mobile device 102.

The printed circuit can be included in cables, plates, extenders, couplers, connector, jacks, ports, and tags or stickers affixed to any of the preceding of the networked environment 100. An example the printed circuit is described further with reference to FIGS. 5 and 14. The printed circuit can communicate information about the networked environment 100 and/or components thereof to the mobile device 102 or output the information visually, such as via a display coupled to the printed circuit. By communicating or outputting information about the networked environment 100 and/or components thereof, a technician can service a network more quickly and easily and with reduced downtime.

In a particular implementation, a printed circuit is included in or attached to at least one of the components of the networked environment 100 and is configured to wirelessly communicate with mobile device 102. For example, the printed circuit includes an RFID device (e.g., RFID tag, reader, or both) and is configured to receive energy 182 and/or data 184 from the mobile device 102. The printed circuit can be included in cables, plates, extenders, couplers, connector, jacks, ports, and tags or stickers affixed to any of the preceding of the networked environment 100. An example the printed circuit is described further with reference to FIGS. 5 and 14. The printed circuit can communicate information about the networked environment 100 and/or components thereof to the mobile device 102 or output the information visually, such as via a display coupled to the printed circuit. By communicating or outputting information about the networked environment 100 and/or components thereof, a technician can service a network more quickly and easily and with reduced downtime.

Figure 2A:
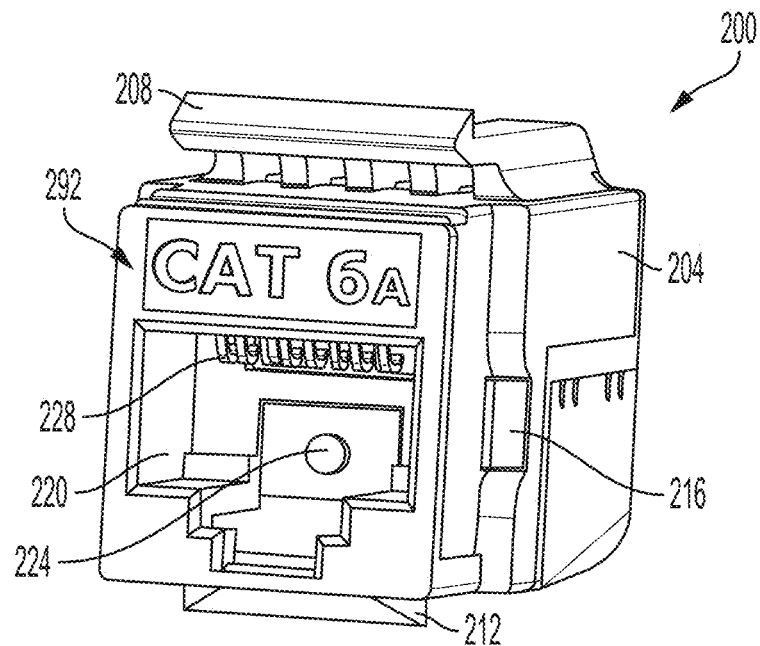
FIG. 2A illustrates a front, upper perspective view of a network cable connector according to one aspect of the present disclosure.
Figure 2B:
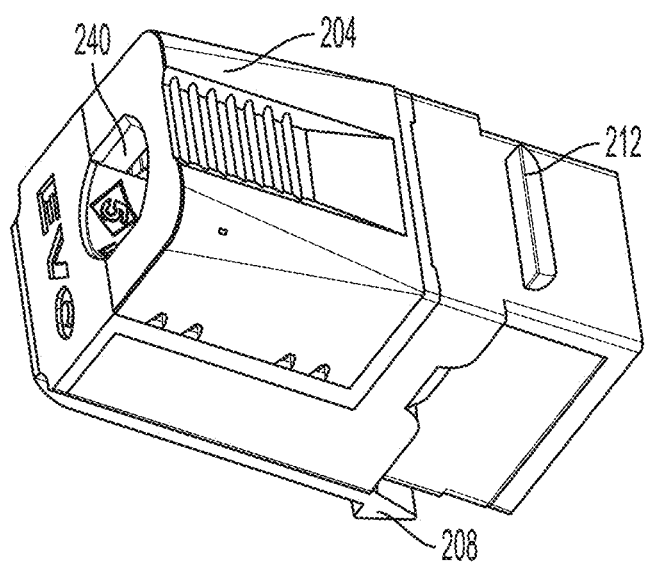
FIG. 2B illustrates a back, lower perspective view of a network cable connector according to one aspect of the present disclosure.
Figure 2C:
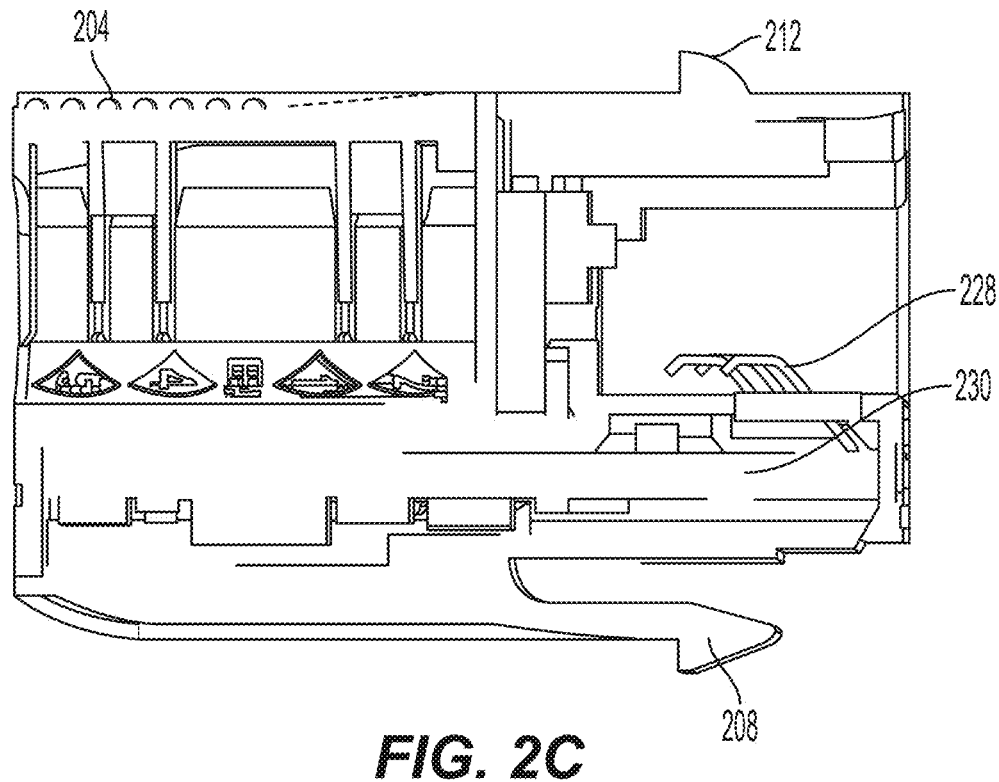
FIG. 2C illustrates a side cross-sectional view of a network cable connector according to one aspect of the present disclosure.
Figure 2D:
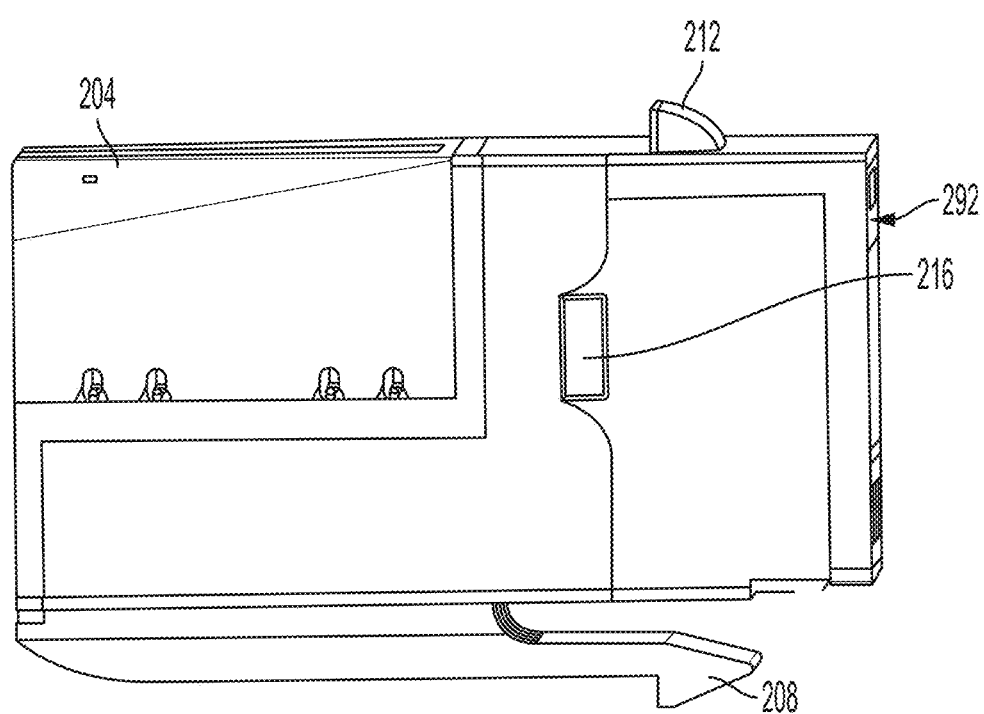
FIG. 2D illustrates a side view of a network cable connector according to one aspect of the present disclosure.
Figure 2E:
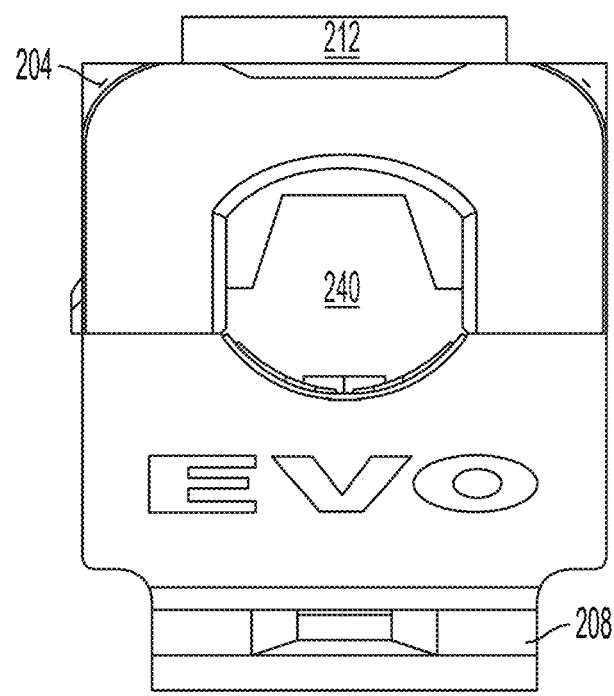
FIG. 2E illustrates a back view of a network cable connector according to one aspect of the present disclosure.
Figure 2F:
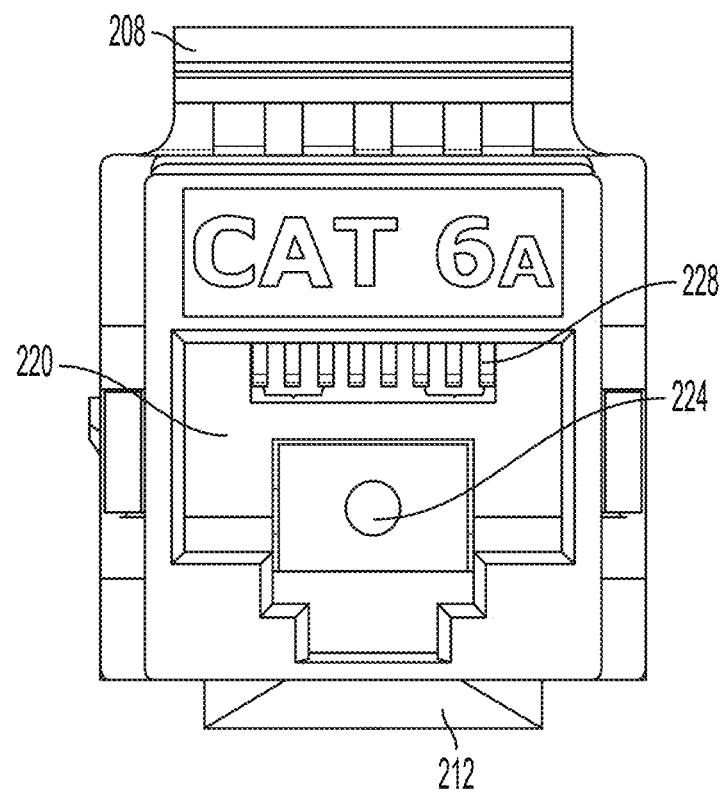
FIG. 2F illustrates a front view of a network cable connector according to one aspect of the present disclosure.
Figure 2G:
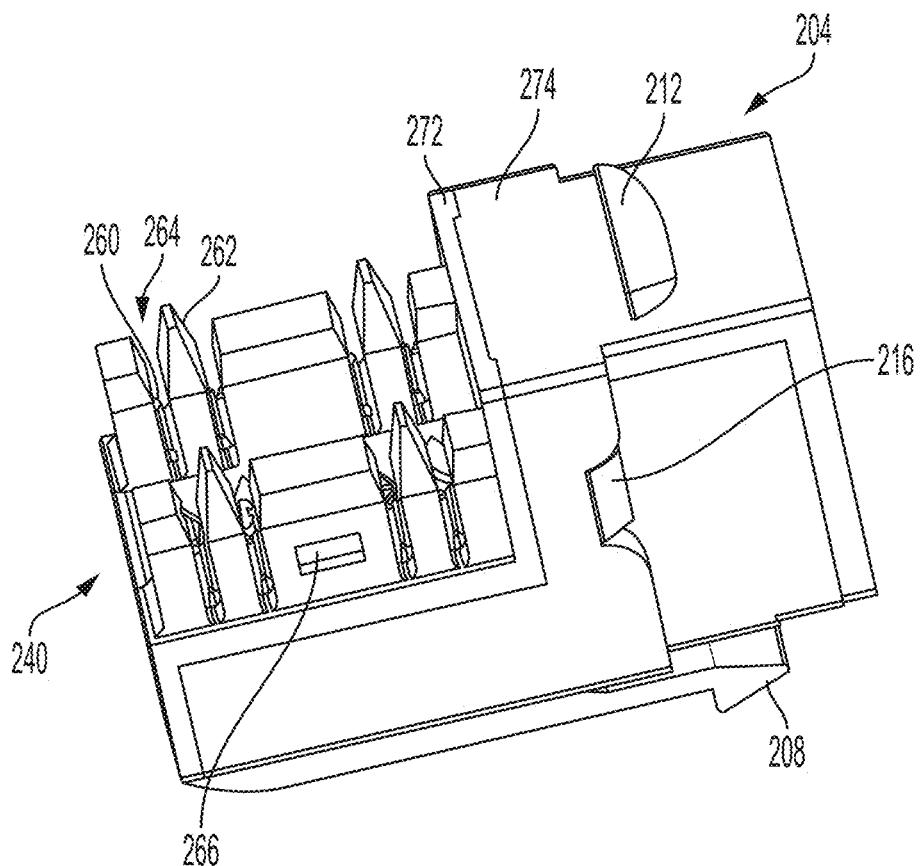
FIG. 2G illustrates a cross-section of a side, upper perspective view of network cable connector without a portion of the hood according to one aspect of the present disclosure.
Figure 2H:
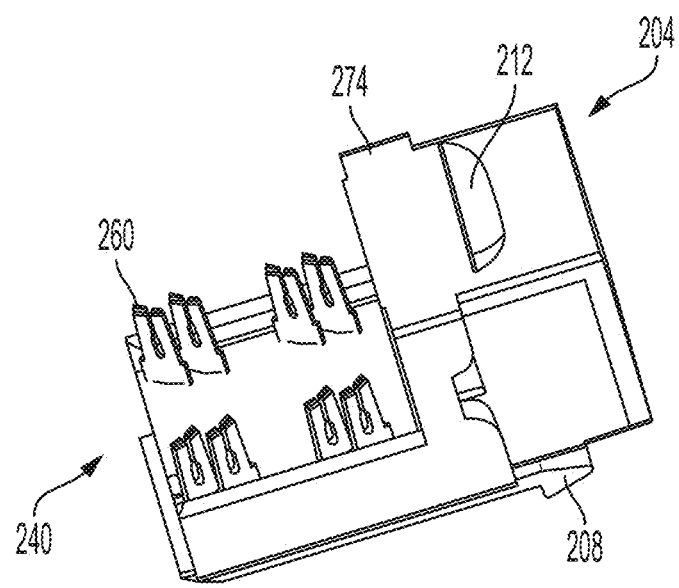
FIG. 2H illustrates a cross-section of a side, upper perspective view of a network cable connector without portions of the hood according to one aspect of the present disclosure.
Figure 2I:
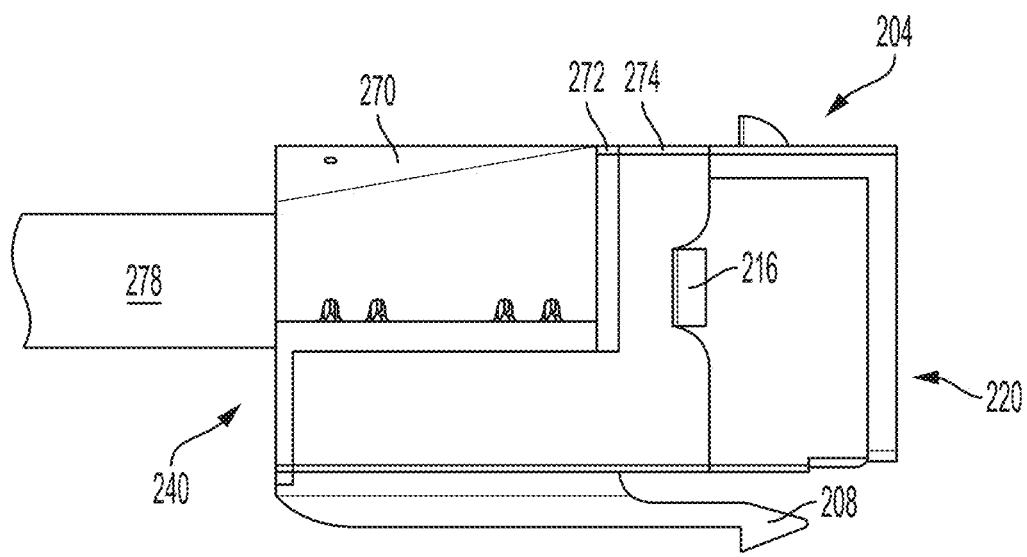
FIG. 2I illustrates a cross-section of a side view of a network cable connector that is coupled to a network cable according to one aspect of the present disclosure.
Figure 2J:
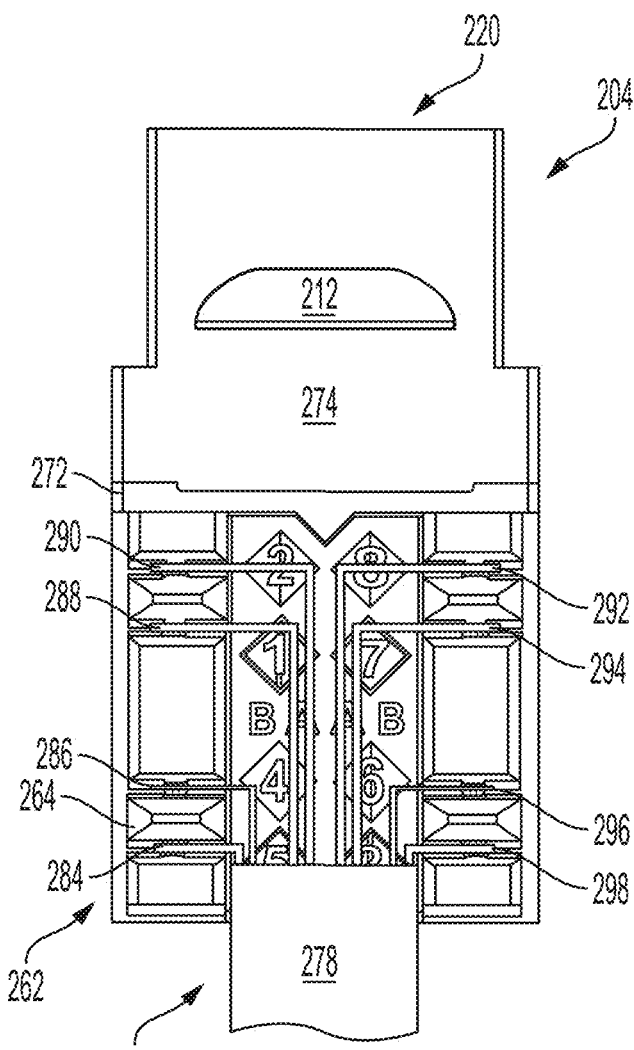
FIG. 2J illustrates a cross-section of a top view of a network cable connector without a portion of the hood and that is coupled to a network cable according to one aspect of the present disclosure.

FIGS. 2A-2F each show a different view of an example of a network cable connector 200. FIG. 2A illustrates a front, upper perspective view, FIG. 2B illustrates a back, lower perspective view, FIG. 2C illustrates a side cross-sectional view, FIG. 2D illustrates a side view, FIG. 2E illustrates a back view, FIG. 2F illustrates a front view, FIG. 2G illustrates side, upper perspective view, FIG. 2H illustrates a side, upper perspective view, FIG. 2I illustrates a side view, and FIG. 2J illustrates a top view. Network cable connector 200 may be used in the networked environment of FIG. 1 or other similar networked environment. For example, network cable connector 200 may include or correspond to 150, 160, 170, 190, 192 of FIG. 1.

As depicted in FIGS. 2A-2J, network cable connector 200 includes a hood 204 (e.g., a housing) with a first opening 220 and a second opening 240 deposed on two sides of network cable connector 200. First opening 220 may be configured to receive a plug, such as a network cable plug. Second opening 240 may be configured to receive a network cable, which may connect network cable connector 200 to another device, such as an external power source, another network device, etc. Thus, network cable connector 200 may be configured to connect one device to another, like cable connectors 150, 160 on panel 120 or hubs 112, 116 described in FIG. 1. In some implementations, network cable connector 200 may include or correspond to a keystone jack.

In some embodiments, network cable connector 200 may also be configured as a wall jack (e.g., receptacle). For example, network cable connector 200 may be attached to a plate, such as a wall plate (e.g., 194). Network cable connector 200 may include a clip 208 configured to lock the connector when inserted into a wall plate or other devices, such as a hub, a router, a panel, etc. Network cable connector 200 may further include one or more side latches 216 to secure the connector to another device, such as a wall plate, a panel, a hub, etc. and/or to couple portions of hood 204. Additionally, or alternatively, network cable connector 200 may be connected to a power over Ethernet (POE) powered device (PD) through first opening 220 and to a power sourcing equipment (PSE) through second opening 240, such that the PD may request power from PSE over Ethernet cables.

A circuit 230 (e.g., a printed circuit), as shown in FIG. 2C, may be housed in hood 204 of network cable connector 200. Printed circuit 230 may have a similar layout, circuitry, and/or functionality as printed circuit 500 shown and described with reference to FIG. 5 or a printed circuit 1400 as shown and described with reference to FIG. 14A. For example, printed circuit 230 can be configured to receive energy (e.g., 182) from and communicate data (e.g., 184) with a mobile device (e.g., 102). Circuit 230 (e.g., a printed circuit) may include a flex circuit and/or a circuit included in a printed circuit board. In a particular implementation, printed circuit 230 includes a flexible circuit or flex circuit that is affixed to and/or molded into hood 204.

An array of contact pins 228 may be coupled to printed circuit 230 and configured to be connected to a plug received via opening 220. In some embodiments, contact pins 228 may include 8 pins, making network cable connector 200 compatible with 8P8C connector interfaces, such as RJ-45, RJ-48, or RJ-61 interfaces. In some embodiments, contact pins 228 may include 10 pins, making connector 200 compatible for 10P10C connector interfaces, such as RJ-50 interfaces.

Connector 200 may also include a switch 224 incorporated into hood 204. As shown, switch 224 is exposed to first opening 220. In some embodiments, switch 224 may be configured to be easily detached from hood 204 and replaced. For example, switch 224 may be a modular component (having electrical contacts) that can be physically coupled and decoupled to hood 204 (having corresponding electrical contacts). Switch 224 may include any type of switch, such as a wirelessly operated switch, a push button switch, a toggle switch, a manual switch, a magnetic switch, an electromechanical switch, etc., as illustrative non-limiting examples. In implementations in which switch 224 is a wirelessly operated switch, operation of switch 224 may be controlled via an infrared signal, a wireless protocol signal (e.g., infrared, Bluetooth, Zigbee, etc.). Additionally, in implementations in which switch 224 is a wirelessly operated switch, printed circuit 230 may include wireless communication/control circuitry.

Switch 224 may be coupled to printed circuit 230 and configured to connect one or more components of printed circuit 230 to another device, or disconnect such one or more components from the device. Switch 224 may be manually operated by pressing, for example, pressed with a finger or pressed by a plug when the plug is inserted into first opening 220. The connecting and/or disconnecting of one or more components of the printed circuit via the operation of switch 224 is similar to the operation of switch (e.g., FET) in FIG. 14A described below. In some implementations, switch 224 may be positioned on hood 204 outside of first opening. To illustrate, switch 224 may be located on surface 292 of hood 204. In such an implementation, switch 224 may be manually actuated during insertion of a plug, via first opening 220, into network cable connector 200.

Network cable connector 200 may include a display 212 integrated into hood 204 and coupled to printed circuit 230. In some embodiments, display 212 may be configured to be easily detached from hood 204 and replaced. Display 212 may be a light emitting diode (LED) display, an alphanumeric display, or the like. Display 212 may be configured to display information relevant to network cable connector 200, such as connector operating status, IP address, MAC address, power status, type of equipment coupled to connector 200, location of a far end device, connector security settings, security lock-out status, etc. The information may be obtained by printed circuit 230 and then transmitted to display 212. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Referring at least to FIGS. 2G-2J, hood 204 includes multiple portions, such as a first portion 270, a second portion 272, and a third portion 274. Each of which is coupled together to form hood 204. As shown, second portion 272 includes one or more side latches 216 that are configured to engage third portion 274 to couple second portion 272 and third portion 274. First portion 270 may be coupled to or otherwise engaged with second portion 272, third portion 274, or both. As shown, second portion 727 includes a recess 266 configured to receive and engage a tab (or protrusion) of first portion 270 to couple first portion 270 to second portion 272.

Referring to FIG. 2G in which first portion 270 has been omitted and FIG. 2H in which first and second portions 270, 272 have been omitted, network cable connector 200 includes connectors 260 (e.g., clips) and dividers 262. Dividers 262 separate connectors 260 and define slots 264 configured to receive wires (e.g., conductors) of a network cable coupled to network cable connector 200 via second opening 240, as described at least with reference to FIGS. 2I-2J. Each connector 260 may be configured to be electrically coupled to and secure a corresponding wire of a network cable. In some implementations, connectors 260 may be configured such that when an insulated wire is inserted into a connector, the connector cuts/breaks the insulation of the wire and makes physical contact with a conductor of the insulated wire. In such implementations, an end of the insulated wire does not need to be prepared to remove a portion of the insulation to expose the conductor prior to inserting the insulated wire (e.g., the conductor) in slot 264. In some implementations, dividers 262 are included in second portion 272 and are configured to provide a non-conductive barrier between adjacent (e.g., neighboring) connectors 260. As shown, network cable connector 200 includes 8 connectors 260. Alternatively, in other implementations, network cable connector 200 may include more than 8 connectors or fewer than 8 connectors.

Referring to FIGS. 2I and 2J, a network cable 278 is coupled to network cable connector 200 via second opening 240. Network cable 278 may include or correspond to a network cable of FIG. 1, such as network cable 178. As shown in FIG. 2J, network cable 278 includes 8 wires 284-298. Each of the wires 284-298 is coupled to a different connector 260 of network cable 200. In some implementations, at least one of the wires 284-298 is configured to communicate power.

FIGS. 3A-3G depict an embodiment of a network cable connector 300 that may be used in the networked environment of FIG. 1 or other similar networked environment.

Figure 3A:
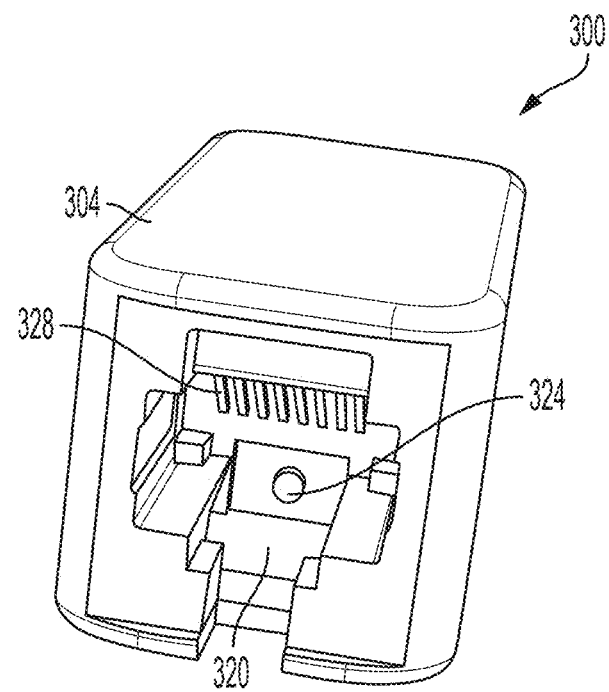
FIG. 3A illustrates a front, upper perspective view of a network cable connector according to one aspect of the present disclosure.
Figure 3B:
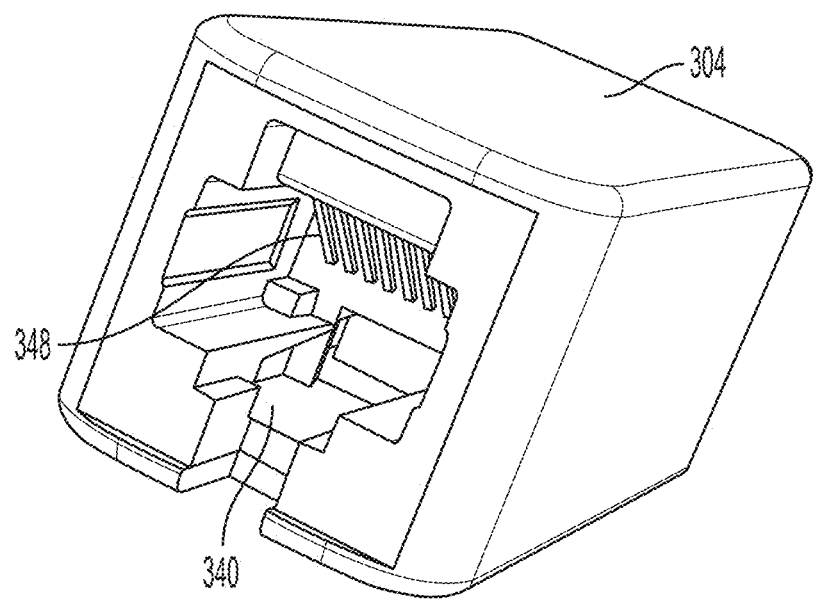
FIG. 3B illustrates a back, lower perspective view of a network cable connector according to one aspect of the present disclosure.
Figure 3C:
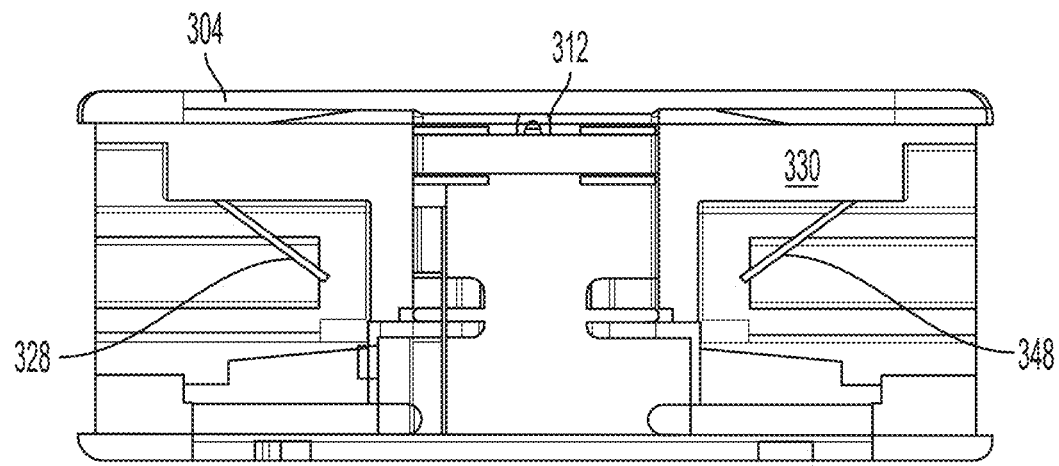
FIG. 3C illustrates a side cross-sectional view of a network cable connector according to one aspect of the present disclosure.
Figure 3D:
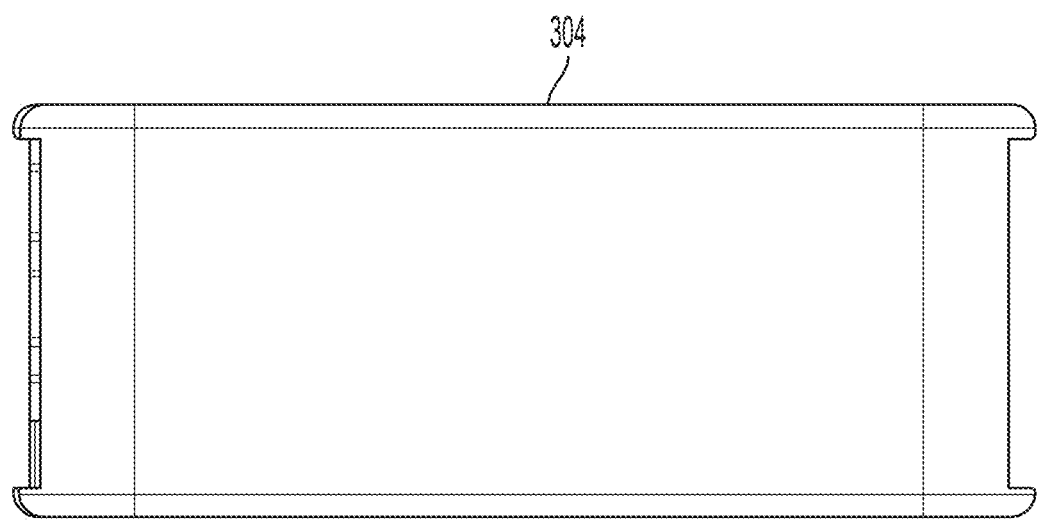
FIG. 3D illustrates a side view of a network cable connector according to one aspect of the present disclosure.
Figure 3E:
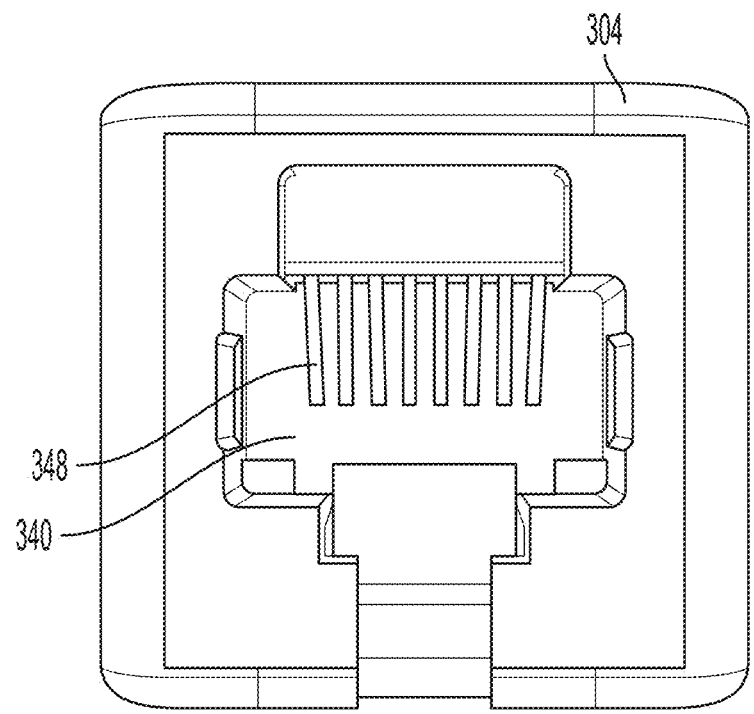
FIG. 3E illustrates a back view of a network cable connector according to one aspect of the present disclosure.
Figure 3F:
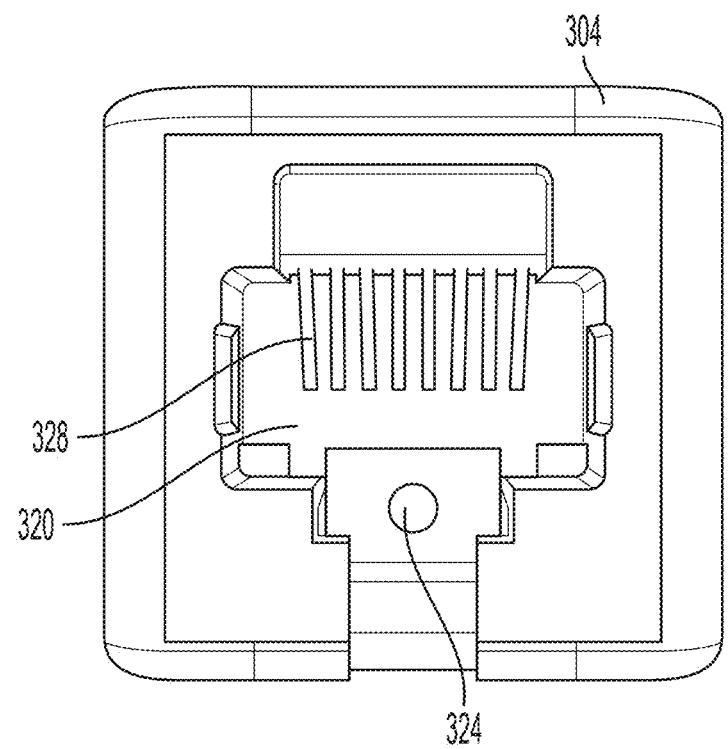
FIG. 3F illustrates a front view of a network cable connector according to one aspect of the present disclosure.
Figure 3G:
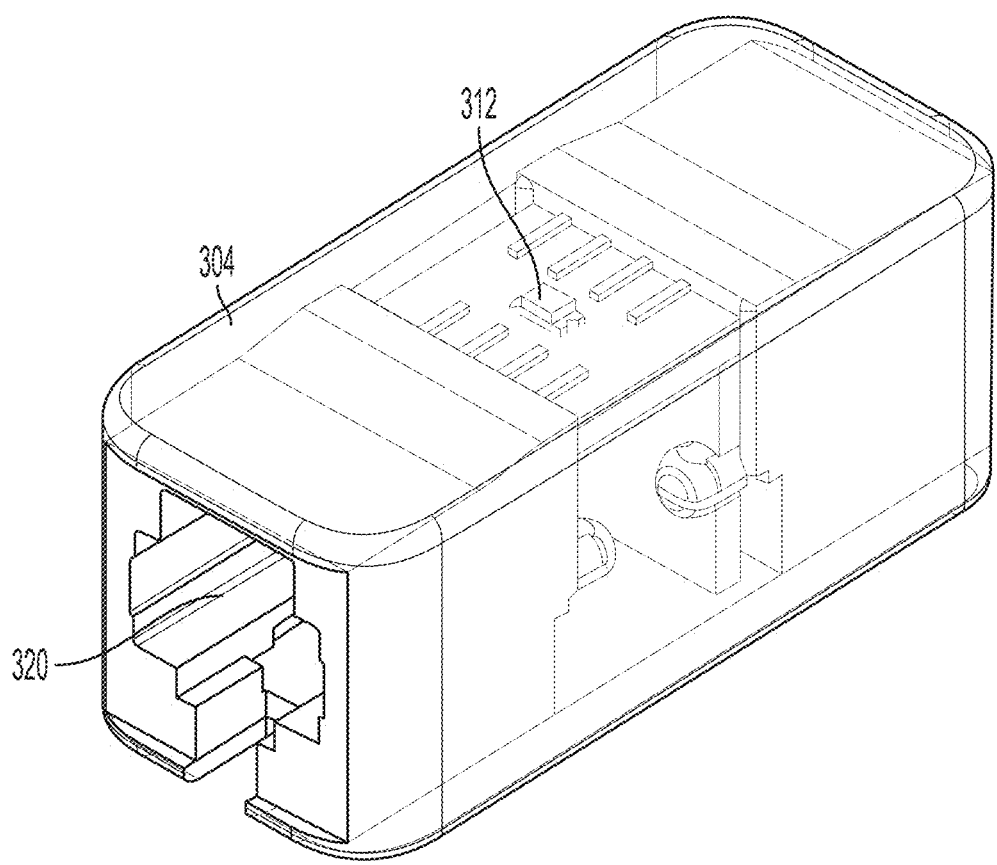
FIG. 3G illustrates a front, upper cross-sectional view of a network cable connector according to one aspect of the present disclosure.

FIGS. 3A-3G each illustrates a different view of network cable connector 300. FIG. 3A illustrates a front, upper perspective view, FIG. 3B illustrates a back, lower perspective view, FIG. 3C illustrates a side cross-sectional view, FIG. 3D illustrates a side view, FIG. 3E illustrates a back view, FIG. 3F illustrates a front view, and FIG. 3G illustrates a front, upper cross-sectional view. As shown, network cable connector 300 is configured as a coupler to couple two network cables. For example, network cable connector 200 may include or correspond to network cable connector 190 or 192 of FIG. 1.

As depicted in FIGS. 3A-3G, network cable connector 300 includes a hood 304 (e.g., a housing) with a first opening 320 and a second opening 340 deposed on two sides of network cable connector 300. Although first opening 320 and second opening 340 are shown as being on opposite sides of network cable connector 300, in other implementations, first opening 320 and second opening 340 may be positioned on adjacent sides or the same side of network cable connector 300.

First opening 320 and second opening 340 may each be configured to receive a plug, such as a network cable plug. A first array of contact pins 328 and a second array of contact pins 348 may be coupled to two different sides of printed circuit 330. First contact pins 238 may be exposed to first opening 320 and configured to be coupled to a plug inserted into first opening 320. Second contact pins 348 may be exposed to second opening 340 and configured to be coupled to a plug inserted into second opening 340. In some embodiments, first and contact pins 328, 348 may each include 8 pins, making network cable connector 300 compatible with 8P8C connector interfaces, such as RJ-45, RJ-48, or RJ-61 interfaces. In some embodiments, first and second contact pins 328, 348 may each include 10 pins, making network cable connector 300 compatible for 10P10C connector interfaces, such as RJ-50 interfaces. Thus, network cable connector 300 may configured to connect one device to another, like cable connectors 150, 160 on panel 120 or hubs 112, 116 described in FIG. 1.

Devices connected by network cable connector 300 may be external power sources, networking devices (such as routers, hubs, panels, etc.), computers, printers, storage devices, etc., as illustrative, non-limiting examples. For example, network cable connector 300 may be connected to a POE PD through first opening 320 and to a PSE through second opening 340, such that the PD may request power from PSE over Ethernet cables. In some implementations, first opening 320 may be designated and/or configured to be coupled to PSE and second opening 340 may be designated and/or configured to be coupled to PD. Alternatively, in other implementations, first opening 320 may be designated and/or configured to be coupled to PD and second opening 340 may be designated and/or configured to be coupled to PSE. In a particular implementation, network cable connector 300 is configured such that either of first opening 320 and second opening 340 may be coupled to PSE while the other is coupled to PD.

A printed circuit 330, as shown in FIG. 3C, may be housed in hood 304 of network cable connector 300. Printed circuit 330 may have a similar layout, circuitry, and/or functionality as printed circuit 500 shown and described with reference to FIG. 5 or a printed circuit 1400 as shown and described with reference to FIG. 14A. For example, printed circuit 330 can be configured to receive energy (e.g., 182) from and communicate data (e.g., 184) with a mobile device (e.g., 102). Printed circuit 330 may include a flex circuit and/or may be included in a printed circuit board. In a particular implementation, printed circuit 330 includes a flexible circuit or flex circuit that is affixed to and/or molded into hood 304.

Network cable connector 300 may also include a switch 324 incorporated into hood 304. As shown, switch 324 may be exposed to first opening 320. In some embodiments, switch 324 may be configured to be easily detached from hood 304 and replaced. For example, switch 324 may be a modular component (having electrical contacts) that can be physically coupled and decoupled to hood 304 (having corresponding electrical contacts). Switch 324 may include any type of switch, such as a wirelessly operated switch, a push button switch, a toggle switch, a manual switch, an electromechanical switch, etc., as illustrative non-limiting examples. In an implementation where switch 324 is a wirelessly operated switch, printed circuit 330 may include wireless communication/control circuitry.

Switch 324 may be coupled to printed circuit 330 and configured to connect one or more components of the printed circuit to another device, or disconnect such one or more components from the device. Switch 324 may be manually operated by pressing, for example, pressed with a finger or pressed by a plug when the plug is inserted into first opening 320. The connecting and/or disconnecting of one or more components of the printed circuit via the operation of switch 324 is similar to the operation of switch in FIG. 14A described below. In some implementations, switch 324 may be positioned on hood 304 outside of first opening. To illustrate, switch 324 may be located on surface of hood 304 that corresponds to opening 320 or on another surface of hood 304. In such an implementation, switch 224 may be manually actuated during insertion of a plug, via first opening 320 and/or second opening 340, into network cable connector 300.

In some implementations, network cable connector 300 may include a second switch (not shown) that is incorporated into hood 304. For example, the second switch may be exposed to second opening 340. In some embodiments, second switch may be configured to be easily detached from hood 304 and replaced. For example, second switch may be a modular component (having electrical contacts) that can be physically coupled and decoupled to hood 304 (having corresponding electrical contacts). Second switch may be coupled to printed circuit 330 and configured to connect one or more components of the printed circuit to another device, or disconnect such one or more components from the device. Second switch may be manually operated by pressing, for example, pressed with a finger or pressed by a plug when the plug is inserted into second opening 340. The connecting and/or disconnecting of one or more components of the printed circuit via the operation of second switch is similar to the operation of switch in FIG. 14A described below.

Network cable connector 300 may include a display 312 integrated into hood 304. In some embodiments, display 312 may be configured to be easily detached from hood 304 and replaced. In the depicted embodiment, display 312 is hidden under a surface of hood 304. Alternatively, display 312 may protrude above a surface of hood 304. Display 312 may be a light emitting diode (LED) display, an alphanumeric display, or the like. Display 312 may be configured to display information relevant to network cable connector 300, such as connector operating status, IP address, MAC address, power status, type of equipment coupled to connector 300, location of a far end device, connector security settings, security lock-out status, etc. The information may be obtained by printed circuit 330 and then transmitted to display 312. When display 312 is hidden under a surface of hood 304, the displayed information may be indicated by an on/off status, a color, a blinking pattern, or the like of display 312. Although network cable connector 300 is shown as having a single display 312, in other implementations, network cable connector 300 may include multiple displays.

Figure 4A:
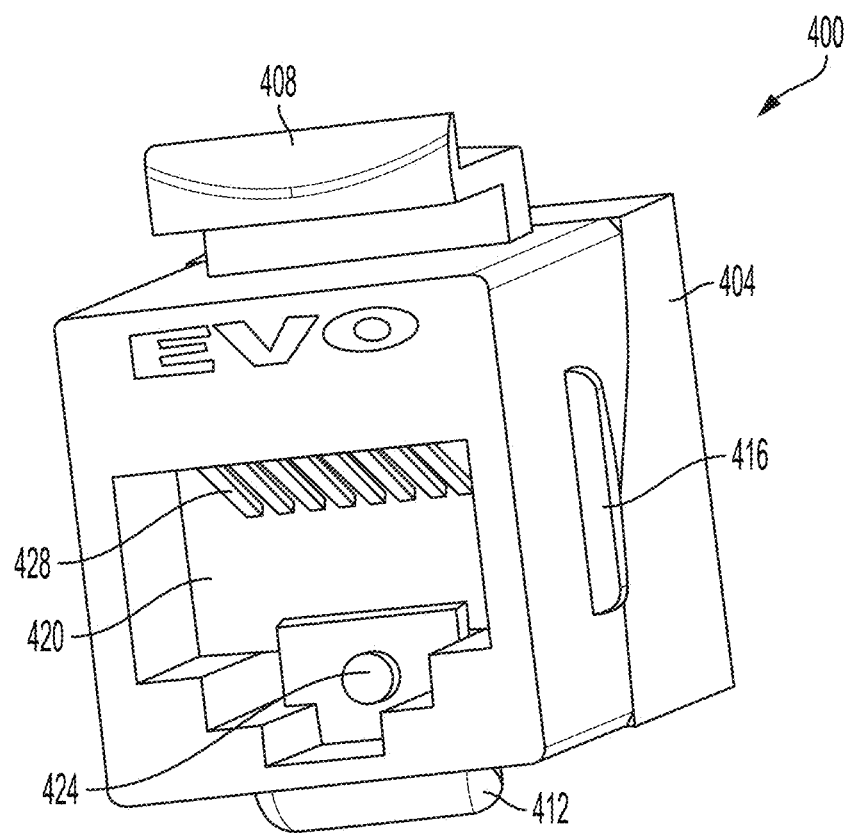
FIG. 4A illustrates a front, upper perspective view of a network cable connector according to one aspect of the present disclosure.
Figure 4B:
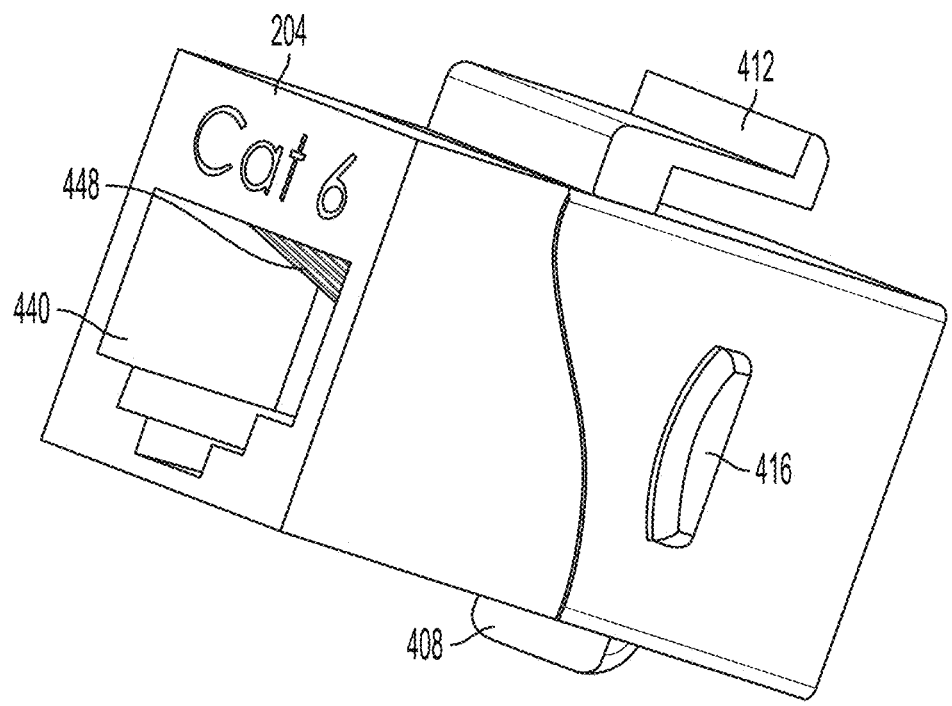
FIG. 4B illustrates a back, lower perspective view of a network cable connector according to one aspect of the present disclosure.
Figure 4C:
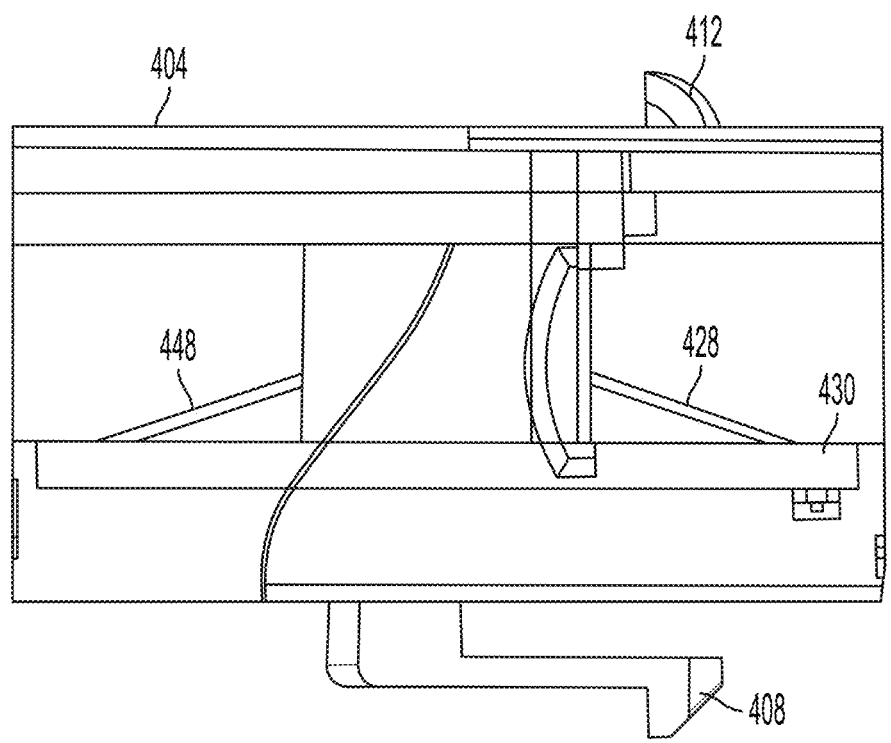
FIG. 4C illustrates a side cross-sectional view of a network cable connector according to one aspect of the present disclosure.
Figure 4D:
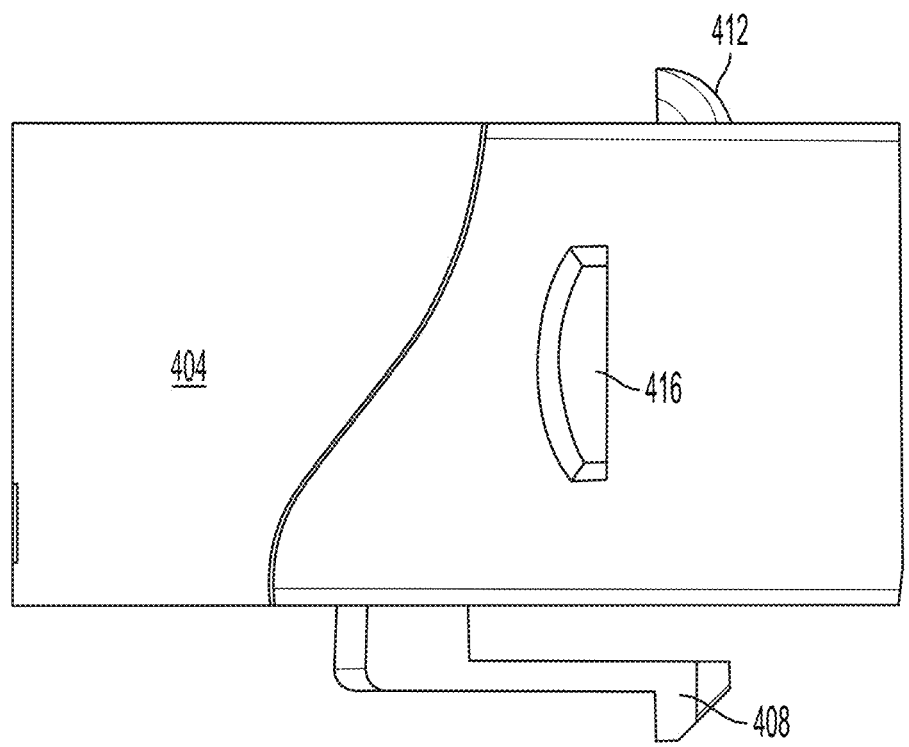
FIG. 4D illustrates a side view of a network cable connector according to one aspect of the present disclosure.
Figure 4E:
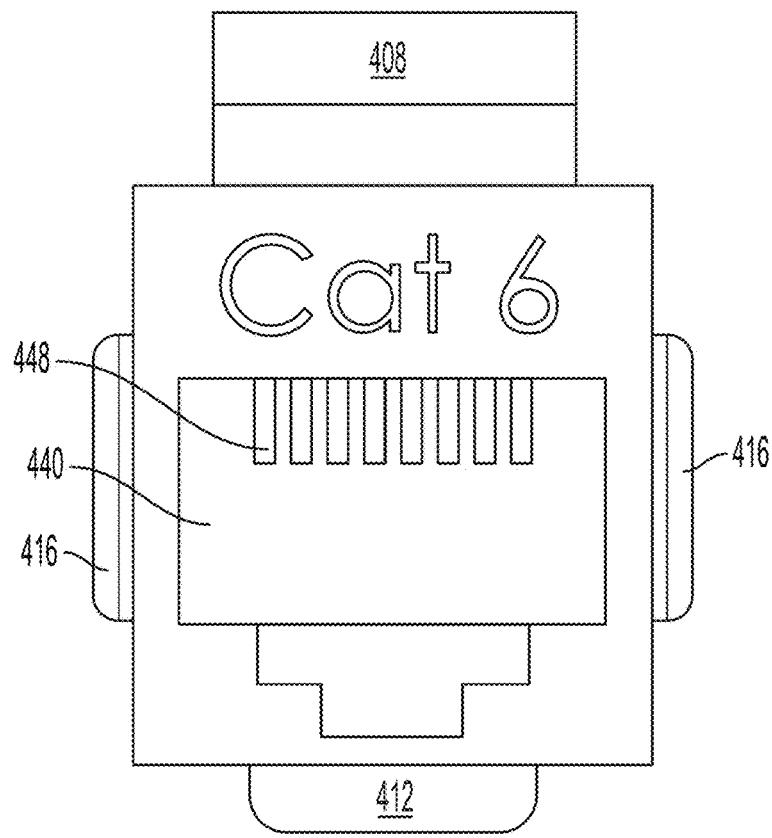
FIG. 4E illustrates a back view of a network cable connector according to one aspect of the present disclosure.
Figure 4F:
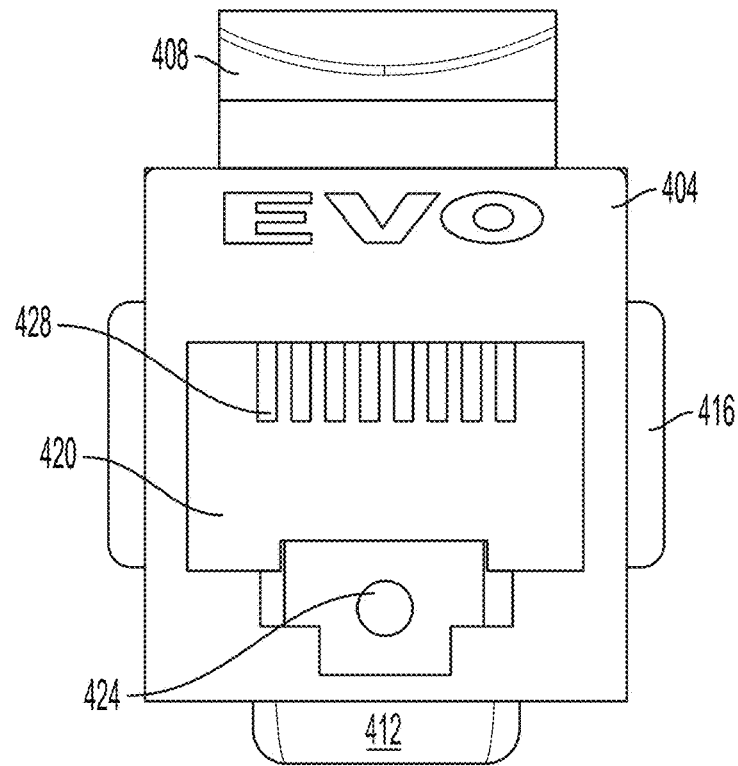
FIG. 4F illustrates a front view of a network cable connector according to one aspect of the present disclosure.

FIGS. 4A-4F depict an embodiment of a network cable connector 400 that may be used in the networked environment of FIG. 1 or other similar networked environment. FIGS. 4A-4F each illustrates a different view of network cable connector 400. FIG. 4A illustrates a front, upper perspective view, FIG. 4B illustrates a back, lower perspective view, FIG. 4C illustrates a side cross-sectional view, FIG. 4D illustrates a side view, FIG. 4E illustrates a back view, and FIG. 4F illustrates a front view. As shown, network cable connector 400 is configured as a coupler to couple two network cables. For example, network cable connector 400 may include or correspond to network cable connector 150, 160, 170, 190 or 192 of FIG. 1.

As depicted in FIGS. 4A-4F, connector 400 includes a hood 404 (e.g., housing) with a first opening 420 and a second opening 440 deposed on two sides connector 400. Although first opening 420 and second opening 440 are shown as being on opposite sides of network cable connector 400, in other implementations, first opening 420 and second opening 440 may be positioned on adjacent sides or the same side of network cable connector 400. In some implementations, network cable connector 400 may include or correspond to a keystone coupler.

First opening 420 and second opening 440 may each be configured to receive a plug, such as a network cable plug. A first array of contact pins 428 and a second array of contact pins 448 may be coupled to two different sides of printed circuit 430. First contact pins 438 may be exposed to first opening 420 and configured to be coupled to a plug inserted into first opening 420. Second contact pins 448 may be exposed to second opening 440 and configured to be coupled to a plug inserted into second opening 440. In some embodiments, first and contact pins 328, 348 may each include 8 pins, making network cable connector 400 compatible with 8P8C connector interfaces, such as RJ-45, RJ-48, or RJ-61 interfaces. In some embodiments, first and second contact pins 428, 448 may each include 10 pins, making network cable connector 400 compatible for 10P10C connector interfaces, such as RJ-50 interfaces. Thus, network cable connector 400 may configured to connect one device to another, like cable connectors 150, 160 on panel 120 or hubs 112, 116 described in FIG. 1.

Devices connected by network cable connector 400 may be external power sources, networking devices (such as routers, hubs, panels, etc.), computers, printers, storage devices, etc., as illustrative, non-limiting examples. For example, network cable connector 300 may be connected to a POE PD through first opening 420 and to a PSE through second opening 440, such that the PD may request power from PSE over Ethernet cables. In some implementations, first opening 420 may be designated and/or configured to be coupled to PSE and second opening 440 may be designated and/or configured to be coupled to PD. Alternatively, in other implementations, first opening 420 may be designated and/or configured to be coupled to PD and second opening 440 may be designated and/or configured to be coupled to PSE. In a particular implementation, network cable connector 400 is configured such that either of first opening 420 and second opening 440 may be coupled to PSE while the other is coupled to PD.

In some embodiments, network cable connector 400 may be configured as a wall jack (e.g., receptacle). For example, network cable connector 400 may be attached to a plate (e.g., 194). Network cable connector 400 may include a clip 408 configured to lock the connector when inserted into a wall plate or other devices, such as a hub, a router, a panel, etc. Network cable connector 400 may further include one or more side latches 416 to secure the connector to another device, such as a wall plate, a panel, a hub, etc.

A printed circuit 430, as shown in FIG. 4C, may be housed in hood 404 of network cable connector 400. Printed circuit 430 may have a similar layout, circuitry, and/or functionality as printed circuit 500 shown and described with reference to FIG. 5 or a printed circuit 1400 as shown and described with reference to FIG. 14A. For example, printed circuit 430 can be configured to receive energy (e.g., 182) from and communicate data (e.g., 184) with a mobile device (e.g., 102). Printed circuit 430 may include a flex circuit and/or may be included in a printed circuit board. In a particular implementation, printed circuit 430 includes a flexible circuit or flex circuit that is affixed to and/or molded into hood 404.

Network cable connector 400 may also include a switch 424 incorporated into hood 404. As shown, switch 424 may be exposed to first opening 420. In some embodiments, switch 424 may be configured to be easily detached from hood 404 and replaced. For example, switch 424 may be a modular component (having electrical contacts) that can be physically coupled and decoupled to hood 204 (having corresponding electrical contacts). Switch 424 may include any type of switch, such as a wirelessly operated switch, a push button switch, a toggle switch, a manual switch, an electromechanical switch, etc., as illustrative non-limiting examples. In an implementation where switch 424 is a wirelessly operated switch, printed circuit 430 may include wireless communication/control circuitry.

Switch 424 may be coupled to printed circuit 430 and configured to connect one or more components of printed circuit 430 to another device, or disconnect such one or more components from the device. Switch 424 may be manually operated by pressing, for example, pressed with a finger or pressed by a plug when the plug is inserted into first opening 420. The connecting and/or disconnecting of one or more components of the printed circuit via the operation of switch 424 is similar to the operation of switch in FIG. 14A described below. In some implementations, switch 224 may be positioned on hood 204 outside of first opening. To illustrate, switch 224 may be located on surface 292 of hood 204. In such an implementation, switch 224 may be manually actuated during insertion of a plug, via first opening 220, into network cable connector 200.

Network cable connector 400 may include a display 412 integrated into hood 404 and coupled to printed circuit 430.

In some embodiments, display 412 may be configured to be easily detached from hood 404 and replaced. Display 412 may be a light emitting diode (LED) display, an alphanumeric display, or the like. Display 412 may be configured to display information relevant to network cable connector 400, such as connector operating status, IP address, MAC address, power status, type of equipment coupled to connector 400, location of a far end device, connector security settings, security lock-out status, etc. The information may be obtained by printed circuit 430 and then transmitted to display 412. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Figure 5:
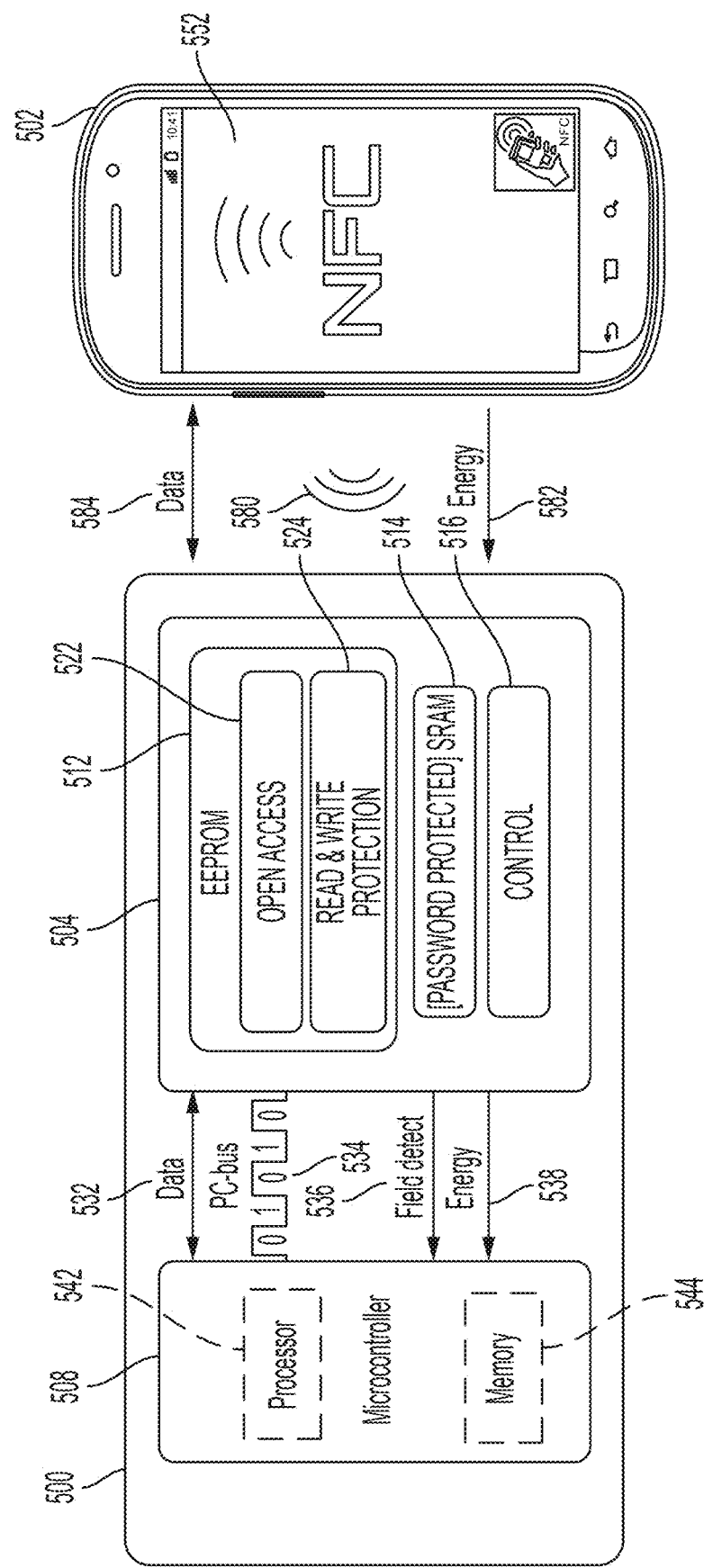
FIG. 5 illustrates a block diagram of a printed circuit for network cable connector according to one aspect of the present disclosure.

FIG. 5 illustrates a block diagram showing some components of printed circuit 500, which may be used in network cable connectors 200, 300, 400 described above in connection with FIGS. 2A-2F, 3A-3G, 4A-4F and network cable connectors described further herein at least with reference to FIGS. 10A-10B, 11A-11B, and 12A-12B. Printed circuit 500 may include a flex circuit and/or may be included in a printed circuit board. A flex circuit (e.g., a flexible printed circuit board) may include an insulating polymer film having one or more conductive circuit patterns affixed thereto and may include a coating (e.g., a polymer coating) to protect the conductor circuits. In a particular implementation, printed circuit 500 includes a flexible circuit or flex circuit that is affixed to and/or molded into a hood or plate.

Printed circuit 500 is configured to communicate with mobile device 502. Mobile device 502 may include or correspond to mobile device 102 of FIG. 1. In some implementations, mobile device 502 include an RFID device, such as an RFID reader. In a particular implementation, the RFID device corresponds to an NFC device, such as a NFC reader. In some such implementations, mobile device 502 includes one or more antennas, one or more inductors, or a combination thereof, to transmit data and/or energy to printed circuit 500. For example, mobile device 502 may inductively couple with printed circuit 500 and transmit power (e.g., energy 582) and data 584. To illustrate, an inductor of mobile device 502 generates an electric or magnetic field 580 which causes printed circuit 500 to receive power and/or data signals.

In the depicted embodiment, printed circuit 500 includes controllers 504, 508 connected to each other by a bus 534, such as a PC bus. The controllers 504, 508 are configured to send and receive data 532 from each other via the bus. In other implementations, controllers 504, 508 are integrated into a single controller. Controller 504, 508 may each include one or more processors and one or more memories, such as processor 542 and memory 544. To illustrate, a particular memory stores executable instructions and a particular processor coupled to the memory is configured to execute the instructions to perform and/or initiate one or more operations associated with the network cable connector that includes the printed circuit 500. In other implementations, printed circuit 500 may include one or more other processors, microprocessors, controllers, microcontrollers, and/or ASICs.

In some implementations, controller 504 is configured to detect an electric or magnetic field and harvest energy from the electric or magnetic field. To illustrate, when the electric field generated by the mobile device is adjusted or fluctuates, voltage (and thus current) are induced in an inductor of the printed circuit 500. Additionally, or alternatively, controller 504 is configured to generate and process a data signal from the electric or magnetic field. For example, controller 504 includes filters and/or analog processing circuitry to convert signals from an antenna/inductor to into data (e.g., first data). In some implementations, controller 504 is further configured to transmit data (e.g., second data) to mobile device 502. The data (e.g., second data) transmitted back to the mobile device 502 may be sent responsive to first data sent from the mobile device 502.

In some implementations, controller 508 is configured to receive data (e.g., first data) from controller 504 and to process the data to provide output data (e.g., second data) or adjust settings. For example, the first data may include or correspond to a request for information, and the controller 508 is configured to generate or retrieve the second data and to provide the second data to controller 504 for transmission or display. As another example, the first data may include or correspond to a parameter adjustment command, and the controller 508 is configured to adjust a component of the printed circuit 500 or the networked environment based on the first data. For example, a device can be adjusted by printed circuit 500 coupled to a network cable that is connected to the device. To illustrate, adjusting the operation of the device and/or network cable includes adjusting a security access control, enabling or disabling Internet of Things (IoT) device access, turning off or on service (e.g., POE power), enabling or disabling read and/or write access, enabling or disabling read and/or write controls, or a combination thereof.

In a particular implementation, controller 504 includes an EEPROM 512 and an SRAM 514. For example, EEPROM 512 may include an open access portion 522 and a read/write protection portion 524. EEPROM 512 may be configured to control energy harvesting and/or field detection operations. For example, EEPROM 512 may be coupled to sensing circuitry and output a field detection signal 536 and/or harvest energy signal 538 based on a sense signal from the sensing circuitry. Additionally, or alternatively, the SRAM 514 may be a password protected SRAM 514. In some such implementations, a memory of controller 504 stores instructions configured to interpret and process data signals received from the antenna/inductor. The instructions may be stored in EEPROM 512, SRAM 514, or both.

In some implementations, controller 504 includes control 516 Control 516 is configured to store firmware for implementing application logic or instructions of controller 504. Control 516 may include a command interpreter, anti-collision sequences, arbiter/state registers, a memory interface, etc.

Printed circuit 500 includes an antenna (not shown) coupled to one or more of controllers 504, 508, such as controller 504, and configured to communicate with mobile device 502. In some implementations, the antenna includes or corresponds to an electromagnetic radiation antenna (e.g., a dipole antenna) and is configured to radiate electromagnetic radiation signals. In some such implementations, the antenna is configured to enable Far Field RFID communications. In other implementations, the antenna includes or corresponds to one or more inductors and is configured to inductively/magnetically couple with the mobile device 502 to receive and/or transmit data, and optionally receive power from the mobile device 502. In some such implementations, the antenna is configured to enable Near Field RFID communications, such as NFC type communications.

In some implementations, printed circuit 500 includes a display (not shown) configured to output information. For example, the display may include or correspond to a light emitting diode (LED) or a liquid crystal display (LCD) and is configured to output information about a networked environment (and/or components thereof) that includes the printed circuit 500 or is coupled of the printed circuit 500. In some implementations where the display is an LED, the controllers 504 or 508 may be configured to adjust operation of the LED to output information. For example, the controllers 504 or 508 are configured to cause the LED to blink and indicate a code or status of a component of the networked environment.

In some implementations, printed circuit 500 includes or is coupled to a power supply or a direct current power source. For example, printed circuit 500 can be coupled to a PSE, a PSE POE, coupled to an external battery, include an internal battery, or a combination thereof. Additionally, or alternatively, printed circuit 500 includes a power management unit (not shown) configured to receive the power signal from the inductor(s) and to provide power to one or more components of printed circuit 500. For example, the power management unit is configure to provide power to controllers 504, 508 to enable operation of controllers 504, 508, such as processing of data signals, transmission of data, etc.

In some implementations, the power management unit includes a converter or a rectifier and is configured to convert an AC signal received from the inductor to a DC signal. Additionally, or alternatively, the power management unit is configured to condition the power signal for use in the printed circuit 500. For example, the power management unit is configured to adjust a voltage and/or current of the power signal and to provide an adjusted power signal to the controllers 504, 508. In some such implementations, where printed circuit 500 includes a battery, the power management unit may be configured to charge (e.g., slow charge or trickle charge) the battery based on the power signal(s) received from the inductor.

In some implementations where printed circuit 500 includes an antenna, printed circuit 500 may further include an inductor. For example, the inductor may be coupled to controller 504 and is configured to receive wireless energy and generate the power signal. To illustrate, inductor 520 generates current/voltage when exposed to an electric field generated by the mobile device 502, and provides the current/voltage to controller 504, or the power management unit, or both.

In some implementations, printed circuit 500 may be connected to a power over Ethernet (POE) power sourcing equipment (PSE), such as via contact pins. Printed circuit 500 may be complaint with POE standards or technical specifications such as IEEE 802.3af, IEEE 802.3.at, Cisco Inline Power, etc., and configured to draw power from a POE PSE. When incorporated into a network cable connector (such as network cable connectors 200, 300, 400), the power drawn from a POE PSE by printed circuit 500 may be consumed wholly or partly by the network cable connector (e.g., by printed circuit 500 and/or display 552) and/or an external powered device (PD) connected to network cable connector (e.g., via an opening of the network cable connector). A switch of the printed circuit 500 may connect or disconnect one or more components of printed circuit 500 to or from the mobile device, the POE PSE, or both.

When the network cable connector including printed circuit 500 is active (e.g., powered by an electrical field generated by the mobile device 502), at least one of controllers 504, 508 may be configured to obtain information relevant to the connector and communicate all or part of the information wirelessly to the mobile device 502, display all or part of the information on display 552, or a combination thereof. Such information may include operating status, IP address, MAC address, power status (e.g., whether POE is connected or other types of power source is connected), type of equipment connected to the connector, location of far end, connector security settings, security lock-out status, etc.

A network cable connector including printed circuit 500 (such as network cable connectors 200, 300, 400) may be operated as follows. The following example is described based on network cable connector 200 with printed circuit 500. Mobile device 502 generates an electric or magnetic field 580 to transmit data and optionally power. Antenna/inductor of printed circuit 500 generates a data signal based on the electric or magnetic field 580 and provides the data signal to controller 504. Controller 504 receives power from a power source and uses the power to power components thereof to process the data signal. Controller 504 generates data (e.g., first data) from processing the data signal, and provides the data to controller 508. Controller 508 receives power from the power source and processes the data using the power. Based on processing the data, controller 508 can activate or control display 552. For example, controller 508 provides second data to controller 504 configured to cause controller 504 to operate display 552. To illustrate, controller 504 may supply power to display 552 intermittently to cause display (e.g., an LED) to flash. As another example, controller 508 provides power to display 552 to operate display 552. Because mobile device generates an electric field 580, multiple printed circuits 500 in the electric field 580 may output information via a corresponding display. Thus, printed circuit 500 enables identification of one or more components without having to physically access the components or disconnect the components. Additionally, the display can be powered by a remote device, and thus a battery coupled to the printed circuit can be reduced or eliminated.

Additionally, or alternatively, based on processing the data, controller 508 can initiate transmission of data to mobile device 502. For example, controller 508 sends second data to controller 504 configured to cause controller 504 to send a data signal to mobile device 502 via inductor 520. In some implementations, an application on the mobile device 502 is configured to generate passwords and/or communicate securely with printed circuit 500. For example, the printed circuit 500 may provide different levels of access (e.g., access and/or transmit different type of data) based on incoming data signals. To illustrate, the memory of controller 504 may be read only unless a password is provided. Thus, printed circuit 500 enables secure wireless communication of information of one or more components to mobile device 502.

In some implementations, when printed circuit 500 includes an inductor or another wireless power receiving means, the printed circuit 500 can be powered by the mobile device 502. Accordingly, maintenance and down time is reduced by not having to replace batteries. Additionally, a size of the printed circuit 500 may be reduced because the battery can be reduced in size or eliminated.

One or more printed circuits 500 may be included in a kit with one or more components of the networked environment 100. Thus, the printed circuit 500 may be coupled or affixed to any components of the networked environment 100 during setup or maintenance and provide the functionality and benefits described herein. Although printed circuit 500 is configured to communicate with a mobile device, such as directly with the mobile device 502, in other implementations, the printed circuit 500 may communicate with or be controlled, such as indirectly communicate with or be controlled by, a mobile device via another networking component, such as a panel or wall jack, as described further with reference to FIG. 6 and FIGS. 14A-14M.

Figure 6:
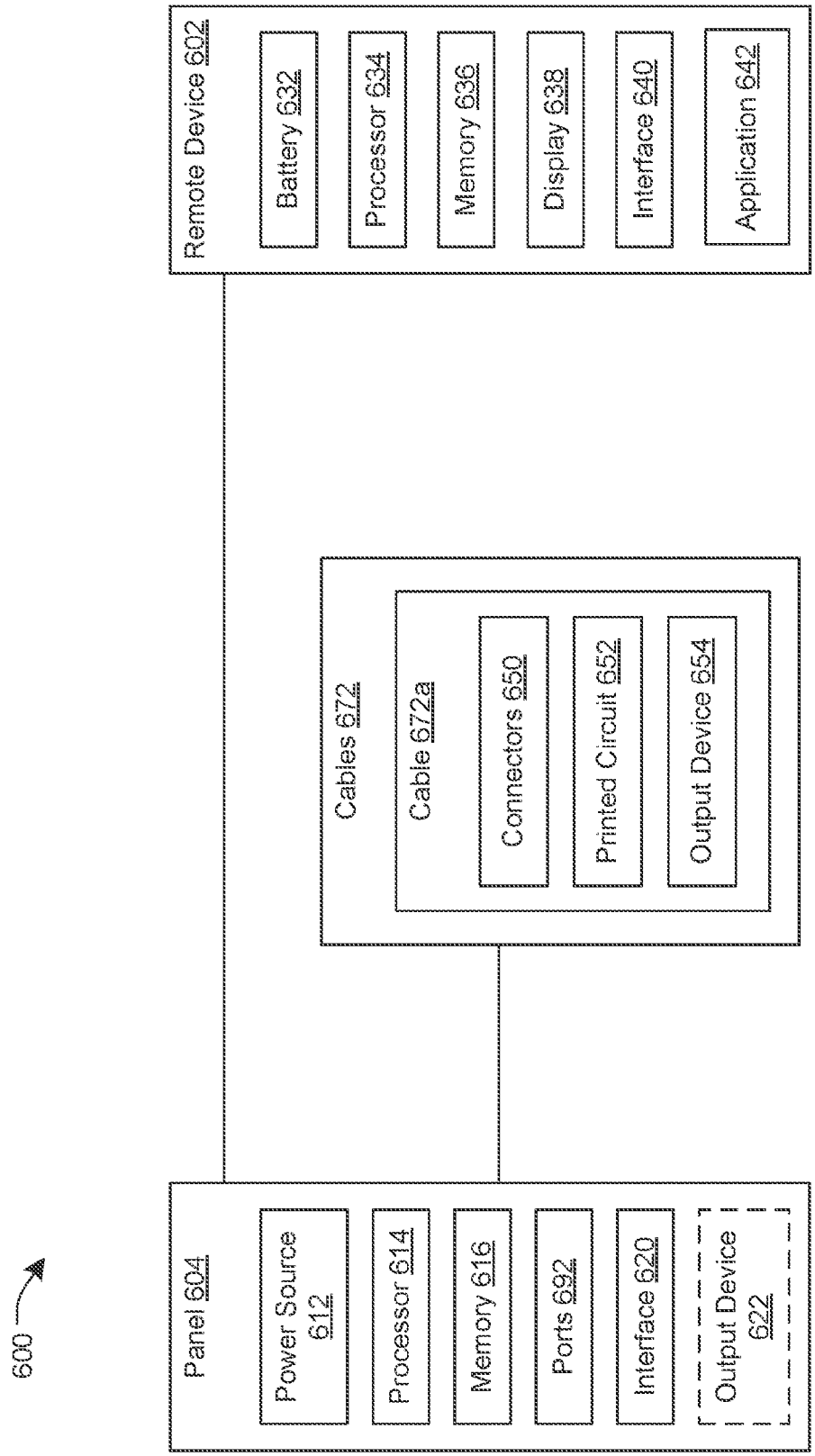
FIG. 6 illustrates a block diagram of a traceable networking system according to one aspect of the present disclosure.

FIG. 6 illustrates an example block diagram of a networking system, such as the networking system 100 of FIG. 1. In the example depicted in FIG. 6, networking system 600 includes a networking panel 604, a plurality of cables 672 connected to the networking panel 604, and a mobile device 602.

As illustrated in FIG. 6, the networking panel 604 includes or corresponds to a main patch panel, such as a router or a switch. In the example illustrated in FIG. 6, the networking panel 604 includes a power source 612, a processor 614, a memory 616, one or more ports 692, and an interface 620. In the example of FIG. 6, the interface includes a wireless communication interface and is configured to wirelessly communicate with mobile device 602. A controller (e.g., 614 and 616) of the networking panel 604 is further configured to communicate with cables 672 coupled to the networking panel 604 and optionally with other networking components (not shown in FIG. 6) coupled to the networking panel 604 via one or more of the cables 672, as further described with reference to FIG. 7.

A representative cable 672a of the cables 672 is illustrated in FIG. 6. Representative cable 672a includes one or more connectors 650, a printed circuit 652, and one or more output devices 654 (e.g., indicators). The connectors may include or correspond to the connectors described herein, such as a plug. The printed circuit 652 may include or correspond to the printed circuits described herein, such as printed circuit 500 and 1400 as illustrative examples. The output device or devices 654 may include or correspond to LEDs, displays, speakers, or a combination thereof. The output device or devices 654 are configured to output an indication responsive to control signal received via the networking panel 604.

The mobile device 602 includes a battery 632, a processor 614, a memory 616, a display 638, an interface 640, and an application 642. The display 638 may be configured to output a user interface (e.g., a GUI) generated by the application 642. Additionally, or alternatively, the application may include one or more user interfaces, such as a web-based interface/GUI, a UART interface (e.g., UART console), SNMP stats, etc. The application 642 may include or correspond to a desktop operating system application, a mobile operating system application, or both.

In some implementations, the networking panel 604 optionally includes an output device 622 similar to the output device or devices 654 of representative cable 672a. In such implementations, the networking panel 604 can output an indication in the alternative or in addition to an indication by the output device or devices 654 of representative cable 672a. In a particular implementation, a cable of the cables 672 may not include an output device and the output device 622 of the networking panel 604 is configured to enable cable tracing. The output device 622 of the networking panel 604 may include or correspond to a dual purpose indicator or a dedicated indicator. For example, a dual purpose indicator may include or correspond to an activity or Ethernet LED of a port of the networking panel 604. The activity or Ethernet LED may display indications for both traffic and tracing based on control signals from the mobile device 602. For dedicated indicators, each port may have a corresponding LED, separate from the activity or Ethernet LED, which outputs a visual indication (e.g., blinks, color, etc.). As another example, the output device 622 of the networking panel 604 may include a display which displays text or graphics to indicate cable tracing or cable tracing information.

In some implementations, the cables 672 (e.g., connectors of patch cord type cables) include multiple LEDs, such as multiple types of LEDS. For example, a patch cord may include an RGB or RGBW LED. Additionally or alternatively, the patch panel may include multicolor LEDs for each port. Additionally, or alternatively, the network panel 604 may include an additional indicator (e.g., a dedicated indicator) configured to indicate a diagnostic mode or tracing mode is enabled. Additionally, the additional indicator or a second additional indicator may indicate a powered-on status.

Figure 7:
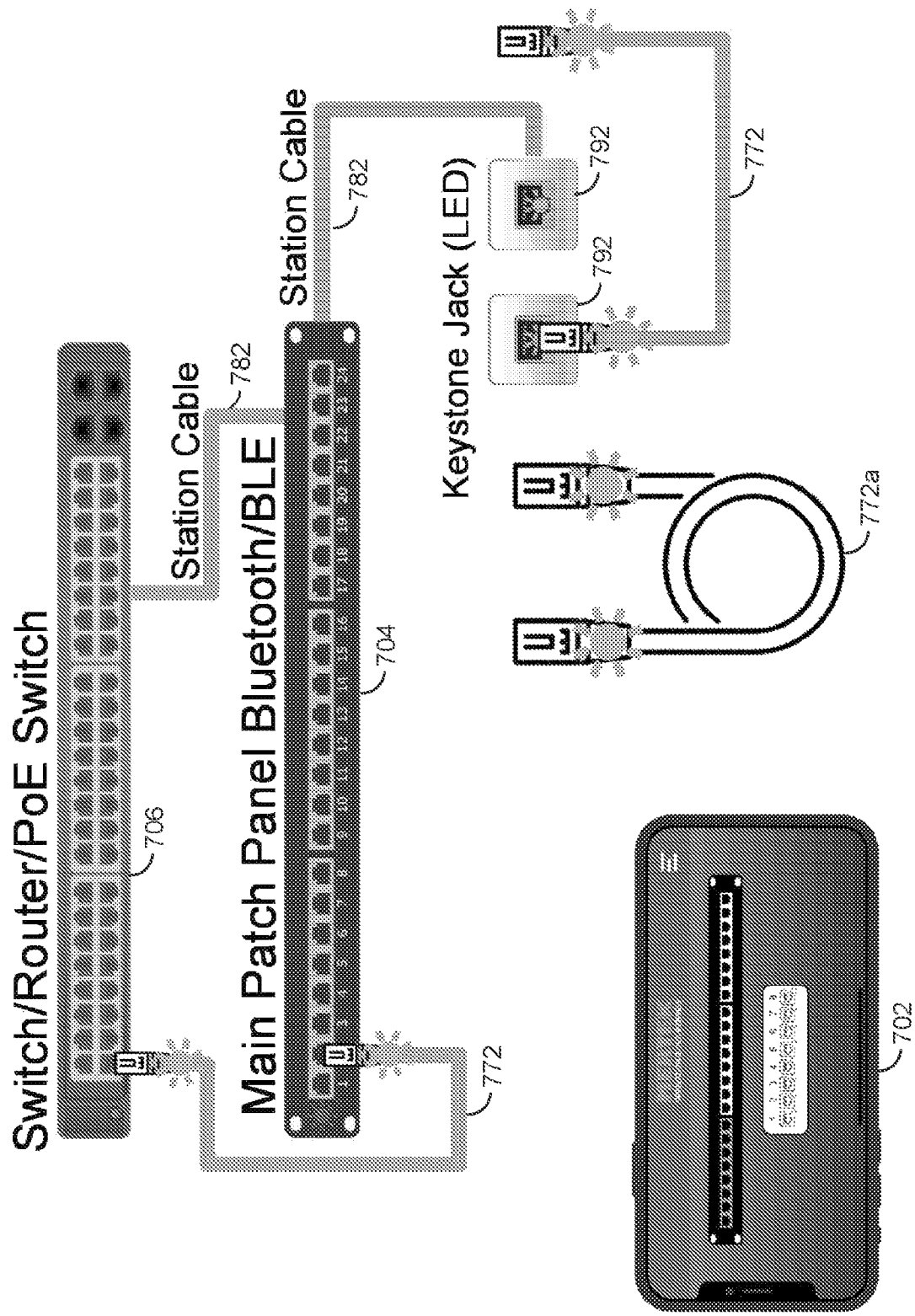
FIG. 7 illustrates a diagram of a traceable networking system according to one aspect of the present disclosure.

FIG. 7 illustrates an example diagram of a networking system, such as the networking system 600 of FIG. 6. In the example depicted in FIG. 7, networking system 700 includes a first networking panel 704, a second networking panel 706, keystone jacks 792, a plurality of station cables 782 connected to various components, and a mobile device 702. Additionally, networking system 700 includes a plurality of cables 772, such as representative patch cord 772a.

As illustrated in FIG. 7, first networking panel includes or corresponds to a main patch panel, such as a router or switch. In the example illustrated in FIG. 7, the first networking panel includes a wireless communication interface and controller and is configured to wirelessly communicate with mobile device 702. The first networking panel is further configured to communicate with cables coupled to the first networking panel and optionally with other networking components coupled to the first networking panel via the cables.

The second networking panel includes or corresponds to a secondary patch panel, such as a router or switch. In the example illustrated in FIG. 7, the secondary networking panel may optionally include a wireless communication interface and controller to communicate wirelessly with mobile device 702. Alternatively, the secondary networking panel includes a controller and is configured to be controlled via another networking component, such as first networking panel.

The plurality of station cables of the networking system are configured to coupled together one or more components of the networking system 700. Exemplary station cables are illustrated in FIG. 7 and couple the first and second networking panels together and the first networking panel to a keystone jack. The keystone jack may be include in a device or a housing. As an illustrative, non-limiting example, the keystone jack is coupled to or integrated into a wall plate.

The mobile device 702 is configured to wirelessly communicate with one or more networking components of networking system 700. For example, the mobile device 702 communicates with first networking panel to transmit commands or signals and optionally to receive network information and/or program the networking components.

As illustrated in the example of FIG. 7, the station cables, keystone jacks, and patch cables include visual indicators and are configured to output visual indications responsive to commands or signals generated by the mobile device and routed wirelessly via another networking components, such as the first or second networking panel.

With regards to the networking systems of FIGS. 6 and 7, the mobile device may include an application, such as an iOS or android application as illustrative examples, that wirelessly connects to a Bluetooth model of networking component to initiate operations, such as setup, diagnostic, and/or tracing operations. During operation, the application enables a user to select a panel and a one or more ports thereof via user inputs at the mobile device. Commands or control signals are generated based on the inputs and transmitted to the networking panel. The user then can generate indications based on the user inputs or additional user inputs. The indications may include individually flashing identification LEDs on a specific port or connector coupled to the port. The application may send periodic commands to the BLE module to turn on and off the digital IO and/or generate the indications (e.g., blinking or flashing action).

Exemplary circuit diagrams for the controller and wireless interfaces of the networking panel are illustrated and described with respect to FIGS. 14A-14M. An example networking panel may include a BLE wireless module with multiple (e.g., 8) digital output pins. Each digital output pin may be configured to control a switch, such as a FET. The digital output pin and switch (e.g., FET), may enable application of voltage and current to drive an indicator. For example, LED control pins on the panel port may be coupled to the digital output pins and controlled by the switch. The LEDs and BLE module may be powered by a power supply of the panel, an additional or external power supply (e.g., 5V AC/DC supply), or by wireless power delivery from the mobile device. Although the switch is described as a FET, the switch may include other types of switches, such as a transistor, a relay, etc., in other implementations.

In some implementations, a controller or processor (e.g., CPU) is configured to operate/control (e.g., drive) serial to parallel I/O expansion circuitry of or coupled to the networking panel. In a particular implementation, a central processor devices a shift chain or shift chain circuitry. As an illustrative, non-limiting example, the central processor drives the shift chain to drive an output control device, such as a FET. The output control device, such as the FET, controls or drives the output device or indicator, such as an LED. For example, the processor devices a power pin or contact of the LED via the shift chain and the FET. The shift chain or shift chain circuitry may enable the processor to drive a particular PET of a plurality of FETs, such as to drive a particular FET and LED of a 24 port panel.

In some such implementations, the networking panel may further include isolation circuitry configured to isolate the FET or LED driver from Ethernet circuitry or an Ethernet communication circuit. For example, the isolation circuitry may include one or circuit elements, such as switches, transistors, etc., and be coupled to or integrated with the networking panel. The isolation circuitry may enable the processor to couple and decouple the Ethernet circuitry from the LED. For example, in implementations where an existing or dual role LED is used to indicate Ethernet traffic/status and routing/identification information, the processor may selectively connect the corresponding control circuitry to the LED.

In some implementations where the networking panel causes an output device (e.g., LED) of a connected component, such as a patch cord, to generate an indication, the networking panel may provide power to the output device (e.g., LED). For example, the networking panel may use one or more data pins to provide power to the output device. To illustrate, the networking panel may provide low power or power pulses over the data pins such that an LED of the patch cord connect to the port receives the power and that data transmission is not interfered with. The data pins may include or correspond to data pins that are being used for data or that are dedicated/reconfigured for power delivery. That is, the data pins may correspond to contacts for twisted wire pins of the cable that are designed to transmit data. In a particular implementation, a traditional PoE PSE may not be utilized to send the power to the output device of the connected component or negotiate the power delivery to the output device of the connected component. Additionally, the connected component may not have PoE functionality and may not utilize the provided power to power any other connected devices. As another example, the networking panel may provide power via POE and may function as a PSE. In such implementations, the connected component may use the power to power the output device and other devices.

The processor is configured to output and adjust one or more indications via the output device in some implementations. For example, with reference to visual indicators or visual output devices, the processor may be configured to adjust or control one or more of LED color, blinking parameters (e.g., blink rate, blink pattern, blink period, blink duty cycle, etc.).

In some implementations, the memory of the networking panel and/or mobile device is configured to store user provided data about one or more of the ports of the networking panel or panels coupled to the CPU. In a particular implementation, the memory includes or correspond to an EEPROM.

The interface or interfaces of the networking panel may include one or more of a Bluetooth interface, a Bluetooth Low Energy interface, an Ethernet interface, a Wi-Fi (e.g., 802.11) interface, or a serial UART interface. The networking panel, such as a processor/controller thereof, ports thereof, or a processor/controller coupled thereto (e.g., a CPU of an external or peripheral device), may be coupled to the mobile device via one or more of the above interfaces. Additionally, or alternatively, the networking panel may be coupled to the processor/controller, when external to the networking panel, by one or more of the above interfaces.

In some implementations, the processor/controller may also include circuitry to enable expansion to multiple ports, enabling a single processor/controller to interface with a full rack of panels. For example, the processor/controller may include multipole interfaces and/or multiple types of interfaces to communicate with multiple ports and/or networking panels.

Although described in FIGS. 6 and 7 as part of the networking panel, the processor/controller may separate from the networking panel in other implementations. For example, when separate from the networking panel, the processor/controller may include or correspond to a computer coupled to the networking panel or a processor/controller of a dedicated device, such as a diagnostic or programing device, coupled to the networking panel. The dedicated device may be coupled to the networking panel via wires or wirelessly. When coupled by wires, the dedicated device may be coupled to a dedicate port (e.g., USB or proprietary port) or an existing port of the networking panel, such as an Ethernet port or USB port.

In some implementations, the processor/controller and/or circuitry of the networking panel or circuitry coupled thereto are powered by the power supply of the networking panel. In other implementations, the processor/controller and/or circuitry of the networking panel or circuitry coupled thereto are powered by a separate battery or separate power source (e.g., a separate AC/DC supply). Alternatively, the processor/controller and/or circuitry of the networking panel or circuitry coupled thereto are powered by PoE. In other implementations, the processor/controller may be powered by one power source (e.g., the networking panel's powers source) and one or more of the other circuitry is power by another power source or another type of power source (e.g., battery or PoE).

In some implementations, the networking panel may include circuitry configured to wirelessly power output devices of the cables, such as connectors thereof. For example, the networking panel may include inductive power transfer components configured to wirelessly deliver power to controllers and/or output devices of the cables. As an illustrative, non-limiting example, the networking panel includes one or more inductors (e.g., inductive coils), a controller, and a power source, and the controller is configured to generate power signals and transmit the power signals (e.g., AC energy/power) via the one or more inductors. One or more second inductors of the cable (e.g., a connector or hood thereof) may receive the power signals (e.g., AC energy/power) and deliver the power signals to an LED if the cable is configured to generate a visual output. In some such implementations, the power signals cause the LED to generate a visual output. In other such implementations, the power signals include or also correspond to data signals. For example, the data signals include data corresponding to parameters of a visual output of the LED. To illustrate, the data signals may indicate to blink the LEDs at a particular rate or pattern. Alternatively, the data signals, when used, may be transmitted by another inductor (e.g., an inductor different from the inductor used to generate the power signals) or an antenna. The inductors may include or correspond to one or more inductive coils or traces. Additional details on wireless power delivery are described with reference to FIG. 5.

Optionally, the networking system may enable the transfer or editing of network information and/or adjusting functionality in some implementations, For example, the application of the mobile device can receive stored port configurations of the networking panel. As another example, the application may send periodic commands about which port to enable or disable, adjust a blink rate, adjust a color, etc. In addition, user-specified port information may also be input into the application, transmitted to the networking panel, and stored at the networking panel.

In some implementations, the networking panel and/or application may include security applications and procedures. For example, the controller and application may utilize login credentials to authorize access or levels of access and may utilize encryption for stored data and/or wireless transmissions. The security procedures may be deactivated or disabled, when not desired, such as when the equipment is located in a secure area.

In some implementations, the cables are configured to determine identification information of a source or a destination of the cable, such as an interim or final destination. For example, the cable is configured to receive identification information from the switch or extract the identification information from the traffic itself, (e.g., perform packet inspection). An interim destination may include information indicating a particular network device (e.g., switch) and a port thereof where an end of the cable is coupled to. A final destination may include information indicating an address (e.g., MAC or IP) of a device coupled to a port which the cable is coupled to. In such implementations, the identification information may be displayed on the networking panel and/or communicated to the mobile device. For example, the identification information may be transmitted directly from the cable to the remote device. Alternatively, the identification information may be transmitted to the device via the networking panel or a CPU coupled thereto.

As illustrative examples of visual indications, LEDs may be turned on or off, LEDs may change colors or different color LEDs are chosen, blinking speed is controlled. In a particular example, the controller may cause LEDs of multiple ports/cables to be controlled at least partially simultaneously. For example, the controller may cause two cables to blink simultaneously with different patterns or different colors.

In some implementations, the application may enable additional functionality, such as enable a user to search or scroll through multiple patch panels and identify the multiple patch panels, support port and panel naming, enable securing and/or locking of ports, enable programing (physical) ports & patch cords to a specific (logical) port, programing jacks & patch cords to only to work with a specific patch cord enable remote access via wireless networks and/or the "Cloud," or a combination thereof.

In some implementations, the system may enable retrieval of information on the ports, such as retrieval from network component by remote device. Example of such retrievable information include DHCP information, such as IP address, IP mode, Netmask, gateway, etc. Additionally, or alternatively, ping information may be retrieved. For example, server ping, 123 ping, IP average time, etc. In some implementations, Wiremap information may be retrieved from network component by remote device. For example, Pair Status 1, 2, 3, 4, etc. Optionally, power over Ethernet PoE information may be determined and retrieved. For example, PoE status, PoE mode, A/B Peak voltages, etc. In some implementations, the system may enable retrieval of telecom standards, such as TIA 568A or 568B.

Although examples of visual indications have been described, the network component may output other types of indications. For example, the networking panel may include a speaker and the controller may cause the speaker to output auditory indications. As illustrative, non-limiting examples, the networking panel may output tone pairs, volume pairs, volume patterns.

It should also be noted that in some embodiments, the methods described below may not comprise every step set forth in the following flow chart. Rather, in some embodiments, the method described below may comprise a subset of the steps set forth in the flow chart and the steps may be in a different order than the order presented in the flow chart.

Figure 8:
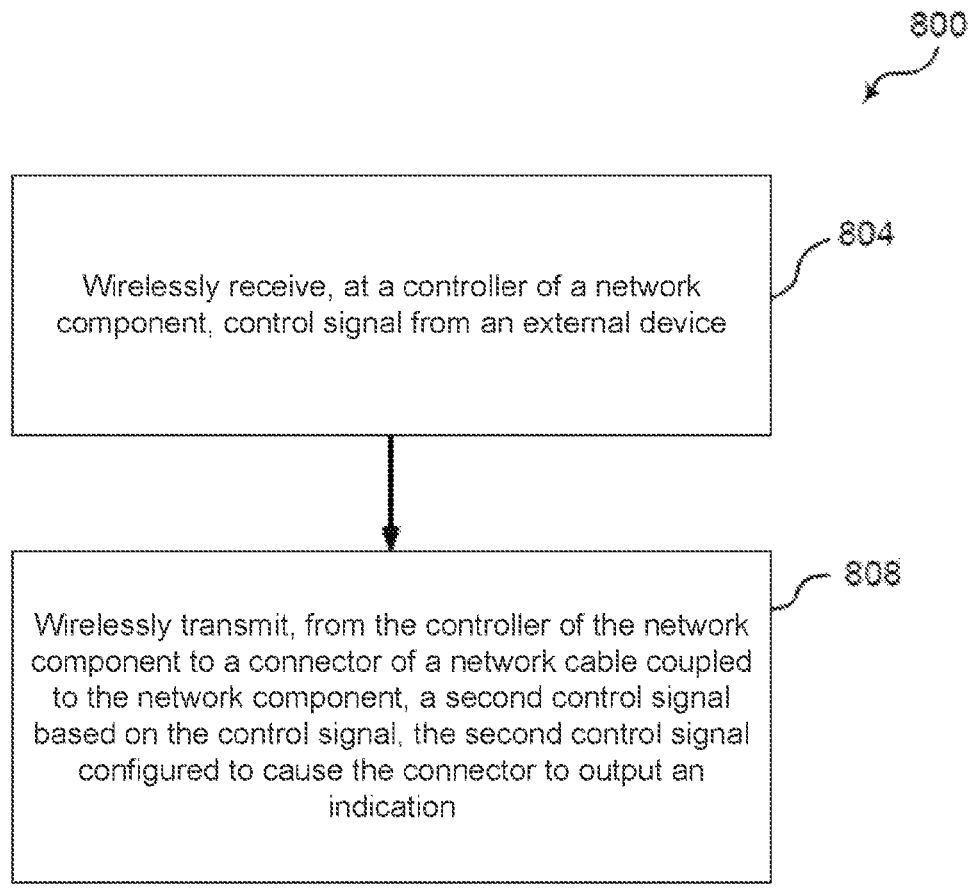
FIG. 8 illustrates a flow chart for operating a network cable according to one aspect of the present disclosure.

FIG. 8 illustrates one embodiment of a method 800 for operating a network (or networking) component according to one aspect of the disclosure. The network component may include or correspond to one of panel 120 (e.g., network panel, switch, router, etc.), a hub 112 or 116, and/or a network cable connector 190 or 192. In the depicted embodiment, step 804 wirelessly receives, at a controller of a network component, data from an external device. The controller may be coupled to a connector of a network cable in some implementations. Step 808 transmit, from the controller of the network component to a network cable coupled to the network component, a second control signal based on the control signal, the second control configured to cause the connector to output an indication.

In some embodiments, the networking component is configured to determine networking information relevant to the cable, receive networking information relevant to the cable from the connector, or both. In a particular implementation, the networking component wirelessly transmits the networking information to the external device (e.g., mobile device 102, 502, 602). Additionally, or alternatively, the connector may receive data indicating a command and may adjust operation of the network cable based on the command. To illustrate, a printed circuit of the connector may adjust which data the network cable transmits or may enable/disable access to a device coupled to the network cable.

Figure 9:
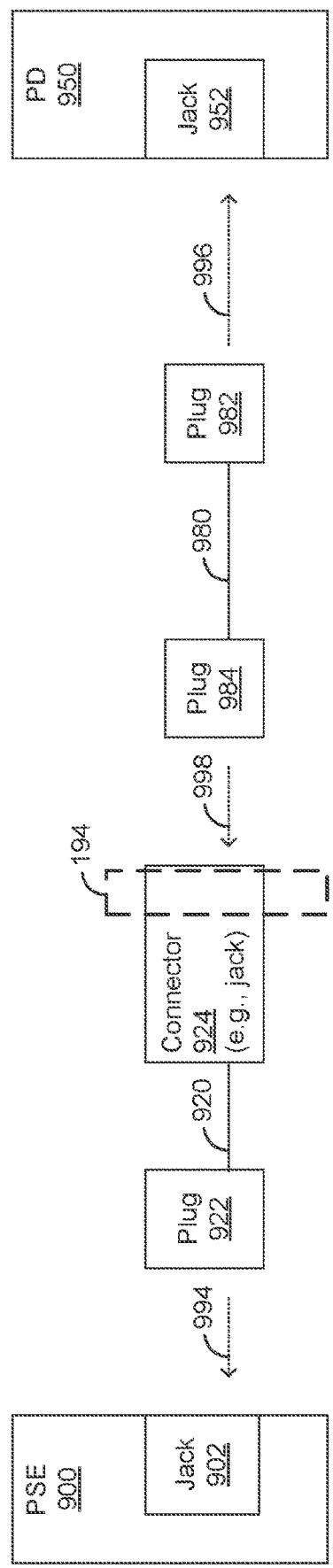
FIG. 9 illustrates a schematic view of another example of a networked computer environment.

Referring to FIG. 9, and example of a networked environment is shown. The networked environment may include or correspond to network environment 100. Network environment of FIG. 9 includes PSE 900 and PD 950. PSE 900 include jack 902 (e.g., network connector/interconnect) and PD 950 include jack 952 (e.g., network connector/interconnect).

A first network cable 920 includes include plug 922 (e.g., network connector/interconnect) and connector 924 (e.g., network connector/interconnect). First network cable 920 may include or correspond to network cable 178 or network cable 278. Connector 924 may include or correspond to network cable connector 190, 192, 200, or 400. In some implementations, jack 952 may include a coupler, such as network cable connector 300, into which a plug of network cable 920 is inserted. In some implementations, connector 924 is coupled (or mounted) to a plate (e.g., 194). For example, connector 924 may be coupled to or integrated with plate 194 as described further herein at least with reference to FIGS. 10A-10B, 11A-11B, and 12A-12B. A second network cable 980 includes plug 984 (e.g., network connector/interconnect) and plug 982 (e.g., network connector/interconnect). Second network cable 980 may include or correspond to cable 178 or cable 278.

In some implementations, one more of jacks 902, connector 924, and jack 952 may include a keystone jack. In implementations where connector 924 includes a coupler, connector 924 may include or correspond to a keystone coupler.

During operation, plug 922 is inserted into jack 902 as indicated by arrow 994. The connector 924 includes one or more components, such as a switch, a display, a printed circuit, and a connection hood (e.g., a hood). The connector 924, when coupled to PSE 900, may request and/or negotiate power with PSE 900.

Plug 982 of second network cable is inserted into jack 952 as indicated by arrow 996. After plug 982 is inserted in jack 952, plug 984 is inserted into connector 924, as indicated by arrow 998, while connector 924 is powered by PSE. Although described as plug 982 being plugged into jack 952 prior to plug 984 being plugged into connector 924, this is for illustration purposes only, and other sequences of coupling jacks, plugs, and connectors is possible.

A switch of the connector 924 may be operated such that at least one component of the connector 924 is disconnected from the PSE when plug 984 is connected to the cable connector. Disconnecting the at least one component may reduce the interference to the power negotiation between the PSE 900 and PD 950. The PSE 900 may then adjust the power to be supplied to the external PD 950. Because the circuitry (or a portion thereof) of the connector 924 is disconnected from the PSE 900 during power negotiation(s) between the PD 950 and PSE 900, the PSE 900 is able to determine/categorize a power need of the PD 950 without the circuitry (or portion thereof) of the connector 924. Therefore, disconnecting some components of the connector 924 from the PSE 900 (when coupling the PD 950 to the PSE) may allow the PSE to correctly classify the external PD. The PSE 900 may then adjust the power to be supplied to the external PD 950 according to the classification and power may be saved.

Further, disconnecting some components of connector 924 from the PSE 900 may allow the PSE 900 to correctly detect that external PD 950 has been disconnected from connector 924 (e.g., plug 984 is removed from connector 924 or plug 982 is removed from jack 952. To illustrate, the PSE 900 disconnects power to the PD 950 when the PSE 900 stops receiving a power signature from the PD 950 when the circuitry (or portion thereof, such as a resistor) of the connector 924 is in a disconnected state. If the circuitry (or portion thereof, such as a resistor) of the connector 924 were not disconnected (or otherwise bypassed) when the power signature from the PD 950 stops, the PSE 900 would continue to supply power to the connector 924 based on previous power negotiation between the PD 950 and the PSE 900.

Figure 10B:
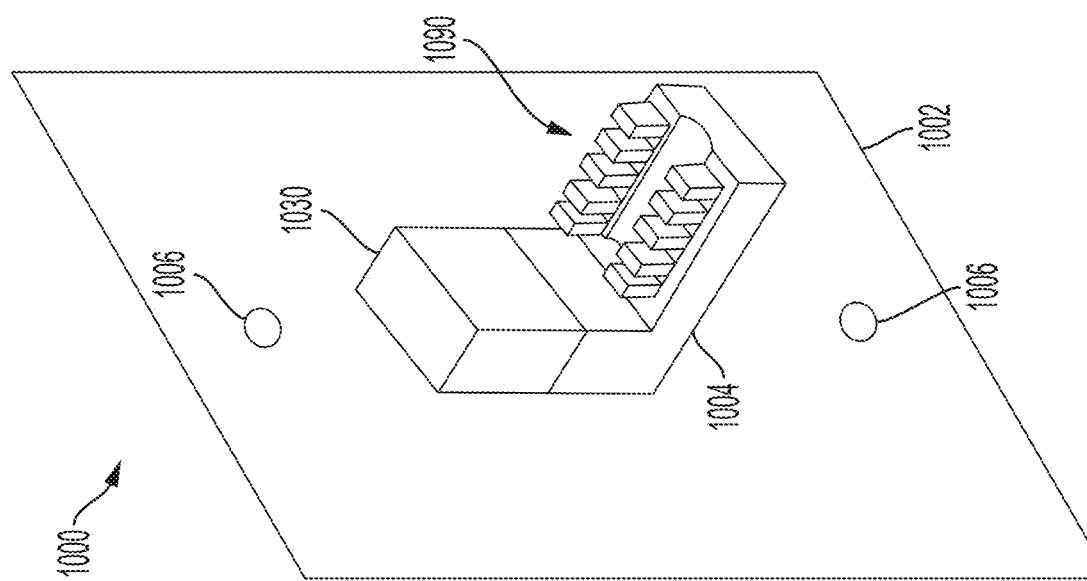
FIG. 10B illustrates a rear perspective view of the plate of FIG. 10A.
Figure 10A:
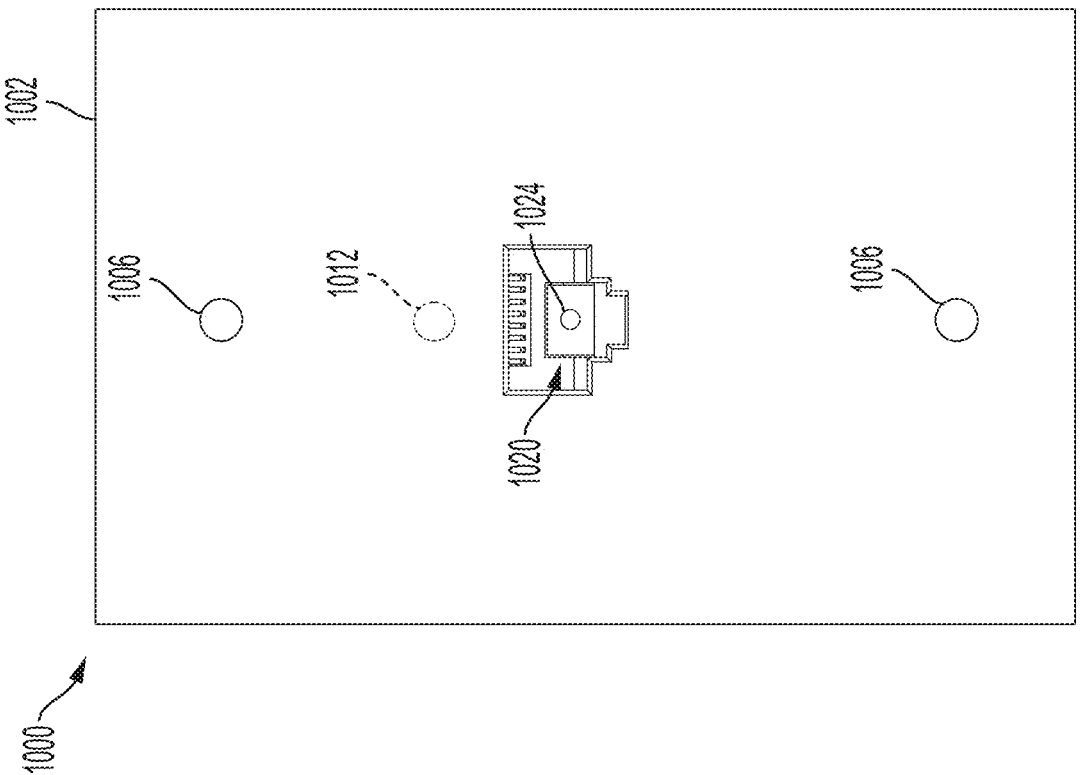
FIG. 10A illustrates a front view of a plate that includes a network cable connector according to one aspect of the present disclosure.

FIGS. 10A-10B depict an example of plate 1000 that includes a network cable connector, as described herein, that may be used in the networked environment of FIG. 1 or other similar networked environment. For example, plate 1000 may include or correspond to plate 194. FIGS. 10A-10B each illustrates a different view of plate 1000. FIG. 10A illustrates a front view and FIG. 10B illustrates a rear perspective view.

Plate 1000 includes a plate portion 1002 having mounting holes 1006 for mounting plate 1000 to a structure, such as a wall. Plate 1000 also includes an opening 1020 associated with a network cable connector. Opening 1020 is configured to receive and coupled to a network plug via contact pins of plate 1000. The pins of plate 1000 may include or correspond to contact pins 228, 328, 348, 428, 448, 528 as described herein. Plate 1000 may also include a switch 1024. Switch 1024 may include or correspond to switch 224, 324, 424, as described herein. Plate 1000 includes printed circuit 1030 which is coupled to switch 1024. Printed circuit 1030 may include or correspond to printed circuit 230, 330, 430, 500 as described herein. Plate 1000 may optionally (as indicated by dashed circle) include a display 1012. Display 1012 may include or correspond to display 212, 312, 412, 552, as described herein.

Plate 1000 also includes body 1004 that is coupled to plate portion 1002. In a particular implementation, plate portion 1002 and body 1004 may include a single unitary component. Plate 1000 also includes wire connectors 1090. The wire connectors 1090 may include or correspond to connectors 260 as described herein and may be configured to be coupled to a network cable, such as network cable 178. The wire connectors 1090 may be electrically coupled to pins of plate 1000 that are accessible to a plug via the opening 1020.

Figure 11B:
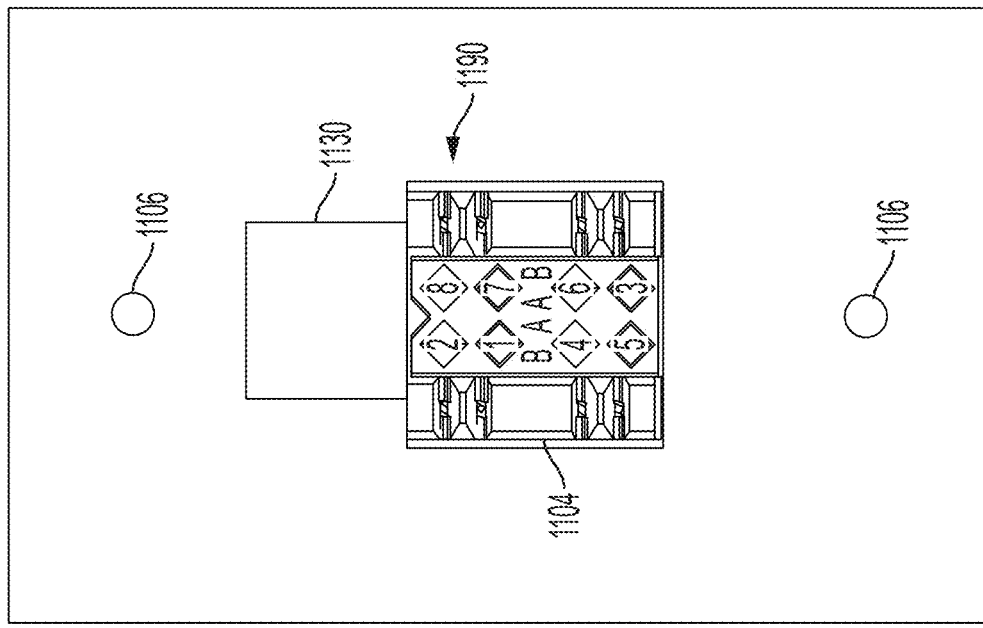
FIG. 11B illustrates a rear view of the plate of FIG. 11A.
Figure 11A:
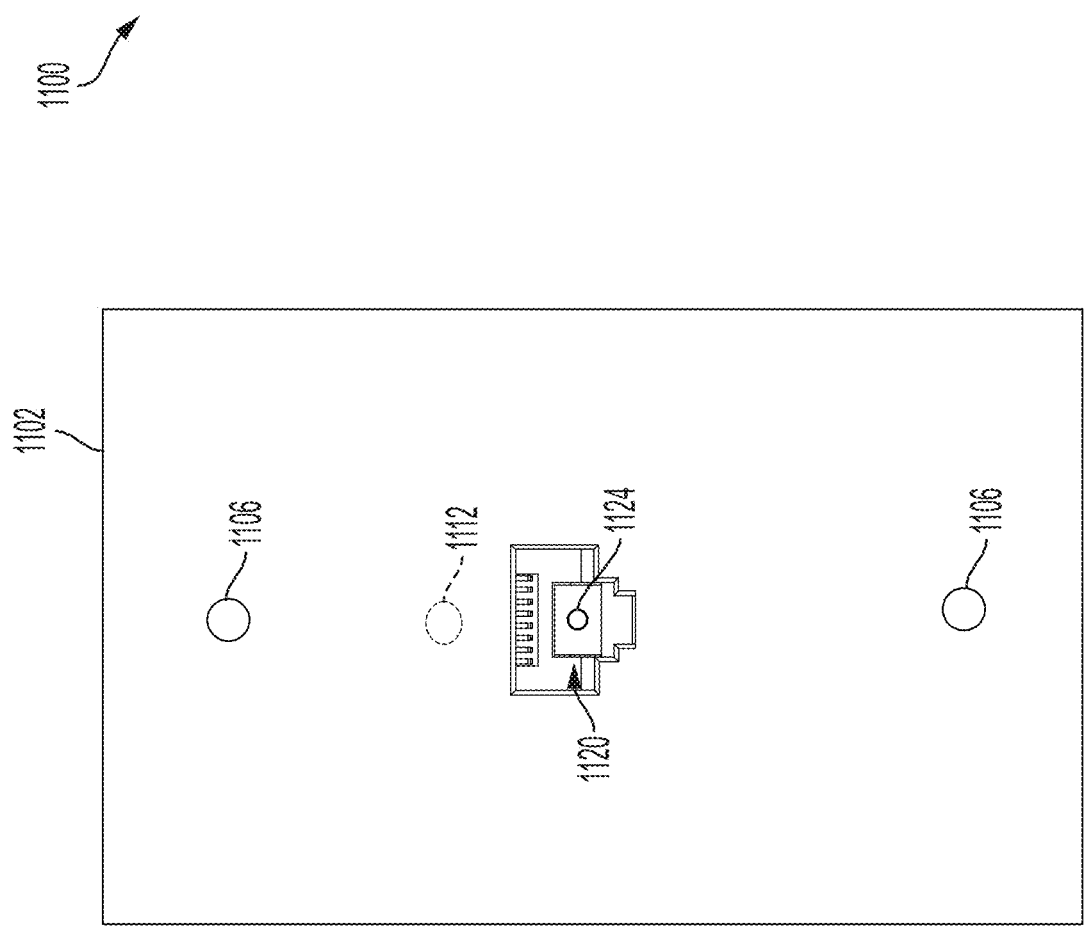
FIG. 11A illustrates a front view of a plate that includes a network cable connector according to one aspect of the present disclosure.

FIGS. 11A-11B depict an example of plate 1100 that includes a network cable connector, as described herein, that may be used in the networked environment of FIG. 1 or other similar networked environment. For example, plate 1100 may include or correspond to plate 194. FIGS. 11A-11B each illustrates a different view of plate 1100. FIG. 11A illustrates a front view and FIG. 11B illustrates a rear view.

Plate 1100 includes a plate portion 1102 having mounting holes 1106 for mounting plate 1100 to a structure, such as a wall. Plate 1100 also includes an opening 1120 associated with a network cable connector. Opening 1120 is configured to receive and coupled to a network plug via contact pins of plate 1100. The pins of plate 1100 may include or correspond to contact pins 228, 328, 348, 428, 448, 528 as described herein. Plate 1100 may also include a switch 1124. Switch 1124 may include or correspond to switch 224, 324, 424, as described herein. Plate 1100 includes printed circuit 1130 which is coupled to switch 1124. Printed circuit 1130 may include or correspond to printed circuit 230, 330, 430, 500 as described herein. Plate 1100 may optionally (as indicated by dashed circle) include a display 1112. Display 1112 may include or correspond to display 212, 312, 412, 552, as described herein.

Plate 1100 also includes body 1104 that is coupled to plate portion 1102. In a particular implementation, plate portion 1102 and body 1104 may include a single unitary component. Plate 1100 also includes wire connectors 1190. The wire connectors 1190 may include or correspond to connectors 260 as described herein and may be configured to be coupled to a network cable, such as network cable 178. The wire connectors 1190 may be electrically coupled to pins of plate 1100 that are accessible to a plug via the opening 1120.

Figure 12B:
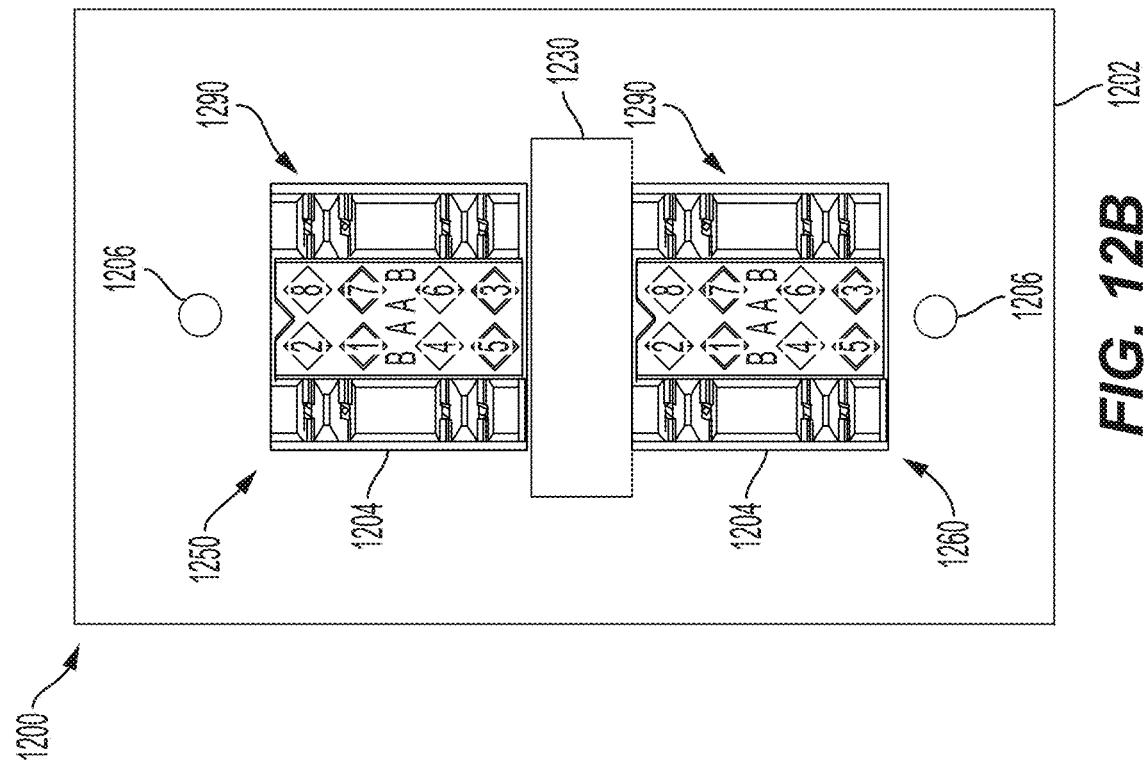
FIG. 12B illustrates a rear view of the plate of FIG. 12A.
Figure 12A:
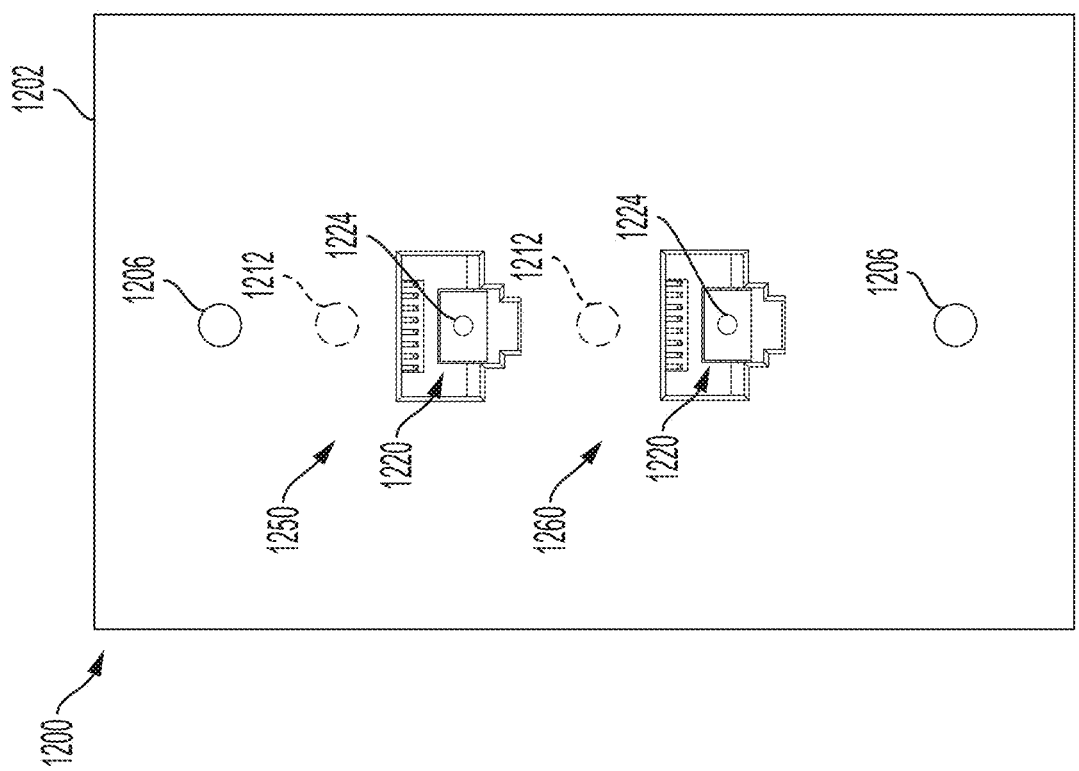
FIG. 12A illustrates a front view of a plate that includes a network cable connector according to one aspect of the present disclosure.

FIGS. 12A-12B depict an example of plate 1200 that includes multiple network cable connectors, as described herein, that may be used in the networked environment of FIG. 1 or other similar networked environment. For example, plate 1200 may include or correspond to plate 194. FIGS. 12A-12B each illustrates a different view of plate 1200. FIG. 12A illustrates a front view and FIG. 12B illustrates a rear view.

Plate 1200 includes a plate portion 1202 having mounting holes 1206 for mounting plate 1200 to a structure, such as a wall. As shown, plate 1200 include a first network connector 1250 and a second network connector 1260. Although plate 1200 is described as having two network connectors, in other implementations, plate 1200 may include more than two network connectors.

Each of the network connectors 1250, 1260 includes an opening 1220 associated with the network cable connector. Openings 1220 are each configured to receive and coupled to a network plug via contact pins of plate 1200. The pins of plate 1200 may include or correspond to contact pins 228, 328, 348, 428, 448, 528 as described herein. Each network connector 1250, 1260 may also include a switch 1224. Switches 1224 may include or correspond to switch 224, 324, 424, as described herein. Plate 1200 includes printed circuit 1230 which is coupled to each of switches 1224. Printed circuit 1230 may include or correspond to printed circuit 230, 330, 430, 500 as described herein. As shown, plate 1200 includes a single printed circuit 1230 that is configured for operation with each of network connectors 1250, 1260. Alternatively, plate 1200 may include multiple printed circuits 1230, where each printed circuit corresponds to a different network connector. Each network connector 1250, 1260 may optionally (as indicated by dashed circle) include display 1212. Display 1212 may include or correspond to display 212, 312, 412, 552, as described herein.

Each network connectors 1250, 1260 also includes body 1204 that is coupled to plate portion 1202. In a particular implementation, plate portion 1202 and bodies 1204 may include a single unitary component. Each network connectors 1250, 1260 also includes wire connectors 1290. The wire connectors 1290 may include or correspond to connectors 260 as described herein and may be configured to be coupled to a network cable, such as network cable 178. The wire connectors 1290 may be electrically coupled to pins of a respective network connector 1250, 1260.

Figure 13:
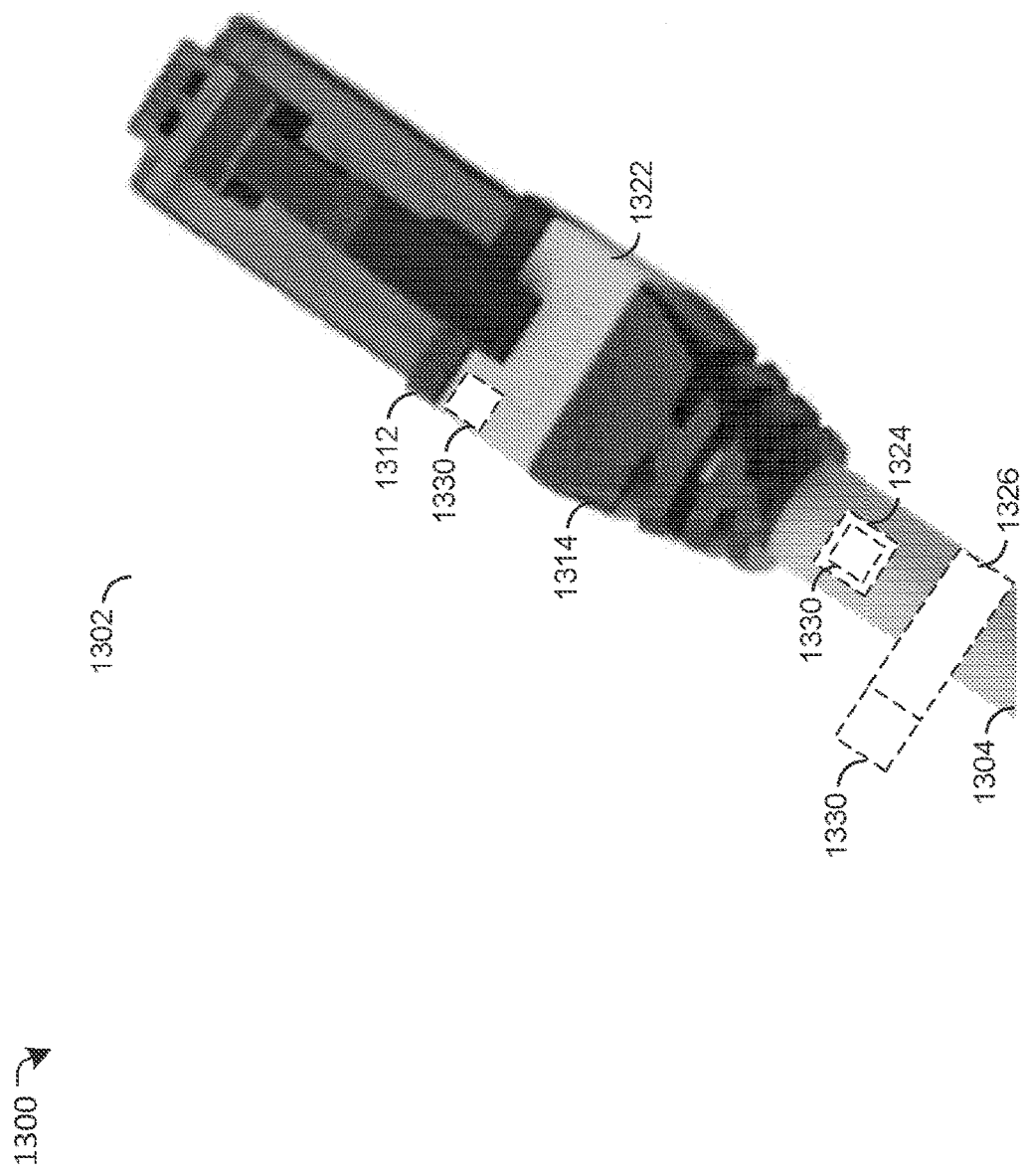
FIG. 13 illustrates a perspective view of a network cable connector according to one aspect of the present disclosure.

FIG. 13 depicts examples of a network cable 1300 comprising a printed circuit 1330, as described herein, that may be used in the networked environment 100 of FIG. 1 or other similar networked environments. For example, network cable 1300 may include or correspond to network cable 178 or network cable 278. The printed circuit 1330 of network cable 1300 may include or correspond to printed circuit 230, 330, 430, 500, 1030, 1130, or 1230.

In some implementations, the printed circuit 1330 may be included in or incorporated in a clip 1322 that is coupled to network cable 1300. As illustrated in FIG. 13, clip 1322 is attached to a boot 1314 of a hood 1302 of the network cable 1300. In some implementations, boot 1314 may define a recess or an opening that is configured to receive clip 1322. In some such implementations, printed circuit 1330 is configured to couple to one or more conductor wires of network cable 1300 via the recess or opening. In other implementations, clip 1322 is affixed to other portions of network cable 1300, such as sheath 1304, other components of the hood 1302 (e.g., a connector 1312), an extender (not shown), etc.

Accordingly, costs of the cable and connector can be reduced by incorporating a port into the hood into which a clip (including a printed circuit) can be inserted which wirelessly communicates network and/or identification information to an external device, such as mobile device 102, 502. Also, such a clip can be used as a back-up transmitter, when a primary transmitter in the connector fails or in case the cable and connector only have a primary transmitter on one end of the cable (e.g., upstream or server side end).

In other implementations, the printed circuit 1330 may be included in or incorporated in a sticker 1324 that is affixed to network cable 1300. As illustrated in FIG. 13, sticker 1324 is attached to sheath 1304 of the network cable 1300. In other implementations, sticker 1324 is affixed to other portions of network cable 1300, such as hood 1302 (e.g., connector 1312 or boot 1314 thereof), an extender, etc.

In another implementation, the printed circuit 1330 may be included in or incorporated into a tag 1326 that is coupled (e.g., attached) to network cable 1300. As illustrated in FIG. 13, tag 1326 is attached to sheath 1304 of the network cable 1300. In other implementations, tag 1326 is coupled to other portions of network cable 1300, such as hood 1302 (e.g., connector 1312 or boot 1314 thereof), an extender, etc. As another example, the printed circuit board 500 may be included in a device that is configured to plug into an extension (e.g., extender or telltale) of the network cable 1300 or the connector thereof. Thus, by affixing clips, stickers, and/or tags to components, existing networks can be retrofitted with printed circuits and enable component tracking.

FIGS. 14A-14M illustrate circuit diagrams showing some components of system 100 or system 500, which may be used in network cables 178, 278, network cable connectors 200, 300, 400 described above in connection with FIGS. 2A-2F, 3A-3G, 4A-4F, network cable connectors described with reference to FIGS. 10A-10B, 11A-11B, and 12A-12B, and/or plates 1000, 1100, 1200 described with reference to FIGS. 10A-10B, 11A-11B, and 12A-12B.

Figure 14A:
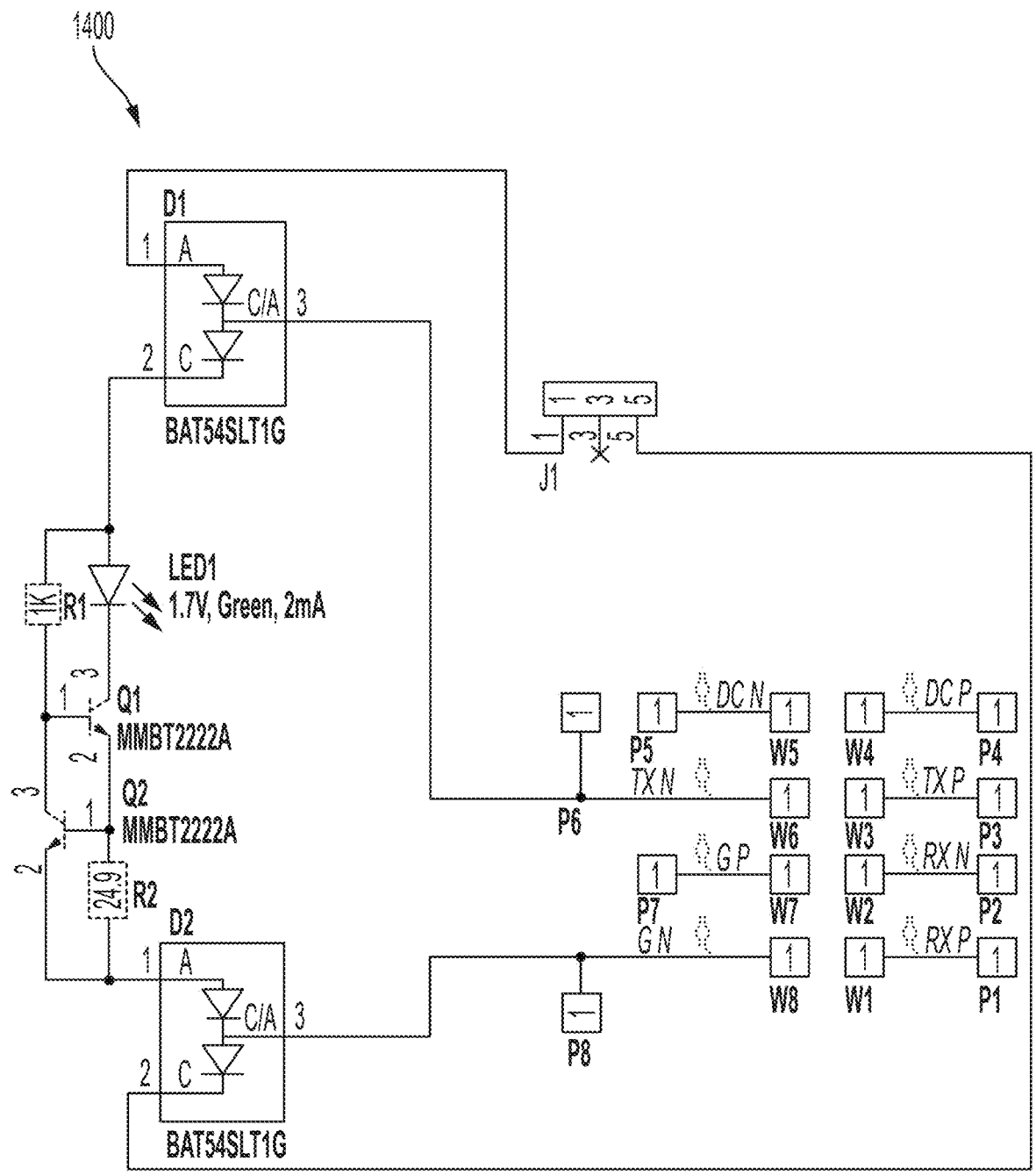

FIG. 14A illustrates a circuit diagram of an example of a printed circuit of a cable or cable connector. Referring to FIG. 14A, Printed circuit 1400 may include a flex circuit and/or may be included in a printed circuit board. A flex circuit (e.g., a flexible printed circuit board) may include an insulating polymer film having one or more conductive circuit patterns affixed thereto and may include a coating (e.g., a polymer coating) to protect the conductor circuits. Printed circuit 1400 may include or correspond to printed circuit 230, 330, 430, 500, 1030, 1130, 1230, or 1330. In a particular implementation, printed circuit 1400 includes a flexible circuit or flex circuit that is affixed to and/or molded into a hood or plate.

In the depicted embodiment, printed circuit 1400 includes two Schottky diode arrays (D1, D2), a micro USB receptacle (J1), an LED (LED1), an Ethernet connector (and pins thereof. P1-P8), transistors (Q1, Q2), resistors (R1, R2), and a wire contact (e.g., insulation-displacement contact (IDC)s thereof. W1-W8). The LED and transistors are positioned between the two Schottky diode arrays. To illustrate, the LED and transistors are coupled to an output of one Schottky diode array and are coupled to an input of another Schottky diode array.

During operation, the LED may be operated or controlled via signals from the micro USB receptacle (J1) and/or the Ethernet connector (and pins thereof. P1-P8). To illustrate, a panel may provide signals to the printed circuit 1400 via one or more pins P1-P8 of the Ethernet connector to activate or adjust the LED. Alternatively, a panel may provide signals to the printed circuit 1400 via one or more pins or contacts (1,3,5) of the micro USB receptacle (J1) to activate or adjust the LED. As another example, a panel may provide signals to the printed circuit 1400 via one or more pins P1-P8 of the Ethernet connector to activate or adjust the LED via power from the micro USB receptacle (J1). Although a micro USB receptacle and connection are used in the example of FIG. 14A, in other implementations a micro USB plug or a different type of connector may be used.

Figure 14B:
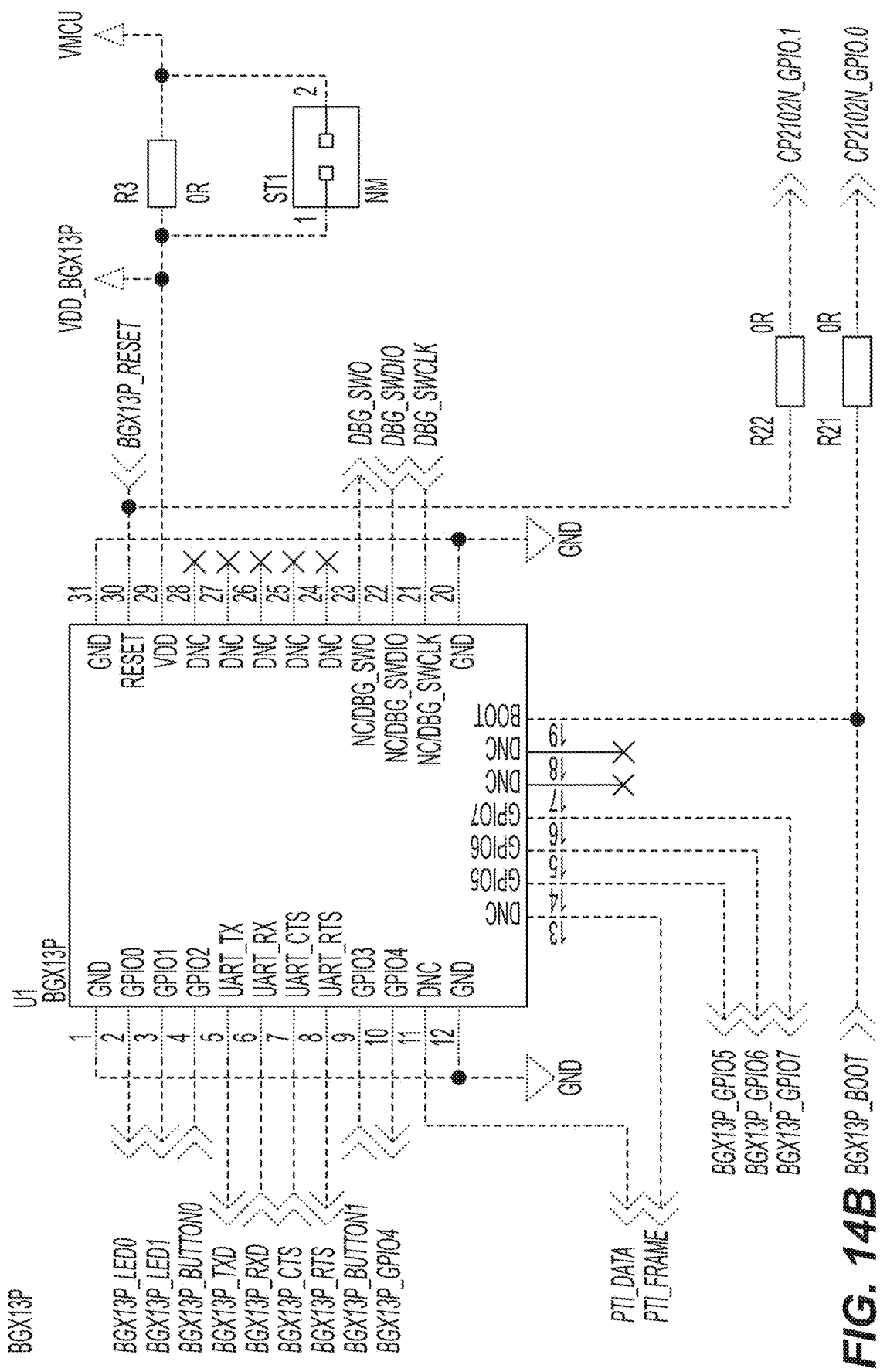

FIGS. 14B-14M illustrate circuit diagrams for a circuit board (e.g., BGX13P) for wirelessly communicating with a remote device and communicating with the printed circuit 1400 of FIG. 14A. FIG. 14B illustrates a circuit diagram of an example of circuitry of a circuit board (e.g., BGX13P) for wirelessly communicating with a remote device and communicating with the printed circuit 1400 of FIG. 14A

Figure 14C:
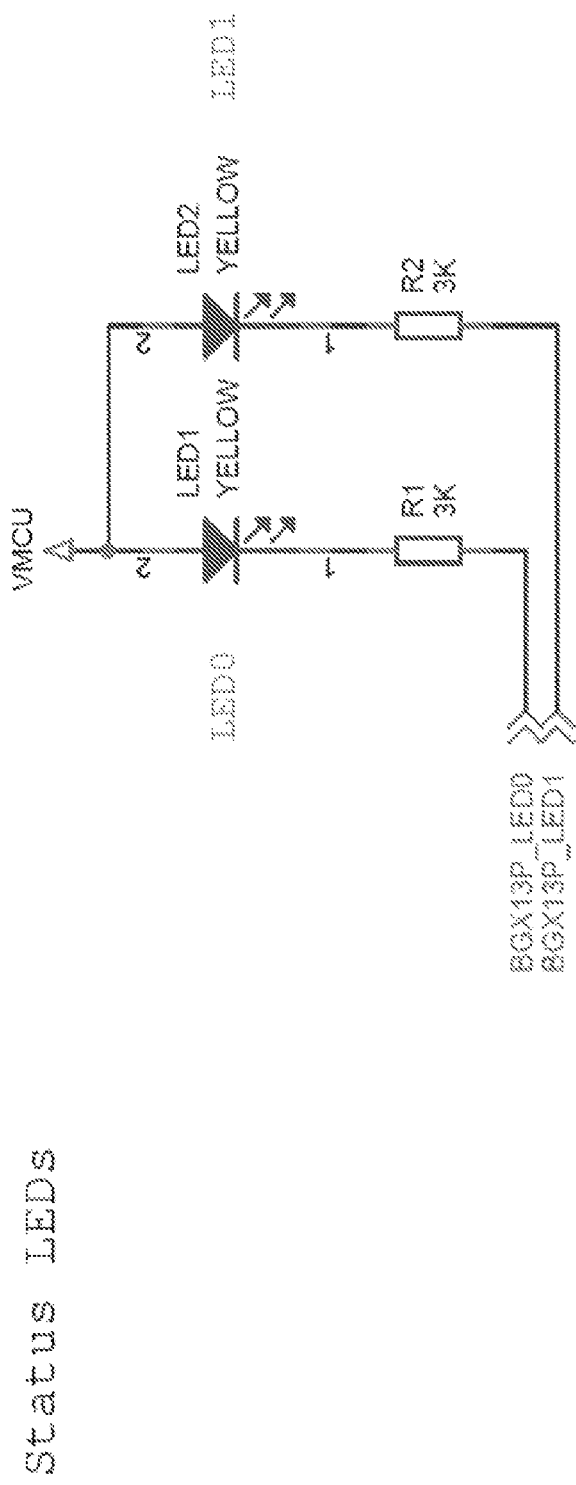
Figure 14D:
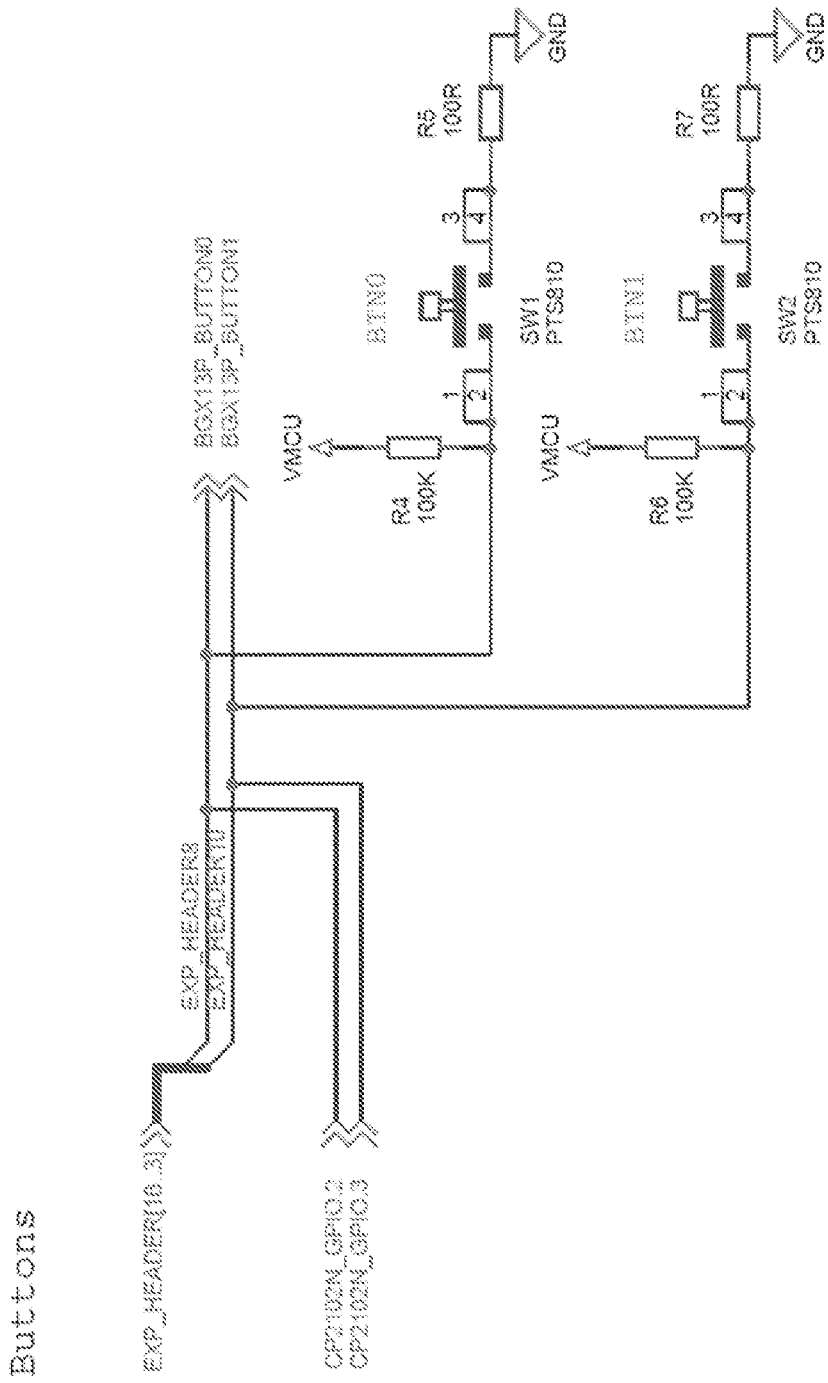
Figure 14G:
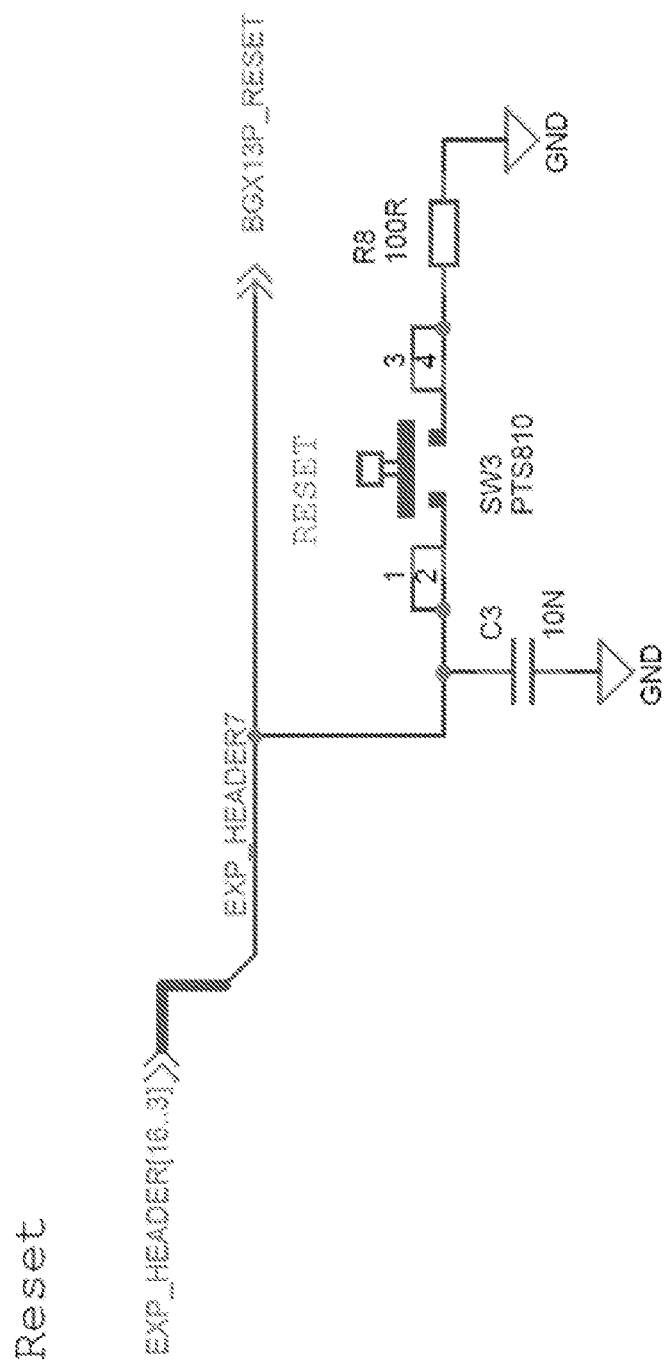
Figure 14H:
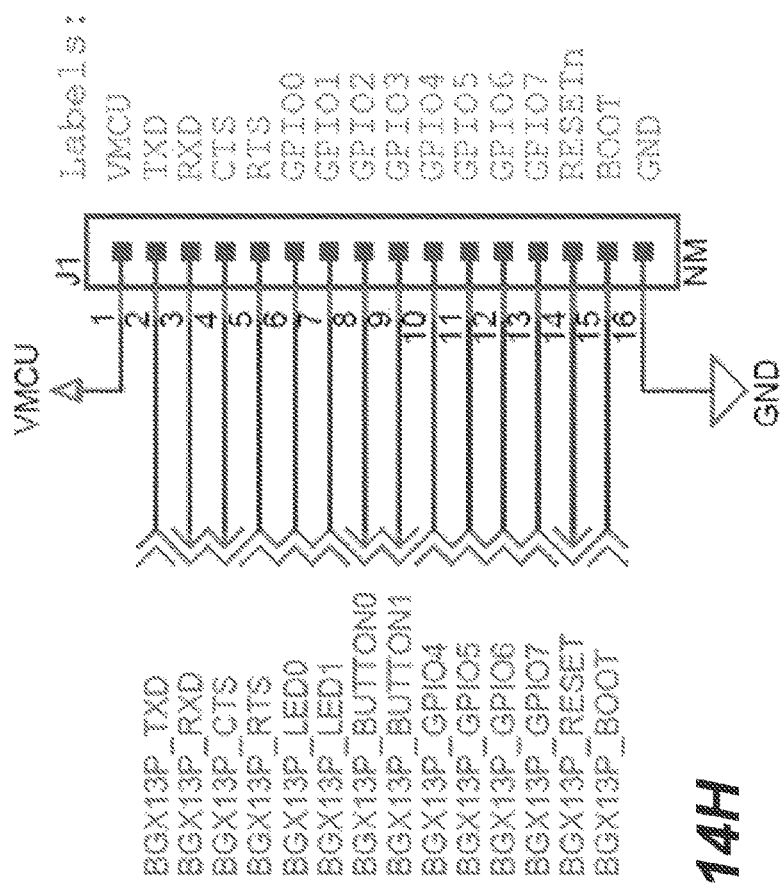

FIG. 14C illustrates a circuit diagram of an example of status LEDs of the circuitry of FIG. 14B. FIG. 14D illustrates a circuit diagram of an example of buttons of the circuitry of FIG. 14B. FIG. 14E illustrates a circuit diagram of an example of modem connections of the circuitry of FIG. 14B. FIG. 14F illustrates a circuit diagram of an example of I/O connections of the circuitry of FIG. 14B. FIG. 14G illustrates a circuit diagram of an example of reset circuitry of the circuitry of FIG. 14B. FIG. 14H illustrates a circuit diagram of an example of a breakout connector of the circuitry of FIG. 14B.

Figures 14I, 14J:
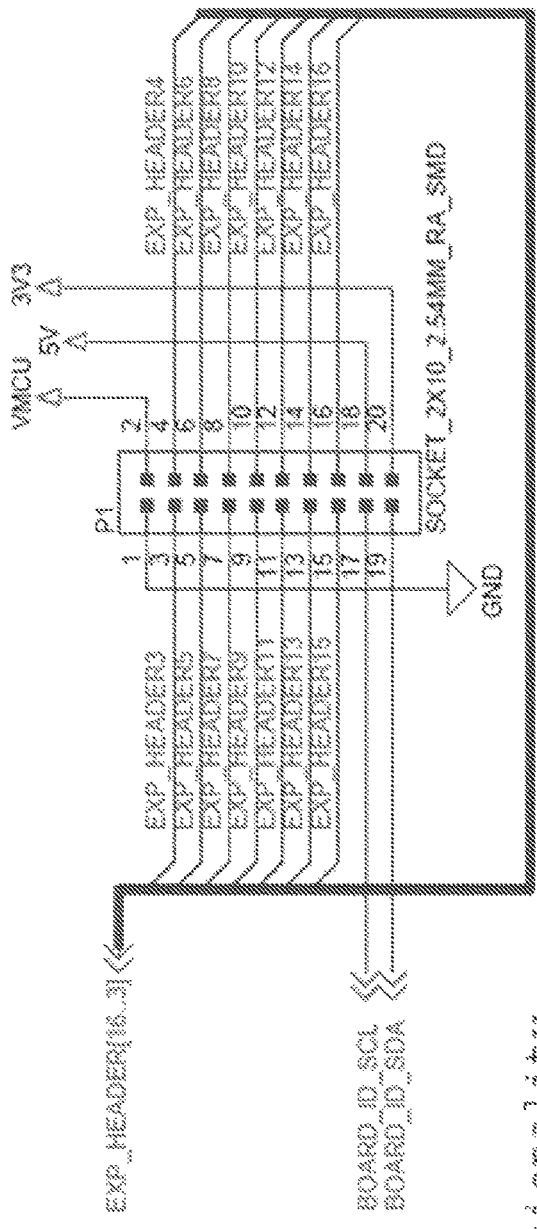
Figures 1, 14K:
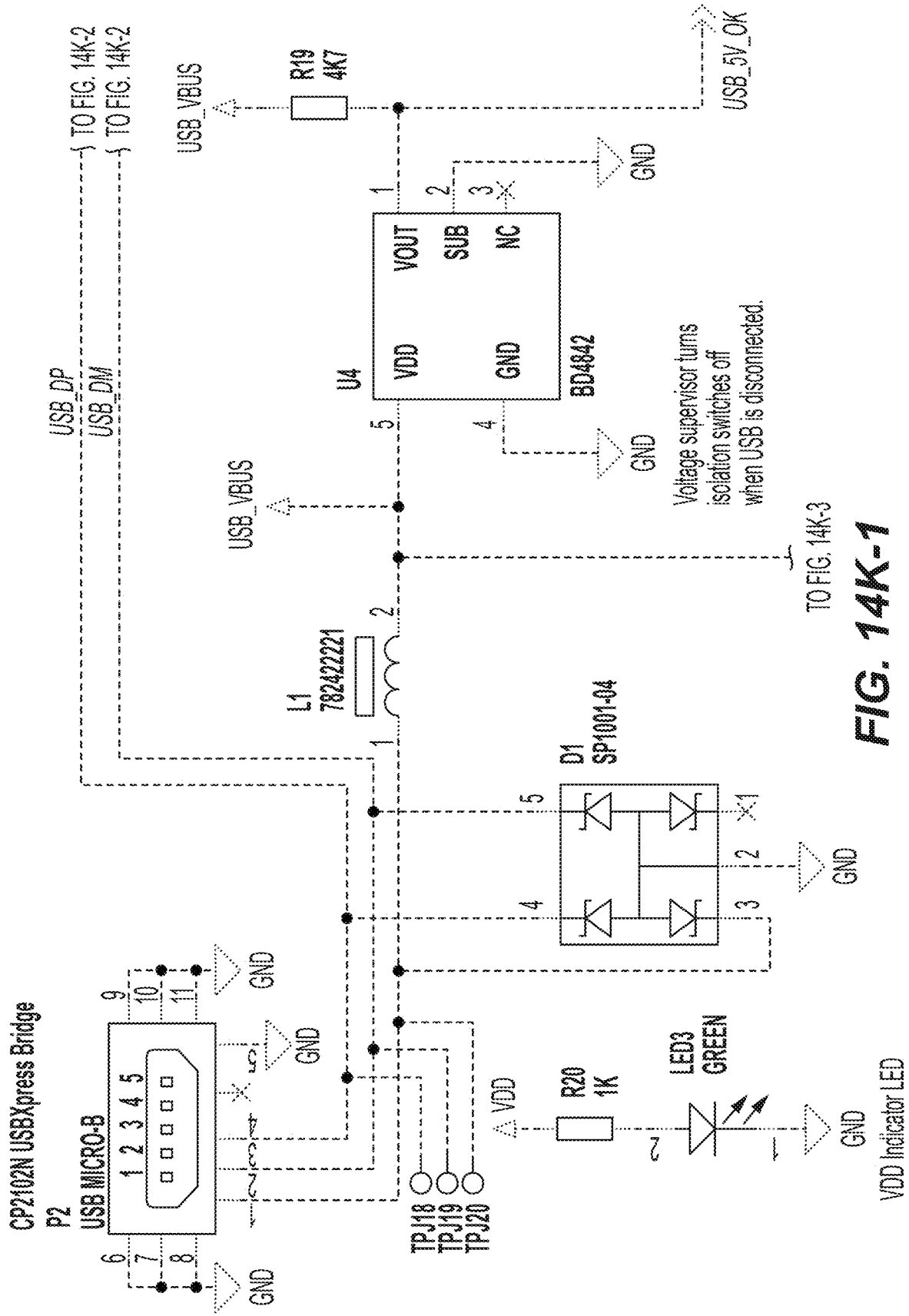
Figures 2, 14K:
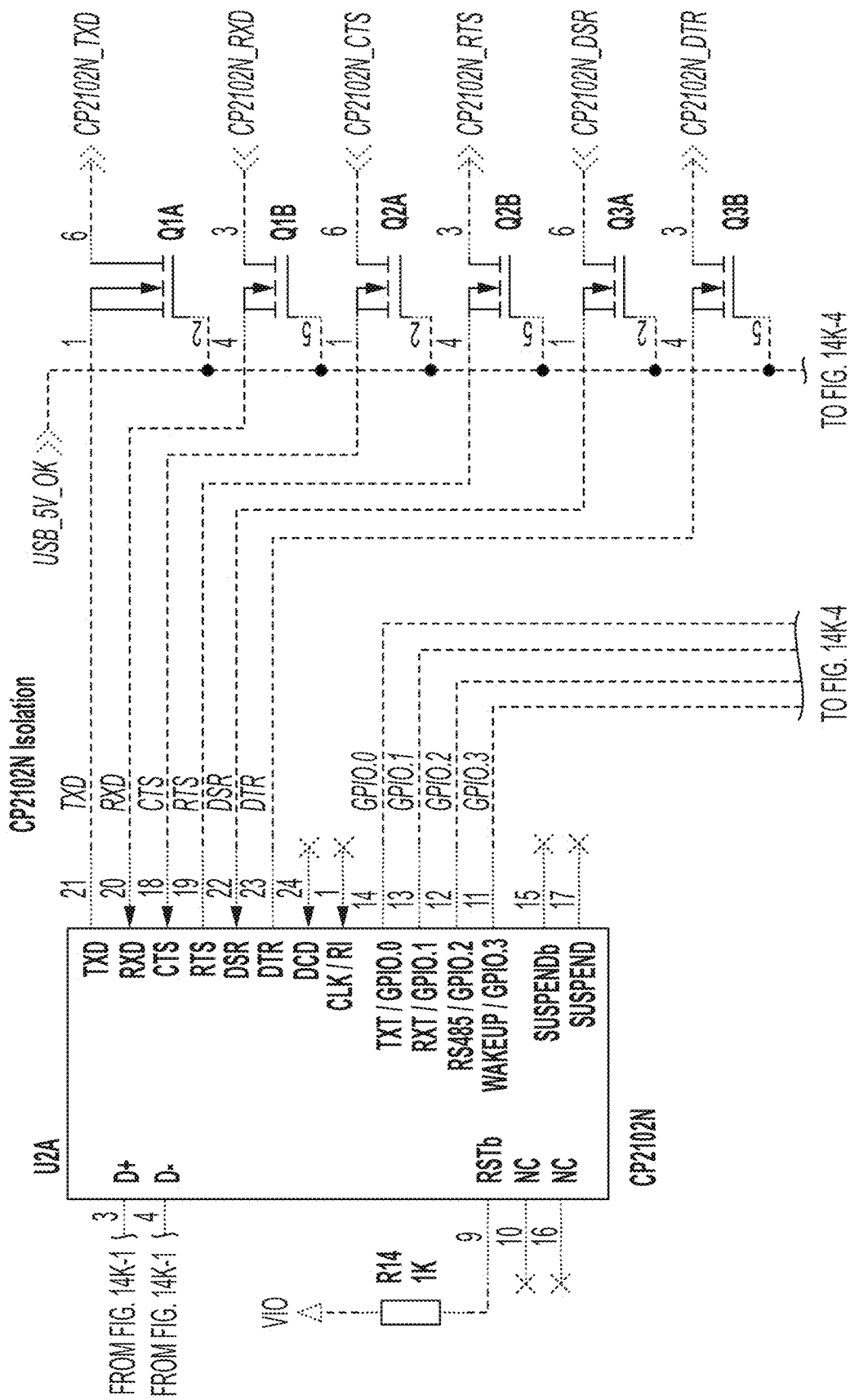
Figures 3, 14K:
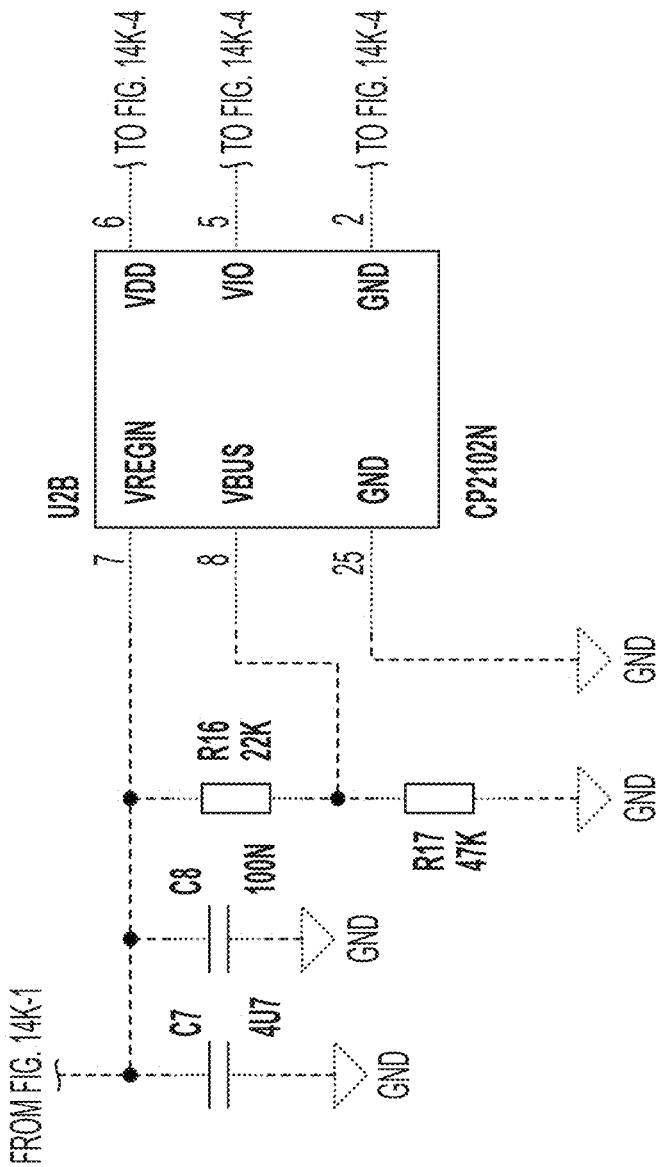
Figures 4, 14K:
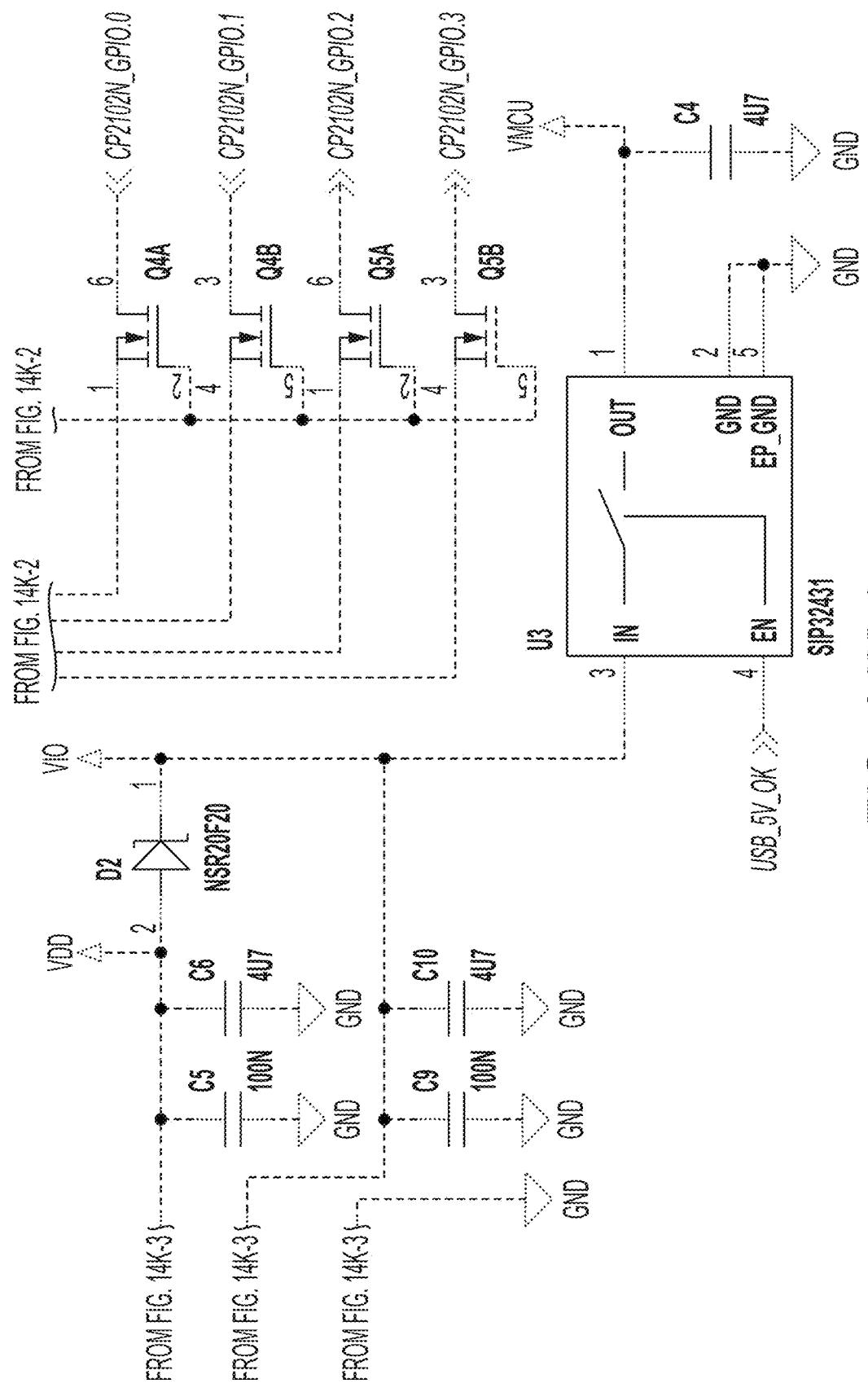
Figure 14L:
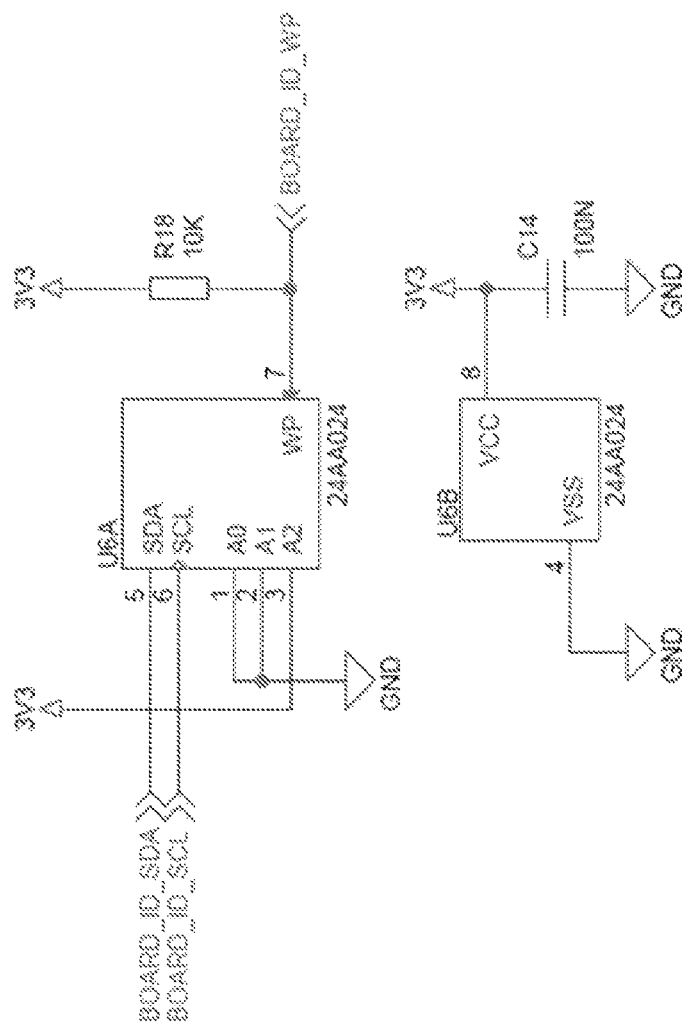
Figure 14M:
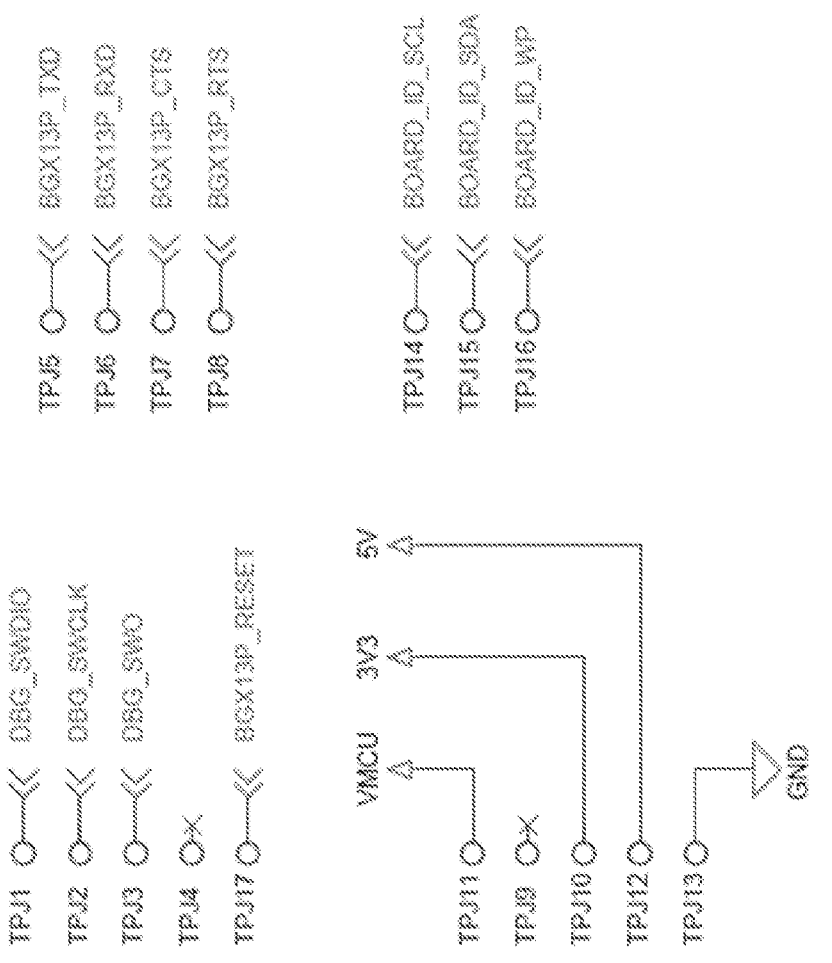

FIG. 14I illustrates a circuit diagram of an example of a header of the circuitry of FIG. 14B. FIG. 14J illustrates a circuit legend for the header of FIG. 14I. FIG. 14K illustrates a circuit diagram of an example of a bridge of the circuitry of FIG. 14B. FIG. 14L illustrates a circuit diagram of an example of board identification of the circuitry of FIG. 14B. FIG. 14M illustrates a circuit diagram of an example of test points of the circuitry of FIG. 14B.

The circuit board of FIGS. 14B-14M may be configured to be coupled to or integrated with a network component, such as panel 120. The circuit board of FIGS. 14B-14M may be configured to provide signals, power and/or data, to the printed circuit of FIG. 14A responsive to data and/or communications received from a remote device.

Thus, printed circuit 1400 enables identification of components of a networked environment without having to physically access the components (e.g., a network cable connector) or connect a device to the components (e.g., terminals of the network cable). By using printed circuit 1400 components of a networked environment can be programmed or diagnosed with having to physically disconnect cables and/or connect cables to a PSE. Also, printed circuit 1400 enables easier access, as compared to printed circuits and components which use wired or contact-based communication means, because you don't have to physically access a connector or hood. Also, printed circuit 1400 can decrease maintenance and setup time. For example, a mobile device can control or power multiple components at one using wireless communication. To illustrate, the electric field generated by the mobile device (e.g., a smartphone with an NFC reader) may cause multiple devices, each including printed circuit 1400, to respond to the mobile device with identifying information.

Additionally, or alternatively, based on processing the data, controller 1408 can initiate transmission of data to the mobile device. For example, controller 1408 sends the second data to controller 1404 which is configured to cause controller 1404 to send a second data signal to external device via inductor 1420. The second data signal indicates the component and/or network information. In some implementations, an application on the mobile device is configured to generate passwords and/or communicate securely with printed circuit 1400. For example, the printed circuit 1400 may provide different levels of access based on incoming data signals. To illustrate, the memory of controller 1404 may be read only unless a password is provided. Thus, printed circuit 1400 enables secure wireless communication of data to a device external to a networked environment.

FIGS. 15A-15D illustrate diagrams of graphical user interfaces (referred to herein as screens) of a mobile device which can interact with and control indicators (e.g., indicators of printed circuits 230, 330, 430, 500, 1030, 1130, 1230, 1330, or 1400) incorporated with or attached to network components via another network component, such as a port or jack. The mobile device may include or correspond to mobile device 102 or mobile device 502. The indicators may include or correspond to a visual indicator, an audio indicator, or both. Additionally, wirelessly communicating with a controller of a network component, such as a port or jack, may enable the application to control operation of the network components.

Figures 15A, 15B:
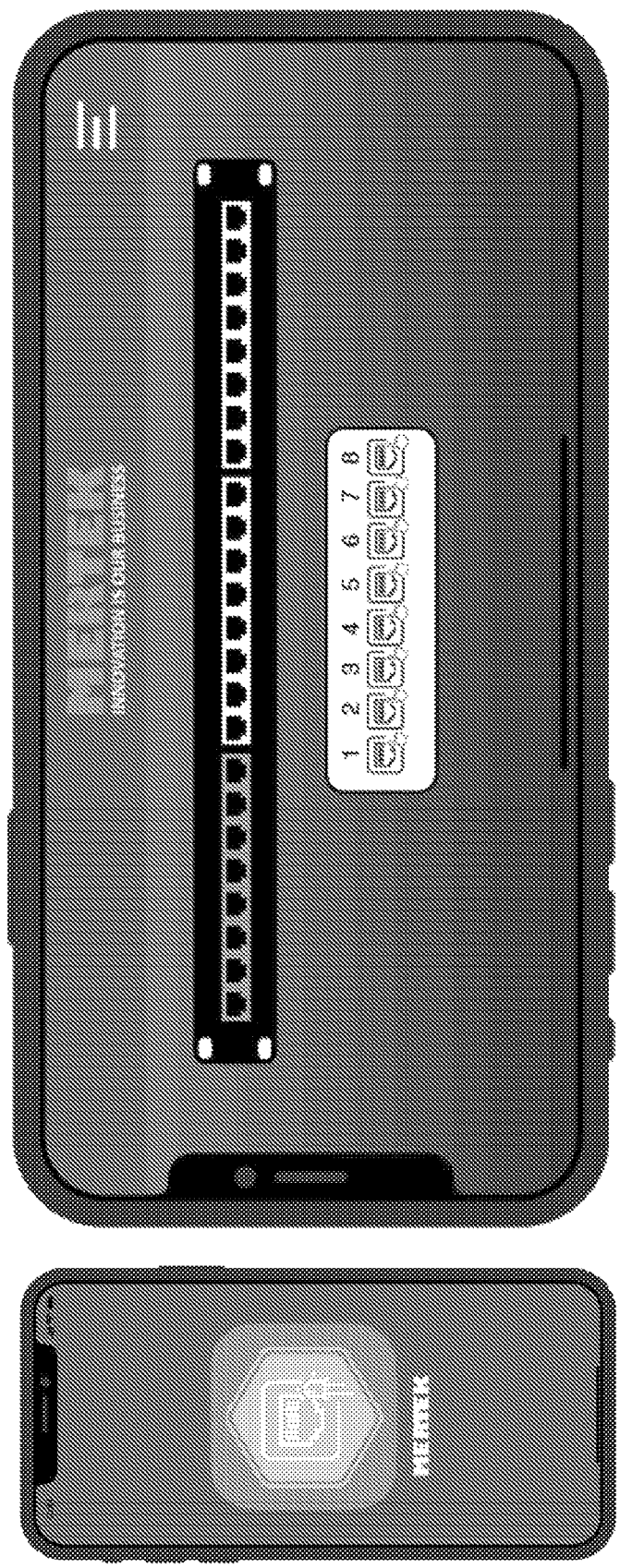
FIG. 15A illustrates a diagram of a user interface of an application for controlling indicators associated with network components.
FIG. 15B illustrates a diagram of another user interface of an application for controlling indicators associated with network components.

Referring to FIG. 15A, FIG. 15A illustrates an example of a startup or home screen of an application of the mobile device for controlling indicators or output devices network components (e.g., printed circuits 230, 330, 430, 500, 1030, 1130, 1230, 1330, or 1400). As illustrated in FIG. 15A, the home screen has a logo for loading and/or starting the application. In other implementations, the home screen includes one or more navigational bars or buttons.

Figure 15D:
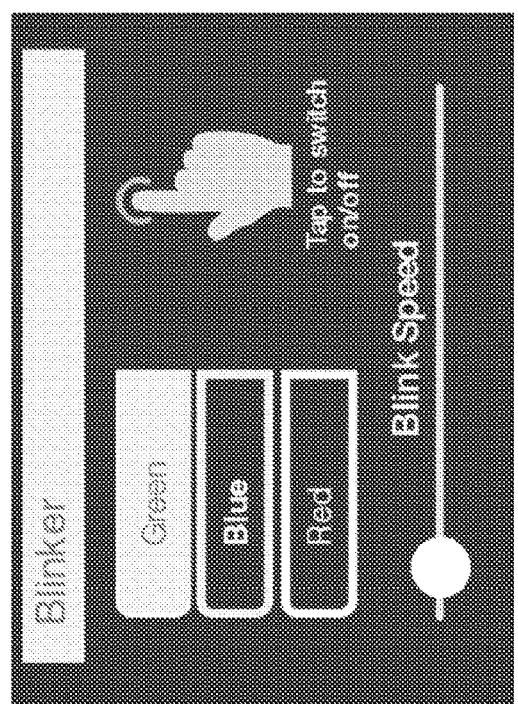
FIG. 15D illustrates a diagram of another user interface of an application for controlling indicators associated with network components.
Figure 15C:
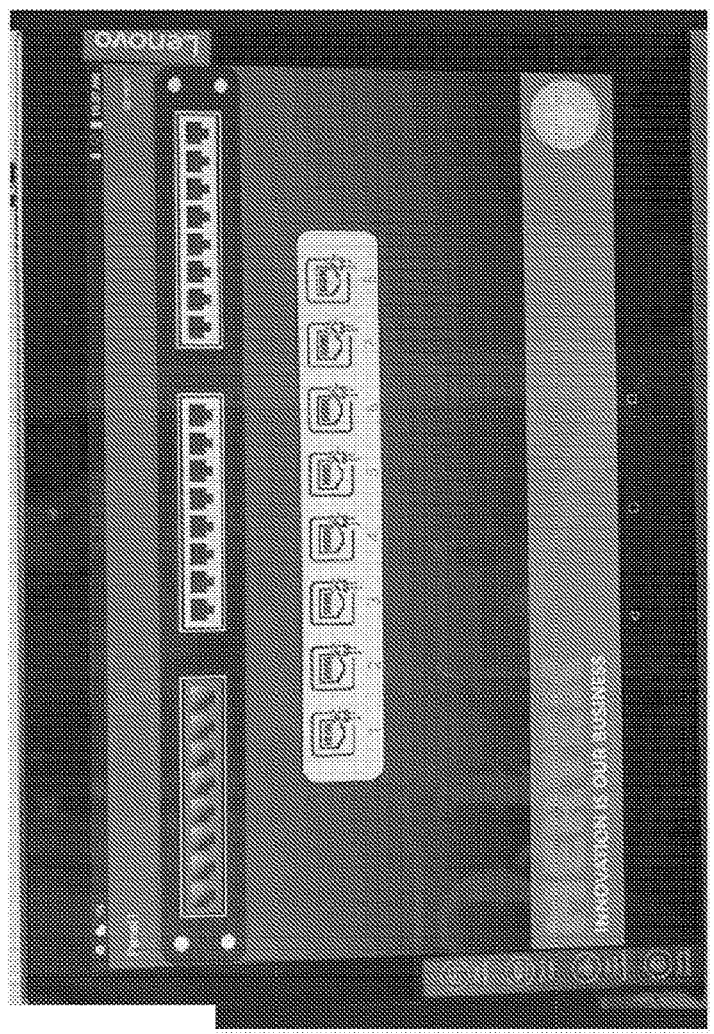
FIG. 15C illustrates a diagram of another user interface of an application for controlling indicators associated with network components.

Referring to FIG. 15B, FIG. 15B illustrates an example of a port trace screen of the application. The port trace screen includes a menu bar and port information. As illustrated in FIG. 15B, the task screen includes a menu bar icon, a graphical display of panels of ports, and port control buttons for selecting individual ports of a selected panel. Once a port is selected additional buttons for controlling or adjusting visual and/or audio outputs of the port may be displayed, as shown in FIG. 15D. In other implementations, an additional indicator menu button or icon is displayed, such as in FIG. 15C. Additionally, or alternatively, once a port is selected the port may be highlighted or change color, as shown in FIG. 15C.

The control buttons are configured to control a blink speed and a color of a display (e.g., LED) of the RFID tag, such as a display (e.g., LED) of printed circuit 1400 of FIG. 14A. Optionally, the control buttons may be configured to control a blink or flashing type or pattern, such as alter a pattern and/or timing of flashes. Additionally, the task screen may include control buttons for controlling a tone output by an audio output device (e.g., speaker) of or coupled to the printed circuit. For example, the tone control buttons may include a tone slider configured to change a type of tone (e.g., change a type of output sound, a pitch of the output audio, etc.) and a volume slider configured to control (e.g., increase and decrease) volume of the output audio.

The control buttons (or the task screen) may further include one or more paring buttons (e.g., "Pair 1", "Pair 2", etc.) configured to couple and decouple the mobile device from the networking panel and/or printed circuit of or coupled to the ports. To illustrate, when paired, the mobile device may output data via an antenna or inductor thereof addressed to a particular cable or cable and/or may display data received from the particular cable or cables. When not paired (or decoupled), the mobile device may output data via the antenna or inductor thereof which is not addressed to the particular tag or tags and/or may not display data received from the particular cable or cables.

Additionally, the application may be configured to generate one or more other types of screens, such as a wireless communication screen. The wireless communication screen may display identifying information of one or more of the networking components. A user can select a particular networking component of the networking components to view messages and identifying information of the particular networking component and optionally edit messages and/or identifying information of the particular networking component.

As another example, the application may be configured to generate a tools screen. A tools screen includes one or more buttons to control or the particular networking component or a component coupled thereto. For example, the tools screen may include one or more of a Reset button, a Read button, a Read Session button, a Read/Write button, or a combination thereof. The Reset button is configured to send a reset signal to a printed circuit to reboot the printed circuit, reset the printed circuit (i.e., clear one or more memories of registers thereof), or a combination thereof. The Read button is configured to send a signal to the printed circuit to cause the printed circuit to send data from a memory of the printed circuit to the mobile device. Similarly, the Read session and Read/Write buttons send signals to the printed circuit to enable a user to read data from and/or write data to one or more registers of the printed circuit.

In some implementations, the tools screen displays tag configuration information. For example, the tools screen may display a Board Configuration section which displays a data length of an SRAM (e.g., 514) and/or an EEPROM (e.g., 512) of the controller or the printed circuit. Additionally, or alternatively, the tools screen includes a performance section configured to display performance information of one or more printed circuits. Selection of a particular printed circuit causes the performance section to display performance data regarding the particular printed circuit. Exemplary performance data includes performance data of the printed circuit itself, such as battery level, memory usage, signal strength, etc., performance data of the network component to which the printed circuit is coupled, such as status, speed, capacity, etc., or a combination thereof.

As yet another example, the application may be configured to generate a Report screen. The Report screen may correspond to a create report screen configured to enable creation of reports including one or more notes, such as a list of completed tasks or log of activity of a session of the application. In some implementations, the create report screen enables sending of the created reports, such as to a server or database. The report and notes thereof can be controlled by one or more buttons or pop-up windows of the Report screen, such as view, save, and send buttons. Additionally, the Report screen can include buttons to import data, such as pictures, from one or more sources, such as from a camera or from saved photos. In some implementations, the application can generate reports (or a portion thereof) automatically. For example, the application may log communications and/or actions during a session for inclusion into a report Additionally, or alternatively, the Report screen corresponds to a save report screen configured to enable display of saved of reports generated by the application based on information received from the RFID tags, information sent to the RFID tags, or a combination thereof. For example, the Report screen may display a list of saved reports and buttons for interacting with the saved reports, such as view, save, and delete buttons for managing reports. Selection of a particular report may cause the application to display a create report screen to enable editing of the saved report.

During operation of the mobile device, the application may be downloaded from an application server and installed on the mobile device. The mobile device runs the application and displays one or more user interfaces as described with reference to FIGS. 15A-15D. The mobile device wirelessly transmits data to a controller of a first networking component to control an indicator of a second networking component coupled to the first networking component. The mobile device sends and receives data to the indicator of the second networking component to enable identification of the second networking component, obtaining information from the one or second networking component and other network components, writing information about the second networking component and/or other network components to the controller or a printed circuit of the second networking component, or a combination thereof.

In some implementations, the application generates one or more reports responsive to communications sent and received by the mobile device, user inputs, or a combination thereof. The application can send the one or more reports to a central server or database for storing information about the controller, the printed circuits, the network components, or both. The information about the network components may include an operating status of the connector, a power connection status of the connector, a security setting of the connector, an Internet protocol (IP) address of a device coupled to the connector, a media access control (MAC) address of a device coupled to the connector, or a combination thereof, as illustrate examples.

Accordingly, the application and user interfaces described in FIGS. 15A-15D enable a mobile device (e.g., a smartphone) to interact with network components, including second network components coupled to a first network component, to enable identification of the network components. The application and user interfaces can enable a mobile device to identify and trace network components and ports. To illustrate, because the application can set different blinking patterns, colors, or tones, the application enables the mobile device to identify network components using basic output devices and obtain information from the network components for display on the mobile device, as opposed to including expensive, complicated and large output devices (e.g., LCD displays) which directly output information. Thus, the application enables low cost and reduced size printed circuits to be coupled to network components to facilitate network management.

Figure 16A:
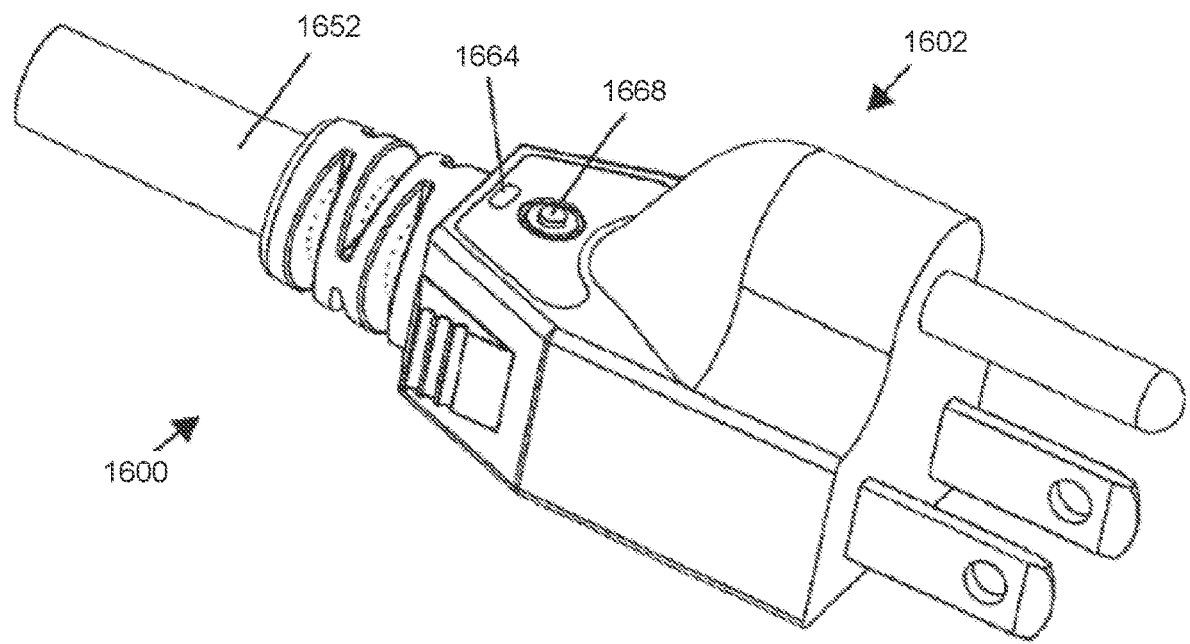
FIGS. 16A-16C are various views of one embodiment of a male connector for embodiments of the present power cables.
Figure 16B:
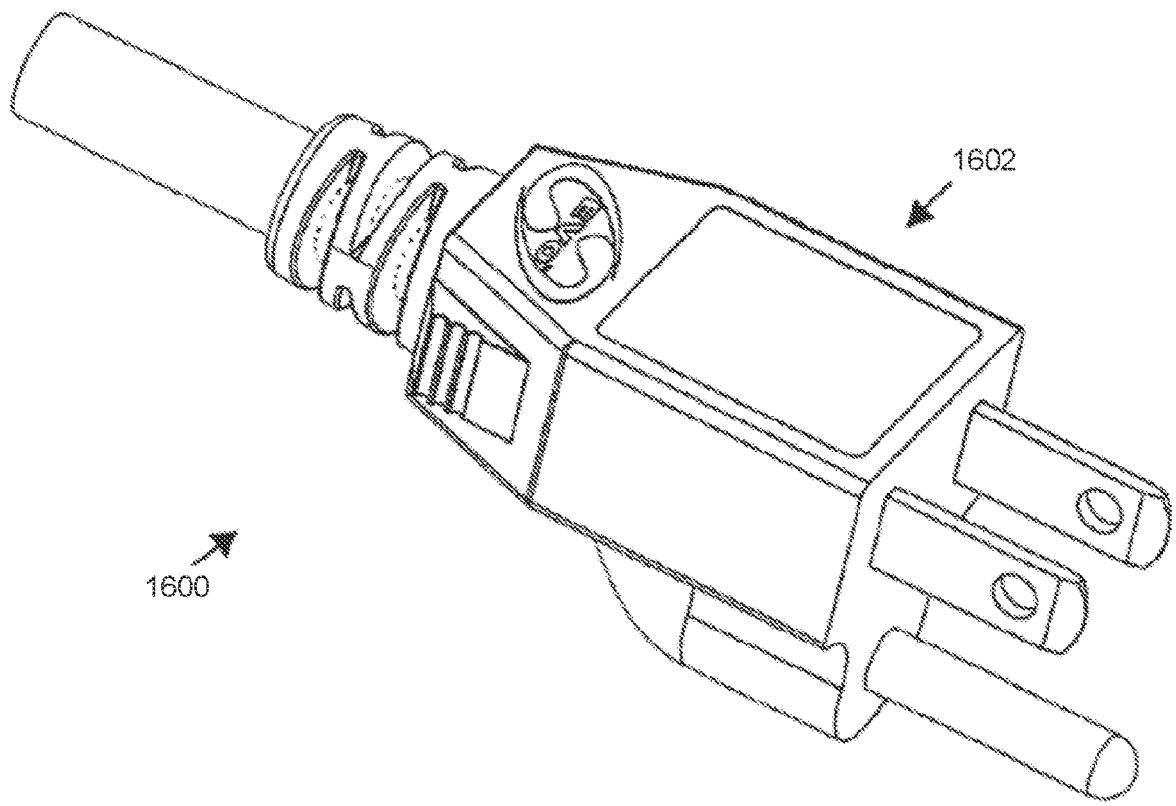
Figure 16C:
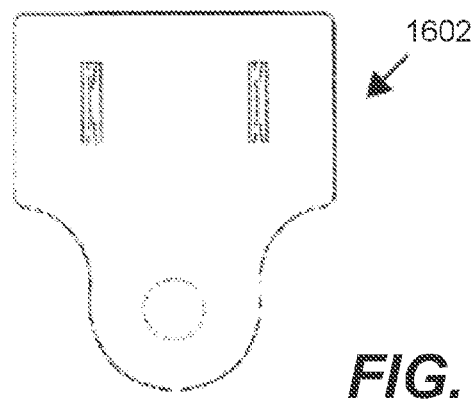
Figure 17A:
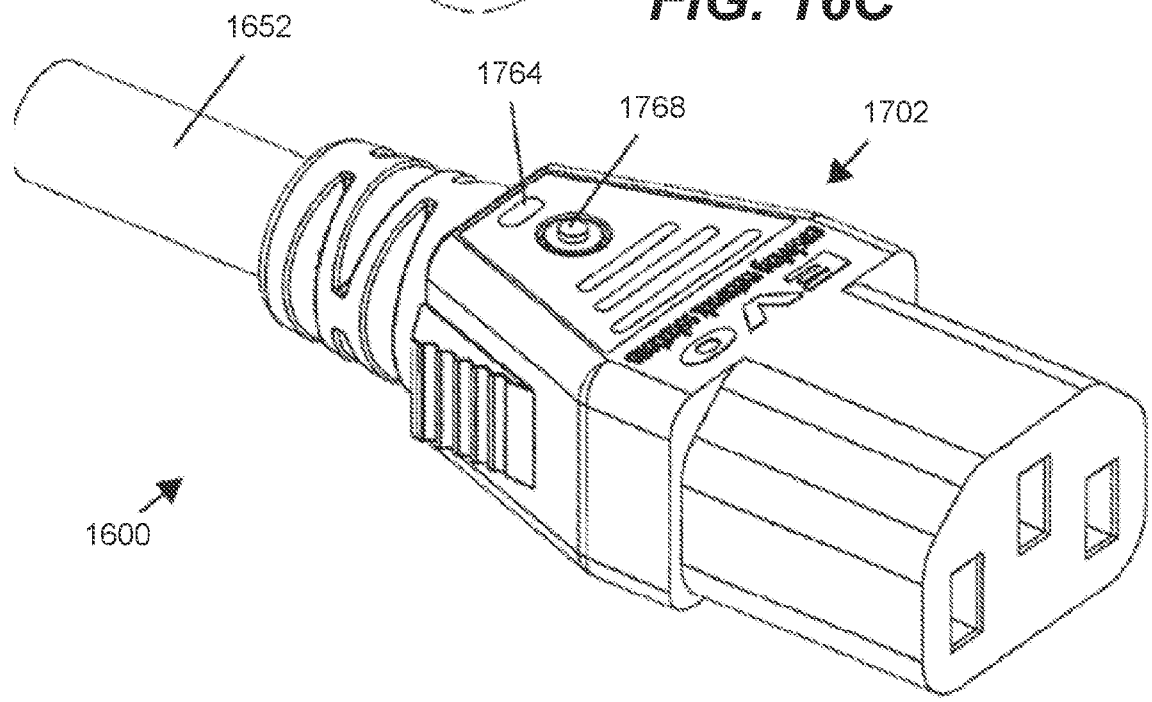
FIGS. 17A and 17B are perspective and end views, respectively, of one embodiment of a female connector for embodiments of the present power cables.
Figure 17B:
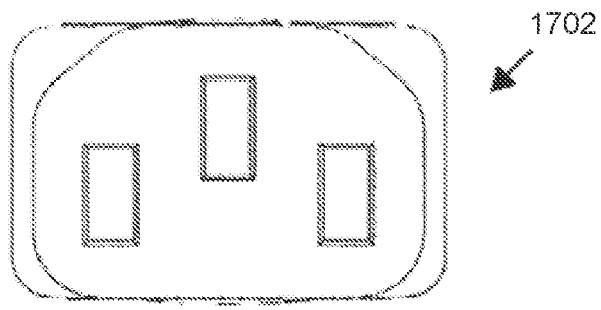

Referring now to FIGS. 16A-17B, an embodiment of a power cable is illustrated. FIGS. 16A-16C depict various views of one embodiment of a cable 1600 including a male connector hood 1602; FIGS. 17A-17B depict perspective and end views, respectively, of one embodiment of a cable 1600 including a female connector hood 1702. In the embodiments shown, cable 1600 is a power delivery cable or electrical cable and configured to carry alternating current (AC) power (e.g., at 110V) from an external power source (e.g., a wall plug or outlet) to a powered device (e.g., a computer, a server, etc.). Referring to FIGS. 16A-16C, the cable 1600 includes a male connector hood 1602 at a first end that is configured to be connected to a standard grounded wall outlet (i.e., a three prong plug that includes two blades and a ground pin). Other embodiments may exclude the ground pin (e.g., have only two blades) such that the cable 1600 will not provide a grounded connection to the wall outlet.

Referring to FIGS. 17A and 17B, cable 1600 includes an example of a female connector hood 1702 at a second end. Female connector hood 1702 is configured (e.g., is configured to receive three blades, with the center blade vertically offset form the two outer blades as shown in FIG. 17B) to be connected to any of various devices (e.g., computer, server, printer, etc.). In the embodiment shown, cable 1600 includes a power cable 1652 with two or more conductors (e.g., three conductors, with one for ground) in a flexible outer sheath.

In some implementations, the male connector hood 1602, the female connector hood 1702, or both, include a printed circuit (e.g., 230, 330, 430, 500, 1030, 1130, 1230, 1330, or 1400). The printed circuit may have a similar layout, circuitry, and/or functionality as printed circuit 500 shown and described with reference to FIG. 5 or a printed circuit 1400 as shown and described with reference to FIG. 14A. For example, the printed circuit can be configured to communicate data (e.g., 184) to or from a mobile device (e.g., 102). The printed circuit may include a flex circuit and/or a circuit included in a printed circuit board. In a particular implementation, printed circuit 230 includes a flexible circuit or flex circuit that is affixed to and/or molded into a hood, such as 1602 or 1702. In power cable implementations, the printed circuit may receive power from the power cable and may be configured to communicate with a mobile device wirelessly using power from the power cable. Thus, the printed circuit may not need circuit components (e.g., an inductor or inductors) to receive power wirelessly from the mobile device. In other implementations, the printed circuit is affixed to another portion of cable 1600, such as the power cable 1652.

In the embodiments shown, male connector hood 1602 includes an electrically activated telltale 1664 and a button 1768, both of which can function as further herein. While not shown in FIGS. 16A-17B, the internal components (e.g., electric power source, manually operated switch, controller, printed circuit, etc.) and functionality of cable 1600 are similar to the internal components and functionality of the networking cables described above, with the primary exception that POE is not implemented over cable 1600 and, thus, the POE-specific functionality described above need not be included in embodiments of the present power cables. For example, power cable 1652 can include one or more tracer or indicator conductors (e.g., a pair of indicator wires) running the length the cable (e.g., in addition to the power conductors in the cable). As another example, embodiments of power cable 1600 can include a charging circuit (e.g., as described above) coupled to two or more of the power conductors in the power cable such that if the power cable is coupled to an external electric power source (e.g., a wall plug, generator, etc.), the charging circuit can communicate electric current from the external electric power source to the power source (e.g., a controller in the power cable can be configured to direct electrical current from the external power source (e.g., via an AC-DC converter in or in communication with the circuit that provides the tracing function) to the battery if the voltage of the battery falls below a threshold voltage). Similar to boot 1314, connector hoods 1602 and 1702 may be overmolded onto cable 1652 in one or more pieces (e.g., a single piece or a boot and a connector).

Figure 18A:
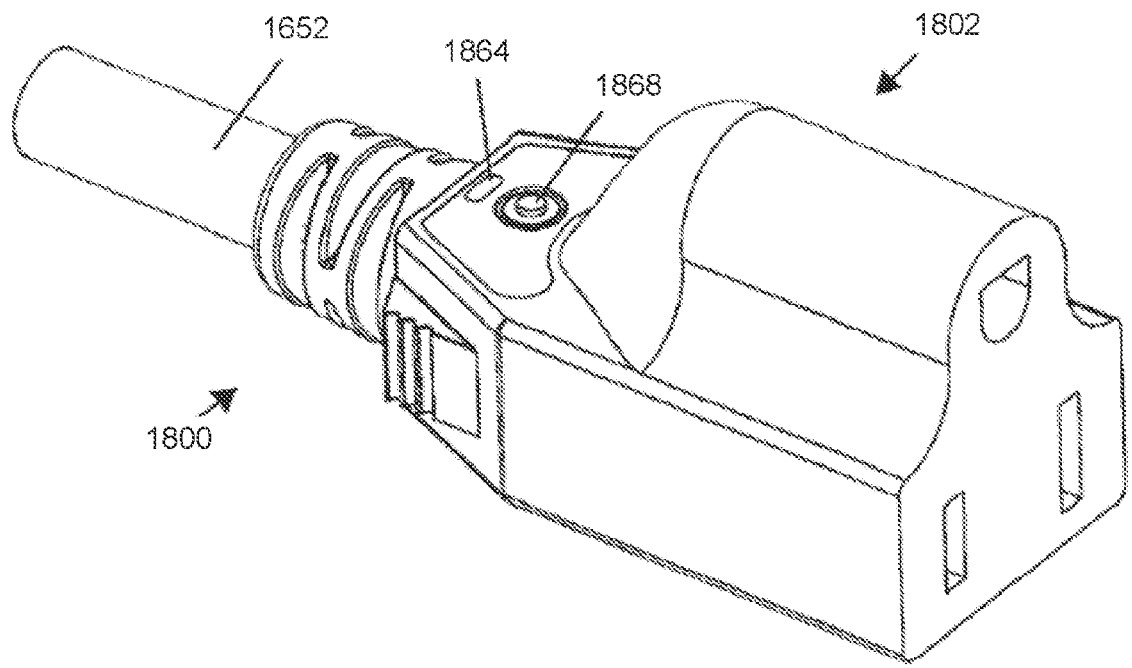
FIGS. 18A and 18B are perspective and end views, respectively, of another embodiment of a female connector for embodiments of the present power cables.
Figure 18B:
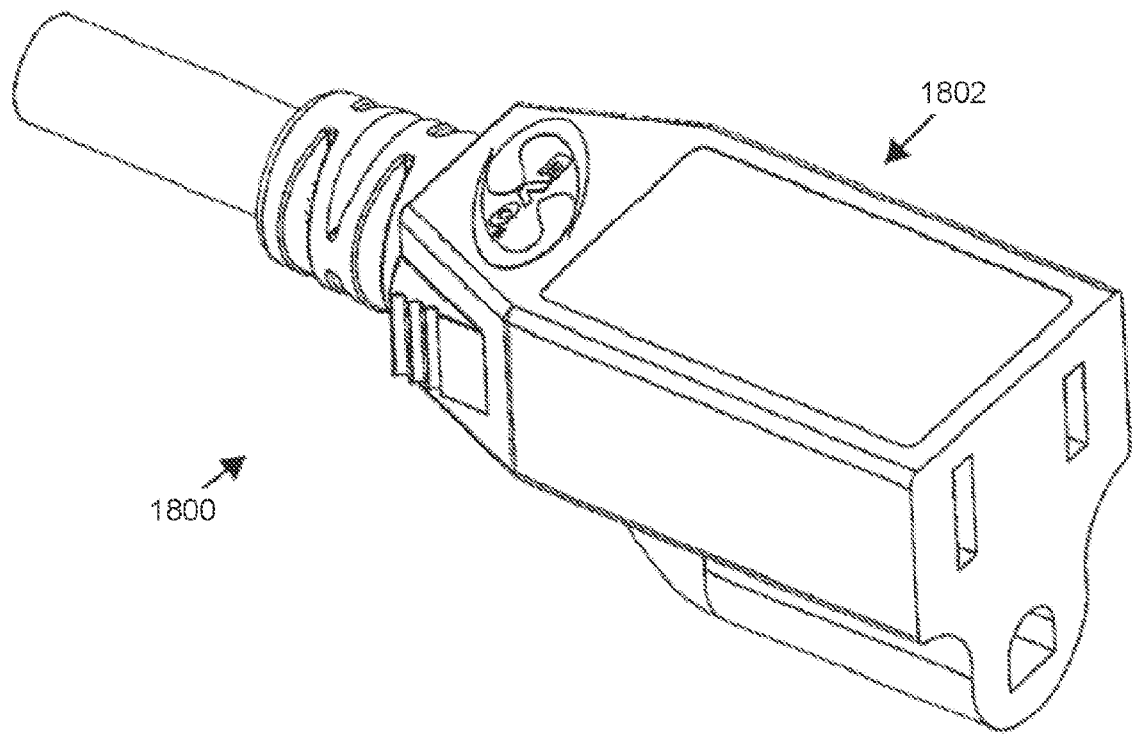

FIGS. 18A-18B depict perspective and end views, respectively, of another embodiment of a female connector hood 1802 for embodiments of the present power cables. In the depicted alternate embodiment, cable 1800 includes a power cable 1652 and a female connector hood 1802. The female connector hood 1802 can be coupled to one or more ends of the power cable 1652. For example, the female connector hood 1802 may be coupled to a first end of power cable 1652, a second end of power cable 1652 (e.g., in place of female connector hood 1702), or both. As shown, female connector hood 1802 is configured to receive a standard male connector, such as a connector of male connector hood 1602. In the embodiment shown, female connector hood 1802 is similar to female connector hood 1702, with the primary exception being the physical configuration (i.e., a prong instead of a blade). For example, female connector hood 1802 includes similar components to female connector hood 1702. To illustrate, female connector hood 1802 includes the printed circuit (e.g., 500, 1440), an electronically activated telltale 1864 and a button 1868, any of the components and/or functions described above, or a combination thereof.

A telltale 1864 may be configured to produce a visual and/or an audio signal. As used herein, an electrically activated telltale is any electrically triggered device that emits a visual or audio signal that can be detected by a human. One example of a suitable telltale is a light emitting diode (LED), but may alternatively or additionally include one or more other visual indicators (e.g., an incandescent or conventional light bulb, a liquid crystal visual indicator, etc.). In the embodiment shown, the cable also includes a button 1868 that is configured to be manually pressed to engage a manual switch (e.g., 224, 324, 424) incorporated into at least one of the connector hoods and configured to activate the telltale by initiating electrical communication between the electric power source and the telltale (e.g., via one or more of the conductors, such as, for example, a conductor wire, a conductor wire pair, an indicator wire, and/or indicator wire pair). For example, the switch can complete an indicator circuit that includes an LED to cause the LED to flash repeatedly for a predetermined time. In some embodiments, the indicator circuit includes the indicator wire or wire pair that runs the complete length of the cable.

In some embodiments, the present cables (e.g., networking, power, fiber optic, etc.) include a first hood of on a first or "left" end of the cable, and a second hood (same or different from the first hood) on the second or "right" end of the cable (e.g., such that the two hoods are in electrical communication connection via a conductor wire, a conductor wire pair, an indicator wire, and/or indicator wire pair). For example, in an embodiment with a connector hood at each end of the cable, where each connector hood includes a switch and a telltale, the operation of either switch can activate both telltales if the telltales are not activated, or the operation of either switch can deactivate both telltales if the telltales are activated, as described in more detail below.

Telltale 1864 and button 1868 are shown in one suitable configuration relative to a hood; in other embodiments, telltale 1864 and/or button 1868 can be incorporated into a hood (e.g., 1802) at any suitable position in the hood. In other embodiments, the present cables can include connector hoods spaced apart from the terminal or end connectors of the cable. For example, some embodiments of the present cables can include a connector hood spaced inward relative to an end of the cable (e.g., by 1, 2, 3, 4, 5, or more inches), and the inwardly-spaced connector hood can include one or more of the tracing features or elements (e.g., a button, telltale, etc.) described in this disclosure.

In the embodiment shown, button 1868 is coupled (e.g., connected physically) to a switch that, when manually engaged, completes an electrical circuit that powers telltale 1864. As explained above, the cable (e.g., a hood thereof) may comprise a printed circuit (e.g., 230, 330, 430, 500, 1030, 1130, 1230, 1330, or 1400) to which the switch is coupled, and the printed circuit is configured to have at least some of the functionality described in this disclosure, such as wireless power reception and wireless communication. In a particular implementation, the telltale 1864 lights up to provide an indication responsive to wireless communication with a mobile device to provide information about the cable or a system to a user.

Embodiments with two connector hoods may include a controller and/or battery in each of the two connector hoods (e.g., with one controller a "master" and one controller a "slave"), or can include a single controller and/or a single battery. For example, in some embodiments, the cable includes a single controller and a single battery in one of the two connection hoods, but includes a switch and telltale in each of the two connection hoods, such that depressing a switch at either end of the cable activates the telltales at both ends of the cable. In such embodiments, a similar printed circuit may be used in the hood without a controller or power source to provide the circuit between the switch and telltale. Additionally, U.S. Pat. No. 9,952,258 is incorporated by reference to the extent it provides details on various versions of power delivery cables or electrical cables referred to as power cables.

Referring now to FIGS. 19-23, examples of fiber optic cable including wireless power delivery and/or wireless communication are illustrated. Fiber optic cables generally comprise one or more optical fibers configured to transmit data as an optical signal (e.g., light), and optionally one or more conductors (e.g., conductive wires) to communicate electrical current along the length of the optical fiber(s) to enable the tracing functionality. Examples of connectors for optical-fiber cables include single-fiber (e.g., LC) connectors, multi-fiber (e.g., MPO and/or MTP) connectors, and/or any other optical-fiber connectors (e.g., SC, ST, and the like).

Figure 19:
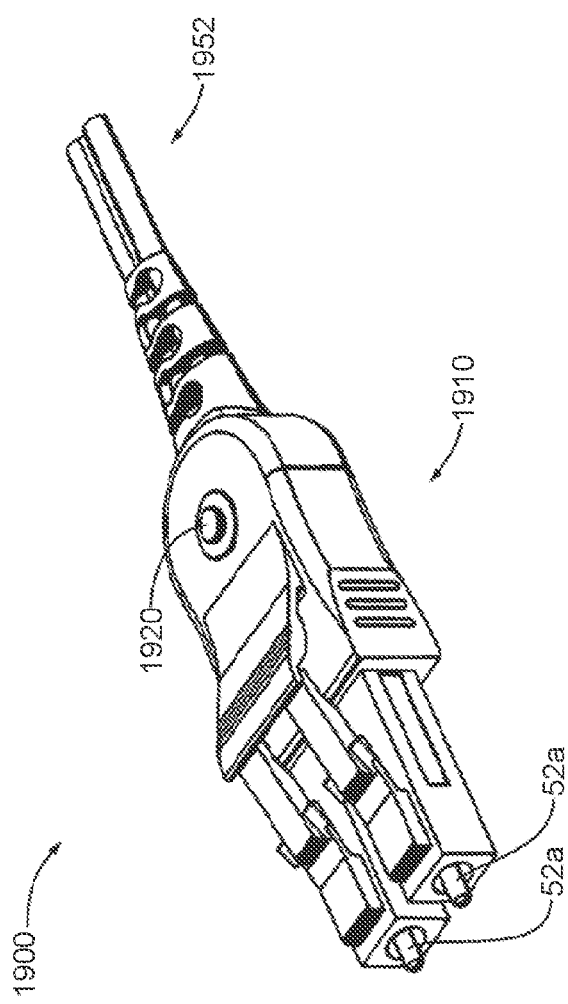
FIG. 19 is a perspective view of a fiber optic cable connector hood.
Figure 20:
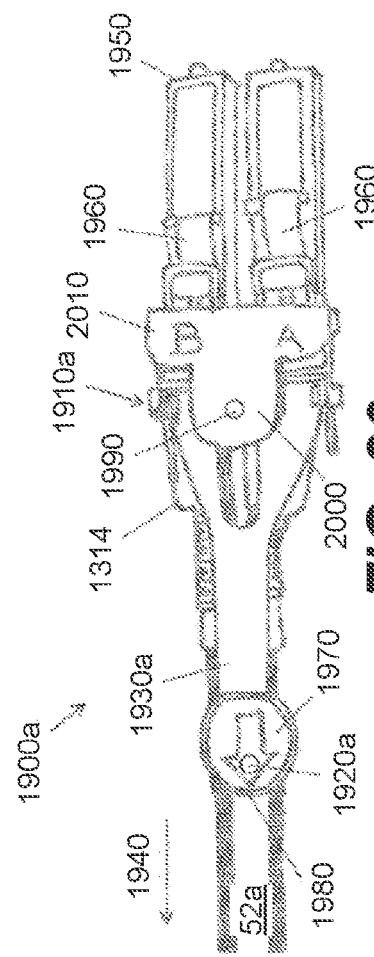
FIG. 20 is a plan view of a first embodiment of a dual-fiber optic cable connector hood with a remote release tab.

The electronics and functionality of the tracer testing may be very similar, if not identical, to that described above for the conductive-wire networking cables. For example, FIG. 19 illustrates one end of a traceable fiber optic cable system. An example of a cable 1900 that includes a dual-fiber optic connector 1910 is shown. The dual-fiber optic connector 1910 may include a button 1920 that also serves as electrically activated telltale (i.e., a lighted button, in this embodiment). In other implementations, button 1920 and/or the electrically activated telltale is not included. Dual-fiber optic connector 1910 includes two transmission lines 52a. In other implementations, cable 1900 include a connector with fewer transmission lines or more transmission lines. Cable 1900 further includes a fiber optical cable 1952 enclosed in a sheath. Additionally, because cable 1900 is a fiber optic cable, a separator need not be included.

The enclosure, dual-fiber optic connector 1910, contains one or more other elements (electric power source, PCB board, etc.) described above with reference to other network cables and power cables and such elements may operate in the same way as in the non-fiber optic embodiments described above. To illustrate, the dual-fiber optic connector 1910 may include a printed circuit (e.g., 230, 330, 430, 500, 1030, 1130, 1230, 1330, or 1400). The printed circuit may have a similar layout, circuitry, and/or functionality as printed circuit 500 shown and described with reference to FIG. 5 or a printed circuit 1400 as shown and described with reference to FIG. 14A. For example, the printed circuit can be configured to communicate data (e.g., 184) to or from a mobile device (e.g., 102). The printed circuit may include a flex circuit and/or a circuit included in a printed circuit board. In a particular implementation, printed circuit 230 includes a flexible circuit or flex circuit that is affixed to and/or molded into a hood, such as 1902. In other implementations, the printed circuit is affixed to another portion of cable 1900, such as an optical cable portion or sheath of cable 1900 (e.g., 1952).

FIGS. 20-23 depict various embodiments of cables 1900a, 1900b, and 1900c with fiber optic cable connector hoods 1910a, 1910b, and 1910c respectively. Each of connector hoods 1910a, 1910b, and 1910c are similar in some respects to the remote-release connectors disclosed in U.S. Pat. No. 8,465,317 (the '317 Patent, which is incorporated by reference to the extent it provides details of various versions of remote-release connectors) in that each includes an extender or remote release tab (1930a, 1930b, 1930c), which improves the ease of releasing the respective connector in high-density environments. To illustrate, the extender or remote release tab can simply be pulled by a user in a direction 1940 away from a distal end 1950 of the connector to laterally compress the lever(s) (1960) of the connector toward the transmission line(s) 52a (e.g., optical fiber(s), in the embodiment shown).

Each of connector hoods 1910a, 1910b, and 1910c can be configured in any of various ways. For example, connector hood 1910a of FIG. 20 includes a manually operated switch or button 1920a incorporated into (e.g., disposed in and/or on) a lateral surface 1970 (e.g., outwardly facing, relative to the optical fibers) of a proximal end 1980 of extender 1930a, and an electrically activated telltale 1990 (i.e., LED, in this embodiment) incorporated into a lateral surface 2000 of connector body 2010. In this embodiment, the other components of the circuit, such as the power source (e.g., battery 2390), integrated circuit or chip 2330 (e.g., a printed circuit, such as 230, 330, 430, 500, 1030, 1130, 1230, 1330, or 1400), and the various conductive paths between the components can be included in extender 1930a and/or connector body 2010 (including boot 1314). For example, in some embodiments, the various components can be connected by a flexible circuit coupled to and extending along at least a portion of extender 1930a, and which can be soldered or otherwise coupled to the tracing conductor(s) running along the length of the transmission line(s) (e.g., conductive pairs or fiber optic cables) to communicate with the second connector hood at the opposite end of the cable. While not shown, the embodiment depicted in FIG. 20 includes a second connector hood 1910a at an opposite end of the cable and connected via the tracing conductor(s) (not independently shown, but running the length of fiber optic cable 1952).

Figure 21:
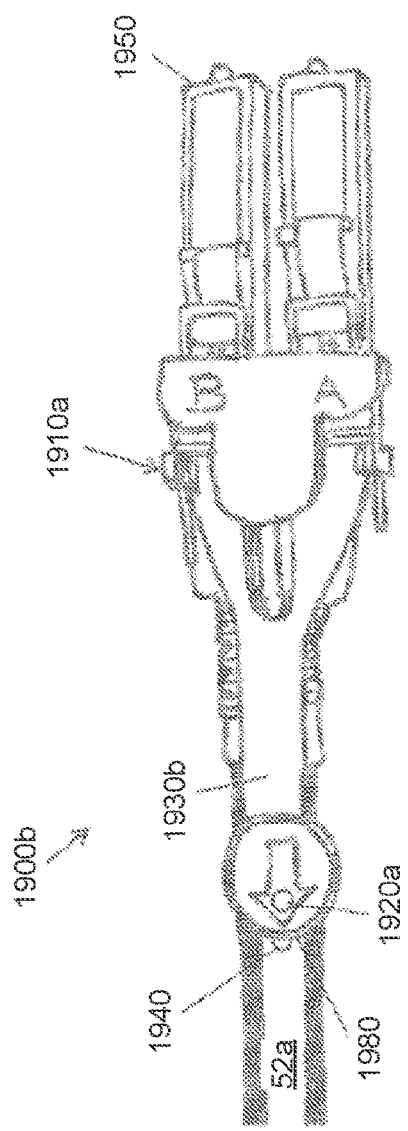
FIG. 21 is a plan view of a second embodiment of a dual-fiber optic cable connector hood with a remote release tab.

FIG. 21 depicts a first end of a second embodiment of the present fiber optic cables. Cable 1900b is similar to cable 1900a with the primary exception that, in cable 1900b, electrically activated telltale 1990 (i.e., LED, in this embodiment) is incorporated into a proximal surface 2020 (facing away from distal end 1950) of proximal end 1980 of extender 1930b.

Figure 22:
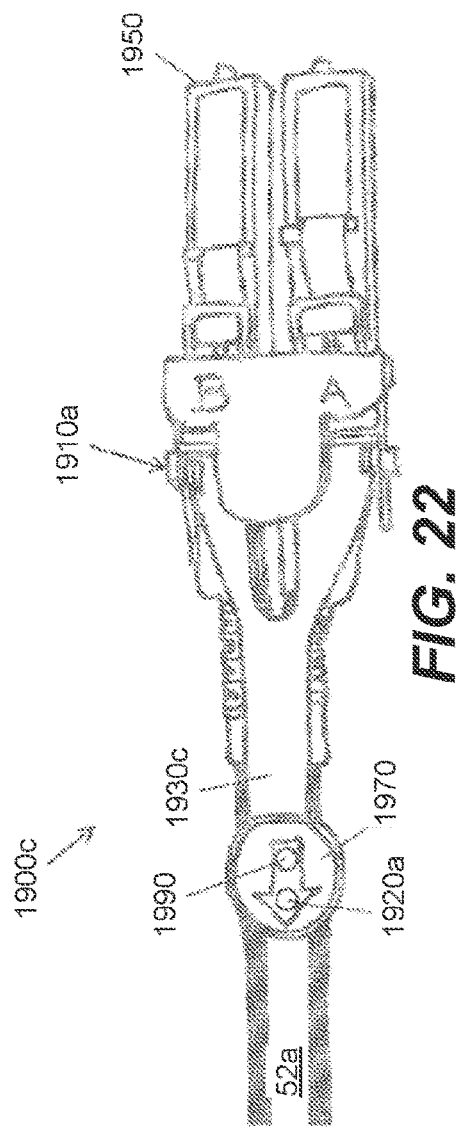
FIG. 22 is a plan view of a third embodiment of a dual-fiber optic cable connector hood with a remote release tab.

FIG. 22 depicts a first end of a third embodiment of the present fiber optic cables. Cable 1900c is similar to cables 1900a and 1900b with the primary exception that, in cable 1900c, electrically activated telltale 1990 (i.e., LED, in this embodiment) is incorporated into lateral surface 1970 of proximal end 1980 of extender 1930c.

Figure 23:
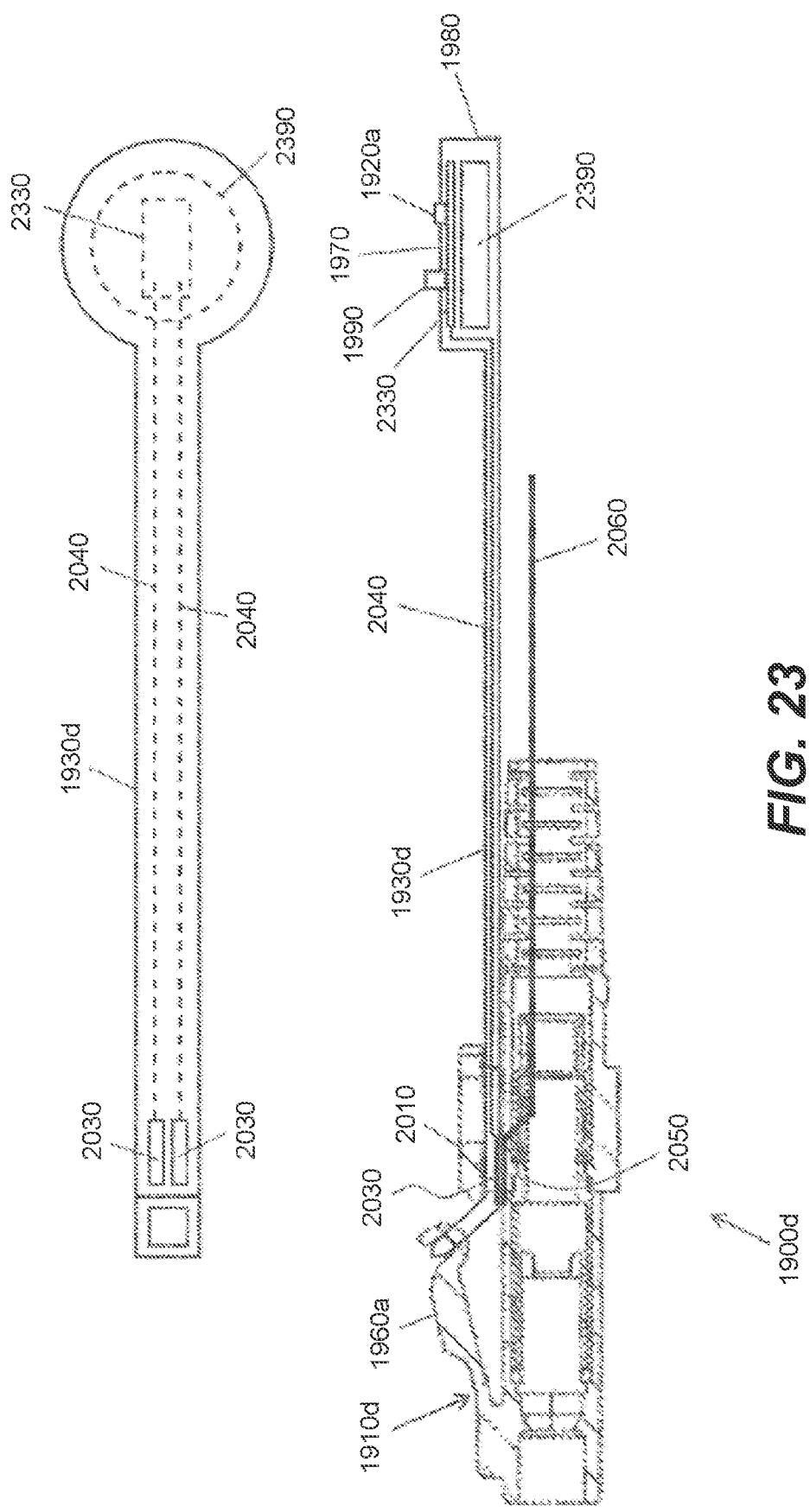
FIG. 23 includes a cutaway side view of a fourth embodiment of a single-fiber optic cable connector hood with a remote release tab, and an inset bottom view of an extender of the connector hood.

FIG. 23 depicts a cutaway side view of a first end of a fourth embodiment of the present fiber optic cables. Cable 1900d is similar to cable 1900c with the primary exception that cable 1900d includes only a single fiber optic cable (which is omitted for clarity). As described in U.S. Pat. No. 8,465,317 (the '317 Patent), connector hood 1910d includes extender 1930d that is configured to be removably coupled to connector body 2010 such that extender 1930d can slide relative to connector body 2010 to depress or compress lever 1960a. In this embodiment, manually operated switch or button 1920a and electrically activated telltale 1990 are incorporated into (e.g., disposed in and/or on) a lateral surface 1970 (e.g., outwardly facing, relative to the optical fibers) of proximal end 1980 of extender 1930d, and the other components of the circuit, such as the power source (e.g., battery 2390), integrated circuit or chip (e.g., printed circuit 230) are also incorporated into extender 1930a. In this and other embodiments, the tracing circuit also includes at least one (e.g., two, in the embodiment shown) first conductive contact 2030 disposed on and/or otherwise exposed to an exterior of extender 1930d and coupled to the tracing circuit via one or more (e.g., two, in the embodiment shown) conductors 2040 (which may be unitary with contact(s) 2030). In this and other embodiments, cable 1900d further includes at least one (e.g., two, in the embodiment shown) second conductive contacts 2050 incorporated into (e.g., disposed on and/or in connector body 2100 or boot 1314 and in electrical communication (e.g., unitary) with the at least one (e.g., two, in the embodiment shown) tracing conductor 2060 running along the length of the transmission line(s). In this embodiment, the at least one first conductive contact (2030) is configured to contact the at least one second conductive contact (2050) to provide an electrical connection between the tracing circuit and the at least one conductor (2060) that can be maintained during movement of extender 1930d relative to connector body 2010. In this embodiment, conductors 2040 and/or printed circuit (e.g., 230) can be included in a flexible circuit or flex circuit (e.g., 2330) that is affixed to and/or molded into extender 1930d. Additionally, U.S. Pat. No. 10,215,935 is incorporated by reference to the extent it provides details on various versions of fiber optic cables.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A networking component comprising:
a housing;
a wireless communication interface configured to wirelessly communicate with a mobile device;
one or more ports, the one or more ports configured to couple with corresponding connectors of cables; and
a controller coupled to the wireless communication interface and the one or more ports, the controller configured to control an indicator of a cable coupled to at least one port of the one or more ports.

2. The networking component of claim 1, wherein the wireless communication interface comprises a Bluetooth communication interface.

3. The networking component of claim 2, wherein the Bluetooth communication interface comprises a Bluetooth Low Energy (BLE) communication interface.

4. The networking component of claim 1, wherein the indicator comprises a light emitting diode (LED).

5. The networking component of claim 1, further comprising one or more digital output pins coupled to the port, the one or more digital output pins configured to control a switch which is configured to control application of power to the indicator of the cable.

6. The networking component of claim 5, wherein the switch comprises a field effect transistor (FET).

7. The networking component of claim 1, further comprising one or more digital output pins coupled to the port, where the one or more digital output pins are configured to drive control pins of the indicator.

8. The networking component of claim 1, further comprising serial to parallel expansion circuitry to selectively drive a particular field effect transistor (FET) of a plurality of FETS.

9. The networking component of claim 8, wherein the serial to parallel expansion circuitry comprises a shift chain.

10. The networking component of claim 1, further comprising isolation circuitry configured to isolate a light emitting diode (LED) driver from an Ethernet controller or Ethernet signals.

11. The networking component of claim 1, wherein the controller comprises a processor and a memory, and wherein the memory comprises an EEPROM, and further comprising a power supply, wherein the controller is configured to receive power from the power supply.

12. The networking component of claim 1, further comprising an interface configured to couple the controller to the ports, the mobile device, or both, wherein the interface comprises a Bluetooth Interface, an Ethernet interface, an 802.11 interface, a serial UART interface, or a combination thereof.

13. The networking component of claim 1, wherein the controller is configured to receive power from an Ethernet connection.

14. The networking component of claim 1, further comprising a wireless power delivery circuitry configured to wirelessly transmit power signals to the indicator of the cable.

15. The networking component of claim 1, wherein the networking component is a networking panel, a router, a switch, or a wall jack.

16. A networking component comprising:
a housing;
a wireless communication interface configured to wirelessly communicate with a remote device;
a plurality of ports, each port of the plurality of ports configured to couple with a corresponding connector;
a plurality of indicators, each indicator of the plurality of indicators is associated with a respective port of the plurality of ports and configured to output an indication corresponding to the respective port of the plurality of ports; and
a controller, the controller configured to individually control the plurality of indicators and to generate the indications responsive to control signals from the remote device.

17. A network cable connector comprising:
a hood defining an opening configured to receive a first plug;
a second plug coupled to the hood, the second plug configured to couple with a jack;
a printed circuit incorporated into the hood and configured to communicate with a controller of the jack; and
an indicator coupled to the printed circuit and configured to output an indication based on a control signal received from the jack.

18. The network cable connector of claim 17, wherein the indicator is LED and configured to blink, change color, change blink speed, or a combination thereof based on the control signal.

19. The network cable connector of claim 17, wherein the indicator is a display incorporated into the hood and configured to display information, and wherein the information indicates an operating status of the connector, a power connection status of the connector, a security setting of the connector, an Internet protocol (IP) address of a device coupled to the connector, a media access control (MAC) address of a device coupled to the connector, or a combination thereof.

20. The network cable connector of claim 17, wherein the indicator is a speaker and configured to output one or more tones, change a tone, change a pattern of tones, a volume or a combination thereof.

* * * * *